(12) United States Patent  (10) Patent No.: US 8,328,343 B2
Aruga et al.  (45) Date of Patent: *Dec. 11, 2012

(54) RECORDING INK AS WELL AS INK MEDIA SET, INK CARTRIDGE, INK RECORDED MATTER, INKJET RECORDING APPARATUS AND INKJET RECORDING METHOD

(75) Inventors: Tamotsu Aruga, Isehara (JP); Masayuki Koyano, Zama (JP); Akihiko Matsuyama, Isehara (JP); Hisashi Habashi, Isehara (JP); Hiroshi Goto, Atsugi (JP); Tohru Ohshima, Atsugi (JP); Naoya Morohoshi, Numazu (JP); Kiyofumi Nagai, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/851,352

(22) Filed: Aug. 5, 2010

(65) Prior Publication Data

US 2011/0057981 A1  Mar. 10, 2011

Related U.S. Application Data

(62) Division of application No. 11/623,928, filed on Jan. 17, 2007, now abandoned.

(30) Foreign Application Priority Data

Jan. 18, 2006  (JP) .................... 2006-009939
Feb. 28, 2006  (JP) .................... 2006-052565

(51) Int. Cl.
 *G01D 11/00* (2006.01)
 *B41J 2/01* (2006.01)

(52) U.S. Cl. ........... 347/100; 347/101; 347/95; 347/105
(58) Field of Classification Search .............. 347/100, 347/95, 9, 6, 105, 101, 102; 106/31.6, 31.27, 106/31.13; 523/160, 161; 428/195, 32.1
See application file for complete search history.

(56) References Cited

U.S. PATENT DOCUMENTS 4,554,555 A   11/1985  Aruga et al.
(Continued)

FOREIGN PATENT DOCUMENTS

CN  1628157  6/2005
(Continued)

OTHER PUBLICATIONS

Japanese Office Action issued Dec. 27, 2011, in Patent Application No. 2007-006668.

*Primary Examiner* — Manish S Shah
(74) *Attorney, Agent, or Firm* — Oblon, Spivak, McClelland, Maier & Neustadt, L.L.P.

(57) ABSTRACT

A recording ink containing at least a solid component which contains a colorant and a resin and is a solid at 25° C., a liquid component which has a higher boiling point than that of water and is a liquid at 25° C. and water, wherein the total content of the liquid component in the recording ink is 20% by mass or less, the total content of the solid component in the recording ink is 20% by mass or more, and the total content of a resin component in the solid component is 40% by mass to 95% by mass relative to a total amount of the solid component is provided.

6 Claims, 26 Drawing Sheets

U.S. PATENT DOCUMENTS

| | | | |
|---|---|---|---|
| 4,581,071 A | 4/1986 | Akutsu et al. | |
| 4,620,876 A | 11/1986 | Fujii et al. | |
| 4,631,085 A | 12/1986 | Kawanishi et al. | |
| 4,647,310 A | 3/1987 | Shimada et al. | |
| 4,711,668 A | 12/1987 | Shimada et al. | |
| 4,713,113 A | 12/1987 | Shimada et al. | |
| 4,737,190 A | 4/1988 | Shimada et al. | |
| 4,793,860 A | 12/1988 | Murakami et al. | |
| 5,085,698 A | 2/1992 | Ma et al. | |
| 5,897,695 A * | 4/1999 | Mayo et al. | 106/31.75 |
| 6,031,019 A * | 2/2000 | Tsutsumi et al. | 523/160 |
| 6,736,887 B1 | 5/2004 | Tsutsumi et al. | |
| 7,094,813 B2 | 8/2006 | Namba et al. | |
| 7,338,988 B2 | 3/2008 | Hesler et al. | |
| 2003/0144375 A1 | 7/2003 | Wu et al. | |
| 2005/0054751 A1 | 3/2005 | Namba et al. | |
| 2007/0221079 A1 | 9/2007 | Aruga et al. | |
| 2009/0043028 A1 | 2/2009 | Matsuyama et al. | |
| 2009/0162569 A1* | 6/2009 | Morohoshi et al. | 347/95 |

FOREIGN PATENT DOCUMENTS

| | | |
|---|---|---|
| EP | 1 473 338 | 11/2004 |
| EP | 1 473 338 A1 | 11/2004 |
| EP | 1 512 731 A1 | 3/2005 |
| JP | 60-34992 | 8/1985 |
| JP | 4-139271 | 5/1992 |
| JP | 6-171072 | 6/1994 |
| JP | 8-109343 | 4/1996 |
| JP | 9-235499 | 9/1997 |
| JP | 2000-44858 | 2/2000 |
| JP | 2000-117960 | 4/2000 |
| JP | 2001-106951 | 4/2001 |
| JP | 2002/67473 | 3/2002 |
| JP | 2002-69346 | 3/2002 |
| JP | 2002-212467 | 7/2002 |
| JP | 2002-301857 | 10/2002 |
| JP | 2003-041172 | 2/2003 |
| JP | 2003-226827 | 8/2003 |
| JP | 2004-115551 | 4/2004 |
| JP | 2004-176057 | 6/2004 |
| JP | 2005-15672 | 1/2005 |
| JP | 2005-220352 | 8/2005 |
| WO | WO 01/08895 A1 | 2/2001 |

* cited by examiner

RECORDING INK AS WELL AS INK MEDIA SET, INK CARTRIDGE, INK RECORDED MATTER, INKJET RECORDING APPARATUS AND INKJET RECORDING METHOD

CROSS-REFERENCE TO RELATED APPLICATIONS

The present application is a Divisional application of Ser. No. 11/623,928 filed Jan. 17, 2007, now abandoned.

BACKGROUND OF THE INVENTION

1. Field of the Invention

The present invention relates to a recording ink which is suitable for inkjet recording, as well as an ink media set, an ink cartridge, an ink record, an inkjet recording apparatus and an inkjet recording method using the recording ink.

2. Description of the Related Art

An inkjet recording method is the method to perform printing by ejecting small liquid drops of an ink to adhere onto a recording medium such as paper. As the ink used for this inkjet recording method, those in which colorants of various dyes and pigments have been dissolved or dispersed in water or water and an organic solvent having a high boiling point and a wetting agent composed of the organic solvent having the high boiling point has been abundantly contained for keeping a moisturizing property are used. Such a wetting agent composed of the organic solvent having the high boiling point contributes to preventing nozzles from being dried by its water-holding capacity. However, when printing on the paper with a rapid penetrating speed, e.g., plain paper, there is a shortcoming that show-through is increased because the wetting agent is hardly evaporated.

Meanwhile, on the papers such as non-porous substrates such as offset coated papers for printing, plastic films, plastic laminate papers and plastic coated papers which have a low water-absorbing capacity, it takes a long time for drying because the wetting agent is hardly evaporated, which is impractical.

Thus, it is desired to provide an inkjet recording method in which drying is rapid on the paper for printing, an image density is high, an image quality is high on the plain paper and no clogging occurs when stopped for a long time.

For example, in Japanese Patent Application Laid-Open (JP-A) No. 2004-115551 an inkjet ink in which a content of the wetting agent has been excessively low is proposed. According to this proposal, even when the plain paper is used, the image quality with no show through having the high image density is obtained. However, in this proposal, since no resin is contained in the ink, a fixing property of the image is inferior particularly when a pigment ink is used. Enhancement of a drying speed when printed on the offset coated paper is neither disclosed nor suggested.

In JP-A No. 60-34992, quick drying inks are proposed. However, in Example in this proposal, the wetting agent is abundantly contained at 15% by mass or more, no resin is added and quality papers are used as the paper. Thus, coated papers for printing which extremely hardly absorb the water do not subject to this proposal.

In JP-A No. 08-109343, quick drying inks for the inkjet of a current-carrying heat generation system are proposed. However, in this proposal, no resin is added, electrolytes are considerably abundantly contained, the fixing property of the image is inferior, and an ejecting system which is essentially different from the inkjet of a piezoelectric system is employed.

In JP-A No. 2002-67473 and JP-A No. 2002-69346, a combination of microcapsule type pigments with the paper for printing is proposed. However, in these proposals, heating by microwave is required for enhancing a drying property because of a usual ink composition.

In JP-A No. 2002-301857 containing wax fine particles and resin fine particles are proposed. In this proposal, the wax fine particle is used in place of the wetting agent because it can impart a wetting property. However, the wax having the wetting property tends to be inferior in fixing property and drying.

In JP-A No. 06-171072, inks containing a resin emulsion, a polymer dispersant and a pigment are proposed. In the ink in this proposal, since the wetting agent content is low but a concentration of an entire solid content is low, there are problems in that the sufficient image density and color formation are not obtained.

In JP-A No. 2003-226827, the ink containing a fluorine surfactant and a polymer emulsion containing a water-insoluble or water-hardly soluble color material in polymer fine particles, whose viscosity is 5 mPa·s or more is described. However, it is not described to record on non-porous medium such as plastic films.

When printed on an unabsorbable recording medium such as polyester films, generally the ultraviolet ray curable ink is used because the usual ink is inferior in fixing property and drying property (see JP-A No. 2000-117960). However, since strong ultraviolet light is required and the apparatus is grown in size due to storage stability of the ink, the apparatus is not common as a printer.

Meanwhile, the methods of enhancing the drying property and the fixing property by oil-based inks are available, but the solvent is the organic solvent, and thus, they can not be generally used in places such as offices where odor is avoided.

As water-based inks used for printing on polyolefin films, those containing the resin at high concentration are proposed, for example, in JP-A No. 04-139271. However, it is not described whether the ink can be used as the inkjet ink.

In JP-A No. 2005-15672, a non-water-based inkjet ink for polyvinyl chloride resin sheets is proposed. This proposal is the non-water-based ink, and is not suitable for the use in the office in terms of environmental problem such as odor.

Also, the inkjet ink printed on the non-porous substrate such as vinyl medium is described in JP-A No. 2005-220352. So far as this is seen in Example, the concentration of the total solid content is 6% by mass and the amount of the wetting agent is 21% by mass. When the solid content is low in this way, the amount of the wetting agent is large and the amount of the adhered ink having the relatively low viscosity is large per unit area, unevenness of the image density due to liquid flow referred to as beading and liquid bias easily occurs particularly in solid images.

In JP-A No. 2000-44858, the inkjet ink printed on the vinyl medium is proposed, and dried at 70° C. in this Example. When seen in Examples, the amount of wetting agent in the ink is large, the solid content is low which is 10% by mass or less, and thus it is speculated that the drying is necessarily slow and no good image is obtained unless drying is performed by heating. That is, in the [ink sample 1] described in the above JP-A No. 2000-44858, when calculated, the solid content is 11% by mass which is more than 10% by mass, but the resin includes a dispersant polymer and is not an emulsion type. Thus it is speculated that the resin in a large amount can not be added.

Therefore, it is an actual circumstance that a recording ink and an inkjet recording method having sufficiently satisfied performances are not obtained yet, i.e., the ink for printing by which the image having a high image density, a low backside density, good color formation and no bleeding is obtained when printed on the plain paper and the sharp image close to printed matters, having no problem in drying speed is obtained on smooth papers for printing having a low water absorbing capacity and non-porous substrates such as plastic films, plastic laminate papers and plastic coated papers, and the inkjet recording method using the recording ink, where no clogging of nozzles occurs when stopped for a long time are not obtained yet.

SUMMARY OF THE INVENTION

The present invention aims at providing a recording ink by which the image having a high image density, a low backside density, good color formation and no bleeding is obtained when printed on the plain paper and the sharp image close to printed matters, having no problem in drying speed is obtained even when printed on smooth papers for printing having a low water absorbing capacity, as well as an ink cartridge, an ink media set, an ink record, an inkjet recording apparatus where no clogging of nozzles occurs when stopped for a long time, and an inkjet recording method using the recording ink.

The present invention also aims at providing an ink media set, an ink cartridge, an ink record, an inkjet recording apparatus and an inkjet recording method which do not select recording medium, not only capable of recording on the plain paper and the paper specific for the inkjet but also capable of well recording on non-porous substrates having the low water absorbing capacity, such as plastic sheets such as polyester sheets, plastic laminate papers, plastic coated papers, glasses and metals.

The recording ink of the present invention contains at least a solid component which contains a colorant and a resin and is a solid at 25° C., a liquid component which has a higher boiling point than that of water and is a liquid at 25° C. and water.

The total content of the liquid component in the recording ink is 20% by mass or less, the total content of the solid component in the recording ink is 20% by mass or more, and the total content of a resin component in the solid component is 40% to 95% by mass relative to the total amount of the solid component.

In the recording ink of the present invention, by making the total content of the resin component in the solid component 40% to 95% by mass relative to the total amount of the solid component, the fixing property and a gloss property of the colorant are enhanced and the image having the high image density, the low backside density, the good color formation and no bleeding is obtained particularly when printed on the plain paper. Also, by making the total content of the liquid component in the recording ink 20% by mass or less, a drying time of the ink can be shortened, and the sharp image close to the printed matter, whose drying speed is enhanced and which is excellent in glossiness is obtained when printed on the smooth paper for printing having the low water absorbing capacity. Also by making the total content of the solid component in the recording ink 20% by mass or more, the drying is rapid even on the paper for printing which hardly absorbs the water, and the image having the less show through and the high color tone is obtained on the plain paper.

An ink media set according to a first aspect of the present invention contains a recording ink and a recording medium, wherein the recording ink contains a solid component, a liquid component, and water; the solid component contains a colorant and a resin and is a solid at 25° C.; the liquid component has a higher boiling point than that of water and is a liquid at 25° C.; the total content of the liquid component in the recording ink is 20% by mass or less; the recording medium contains a support, and a coating layer on at least one surface of the support; the transfer amount of purified water to the recording medium for a contact time of 100 ms is 2 mL/m$^2$ to 35 mL/m$^2$; and the transfer amount of purified water to the recording medium for a contact time of 400 ms is 3 mL/m$^2$ to 40 mL/m$^2$ measured using a dynamic scanning absorbing liquid meter.

In the ink media set according to the first aspect of the present invention, by combining a recording medium having small water absorbing capacity and a recording ink having a higher boiling point than that of water and having less amount of a liquid component which is a liquid at 25° C., it is possible to record an image which can be quickly dried and has glossy feeling and high uniformity, where no beading is observed in solid portions.

In the ink media set according to the first aspect of the present invention, the conditions that the total content of solid components in the recording ink is 20% by mass or more and the content of resin components in the solid components is 40% by mass to 95% by mass have supplementary effects on fixing property and drying property, however, the requirements are not necessarily necessary requirements, the drying property can be improved even when a recording medium having small water absorbing capacity like the recording medium set forth above is used, provided that the content of the liquid component is 20% by mass or less.

An ink media set according to a second aspect of the present invention contains a recording ink and a recording medium, wherein the recording ink contains a solid component, a liquid component, and water; the solid component contains a colorant and a resin and is a solid at 25° C.; the liquid component has a higher boiling point than that of water and is a liquid at 25° C.; the total content of the liquid component in the recording ink is 30% by mass or less; the total content of the solid component in the recording ink is 20% by mass or more; the total content of resin components in the solid component is 40% by mass to 95% by mass relative to the total amount of the solid component; the recording medium contains a support, and a coating layer on at least one surface of the support; the transfer amount of purified water to the recording medium for a contact time of 100 ms is 2 mL/m$^2$ to 35 mL/m$^2$; and the transfer amount of purified water to the recording medium for a contact time of 400 ms is 3 mL/m$^2$ to 40 mL/m$^2$ measured using a dynamic scanning absorbing liquid meter.

In the ink media set according to the second aspect of the present invention, by combining the recording ink of the present invention with the recording medium where the transfer amount of the purified water is in the given range, it is possible to record the image having glossy feeling and high uniformity, where no beading is observed in solid portions.

An ink media set according to a third aspect of the present invention contains a recording ink and a recording medium, the recording ink contains a solid component, a liquid component, and water; the solid component contains a colorant and a resin and is a solid at 25° C.; the liquid component has a higher boiling point than that of water and is a liquid at 25° C.; the total content of the liquid component in the recording ink is 30% by mass or less; and the recording medium contains a non-porous substrate.

In the ink media set according to the third aspect of the present invention, by increasing the solid contents in the colorant and the water-dispersible resin in the recording ink, increasing a resin ratio and further reducing a surface tension, wettability, the drying property and the fixing property can be improved when printed on non-porous substrates having the low water absorbing capacity, such as plastic sheets such as polyester sheets, plastic laminate papers, plastic coated papers, glasses and metals, and it becomes possible to print on film medium by the water-based ink without requiring a special device such as heater by reducing the amount of the wetting agent as much as possible and without using the ultraviolet ray curable ink or the oil-based ink. But, it is advantageous to heat for drying at high speed.

When the ratio of the wetting agent is not so small (20% to 30% by mass), the ink is not so quick drying, and thus the heating is effective for the quick drying. However, since the solid content concentration is high and the viscosity is high, image density bias such as beading defect is relatively few compared with the ink having the low viscosity and the low solid content concentration. Meanwhile, when the amount of the wetting agent is small which is 20% by mass or less, the viscosity is relatively low, water in the ink is rapidly evaporated, the drying is rapid, the viscosity is rapidly increased, the image defect due to liquid flow hardly occurs and the drying at high speed becomes possible because the amount of the wetting agent is small.

A fourth aspect of an ink media set of the present invention contains a recording ink and a recording medium, wherein the recording ink contains at least a pigment of a polymer emulsion type containing a color material which is water insoluble or hardly water soluble in polymer fine particles, water dispersible resin fine particles, and a wetting agent; the total solid content of the pigment of the polymer emulsion type and the water dispersible resin fine particles is 20% by mass or more; the content of the wetting agent is 20% by mass or more; the transfer amount of purified water to the recording medium for a contact time of 100 ms is 2 mL/m$^2$ to 35 mL/m$^2$; and the transfer amount of purified water to the recording medium for a contact time of 400 ms is 3 mL/m$^2$ to 40 mL/m$^2$ measured using a dynamic scanning absorbing liquid meter.

An ink media set according to a fifth aspect of the present invention contains a recording ink and a recording medium, wherein the recording ink contains at least a colorant, a water dispersible resin, and a wetting agent; the total content of solid components in the recording ink is 20% by mass or more; the wetting agent contains glycerine alone or the content of the glycerine in the wetting agent is 80% by mass or more; the transfer amount of purified water to the recording medium for a contact time of 100 ms is 2 mL/m$^2$ to 35 mL/m$^2$; and the transfer amount of purified water to the recording medium for a contact time of 400 ms is 3 mL/m$^2$ to 40 mL/m$^2$ measured using a dynamic scanning absorbing liquid meter.

The ink cartridge of the present invention houses a recording ink in an ink media set according to any one of the first aspect to the fifth aspect of the present invention in a container. The ink cartridge is used suitably for printers by an inkjet recording system. When recorded using the ink housed in the ink cartridge, the image having the high image density, the low backside density, the good color formation and no bleeding is obtained particularly when printed on the plain paper, and the sharp image close to the printed matter, where the drying speed is enhanced can be recorded when printed on the smooth paper for printing having low water absorbing capacity.

A moisturizing agent of the present invention contains at least one selected from (1) a liquid medium composed of water, (2) a liquid medium whose main component is water, (3) a liquid medium whose main components are water and a liquid component which has a higher boiling point than that of water and is a liquid at 25° C., and (4) a liquid medium containing the same components as a recording ink, the content of the solid component being a solid at 25° C. in the liquid medium is less than that of the recording ink. The recording ink described in (4) is a recording ink commonly used in inkjet recording.

An inkjet recording method according to a first aspect of the present invention includes flying a recording ink by applying an impulse to the recording ink to form an image on a recording medium, wherein the recording ink is a recording ink in an ink media set according to any one of the first aspect and the third aspect of the present invention; and the recording medium is a recording medium in an ink media set according to any one of the fist aspect and the third aspect of the present invention. As a result, the image having the high image density, the low backside density, the good color formation and no bleeding is obtained when printed on the plain paper, and the sharp image close to the printed matter, where the drying speed is enhanced is obtained when printed on the smooth paper for printing having the low water absorbing capacity.

In an inkjet recording method according to a second aspect of the present invention, when inkjet recording is stopped for a long time, a recording ink is replaced with a moisturizing agent, and when inkjet recording is restarted, the moisturizing agent is replaced with the recording ink. The recording ink is a recording ink commonly used in inkjet recording.

In the inkjet recording method according to the third aspect of the present invention, the moisturizing agent according to the present invention is supplied to a capping unit configured to cap a nozzle of a recording head when inkjet recording is stopped for a long time.

In an inkjet recording method according to any one of the second aspect and the third aspect of the present invention, no clogging is caused even when inkjet recording is stopped for a long time.

Here, "when stopped for a long time" means that the nozzle is left stand in a state where the recording is suspended for one day or more in a state where a nozzle is capped with a capping unit.

An inkjet recording method according to a fourth aspect of the present invention includes at least flying a recording ink in an ink media set by applying an impulse to the recording ink to form an image on a recording medium in an ink media set and drying the image formed on the recording medium, wherein the ink media set is an ink media set according to any one of the fourth aspect and the fifth aspect of the present invention.

An ink record of the present invention contains an image formed on the recording medium using the recording ink of the present invention, wherein the recording ink is a recording ink in an ink media set according to any one of the first aspect and the fifth aspect of the present invention; and the recording medium is a recording medium in an ink media set according to any one of the first aspect and the fifth aspect of the present invention.

In the ink record of the present invention, the image having the high image density, the low backside density, the good color formation and no bleeding is obtained particularly when printed on the plain paper, and the sharp image close to the printed matter, where the drying speed is enhanced is retained on the recording medium when printed on the smooth paper for printing having the low water absorbing capacity.

DESCRIPTION OF THE PREFERRED EMBODIMENTS

Recording Ink

Figure 1:
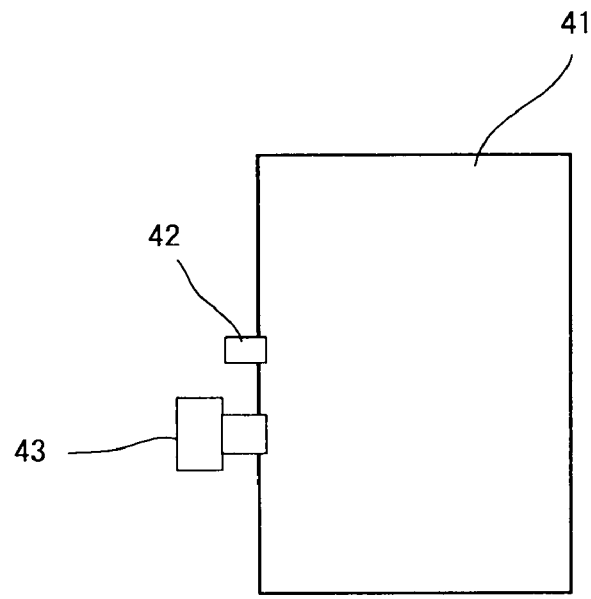
FIG. 1 is a view showing one example of an ink cartridge of the present invention.

The recording ink of the present invention contains at least a solid component which contains a colorant and a resin and is a solid at 25° C., a liquid component which has a higher boiling point than that of water and is a liquid at 25° C. and water, and further contains other components if necessary.
<Liquid Component which has a Higher Boiling Point than that of Water and is a Liquid at 25° C.>

The liquid component which has the higher boiling point than that of water and is the liquid at 25° C. is a water-soluble organic solvent having the high boiling points referred to as the so-called wetting agent as a majority, and includes controlling agents of ink physical properties such as penetrating agents and surfactants.

In the present invention, "the total content of a liquid component which has a higher boiling point than that of water and is a liquid at 25° C." represents the total content of a wetting agent, a penetrating agent, and a surfactant.

The total amount of the liquid component which has the higher boiling point than that of water and is the liquid at 25° C. in the recording ink is 20% by mass or less, preferably 15% by mass or less and may be 0% by mass (no addition) in some cases. When the content of the liquid component which has the higher boiling point than that of water and is the liquid at 25° C. is lower, the drying time of the ink is shorter, but the stricter management is required for preventing the clogging due to drying of the nozzle. Using the ink in which the amounts of the added wetting agent and penetrating agent are small, the drying rapidly progresses even on the papers such as offset coated papers which hardly absorb the water, and the image having excellent glossiness is obtained. However, when an ink having a high surface tension in which no surfactant is contained is used, such paper is slowly dried due to the excessively slow infiltration of the ink.

When the content is more than 20% by mass, the drying speed is reduced on the coated papers for printing such as offset coated papers, and the show through is sometimes increased on the plain papers. But, this is absolutely relative, and when the amount of the liquid component which has the higher boiling point than that of water and is the liquid at 25° C. is relatively smaller, the more the drying property is enhanced.

Here, the liquid component which has the higher boiling point than that of water and is the liquid at 25° C. is not particularly limited as long as it is the water-soluble organic solvent having the higher boiling point than that of water, and all are included. The penetrating agent and the surfactant are also included if they have the higher boiling point than that of water and are the liquid at 25° C. In brief, it is aimed that the drying time on the papers such as papers for printing having the low water absorbing capacity is shortened by reducing the amount of the liquid which more hardly dries than water as possible. Generally, it has been believed that the inkjet printing on the paper is dried by permeation drying and the ink evaporation scarcely contributes to the drying. However, the results in this time suggest the contribution of the evaporation in the drying for a relatively short time. Details thereof are unknown, but a speculated mechanism will be described later. When offset paper whose water absorbing capacity is low is used, an ink having low permeability and high surface tension is dried slowly as compared to an ink having low surface tension. In the present invention, it is considered that the contribution of the amount of a wetting agent to drying time markedly takes effect when the ink adhesion amount per unit area is relatively large.

Wetting Agent (Water-Soluble Organic Solvent Having High Boiling Point)

The so-called wetting agent which is a representative of the liquid component which has the higher boiling point than that of water and is the liquid at 25° C. is not particularly limited as long as it is the liquid at 25° C., can be appropriately selected depending on the purpose, and includes, for example, polyvalent alcohols, polyvalent alcohol alkyl ethers, polyvalent alcohol aryl ethers, nitrogen-containing heterocyclic compounds, amides, amines, sulfur-containing compounds, propylene carbonate and ethylene carbonate. These may be use alone or in combination of two or more.

The polyvalent alcohols include, for example, ethylene glycol, diethylene glycol, triethylene glycol, polyethylene glycol, dipropylene glycol, tripropylene glycol, polypropylene glycol, 1,3-propanediol, 1,3-butanediol, 2,3-butanediol, 1,4-butanediol, 3-methyl-1,3-butanediol, 1,5-pentanediol, 1,6-hexanediol, 2-methyl-2,4-pentanediol, tetraethylene glycol, glycerine, 1,2,6-hexanetriol, 1,2,4-butanetriol, 1,2,3-butanetriol and petriol.

The polyvalent alcohol alkyl ethers include, for example, ethylene glycol monoethyl ether, ethylene glycol monobutyl ether, ethylene glycol monomethyl ether, diethylene glycol monoethyl ether, diethylene glycol monobutyl ether, tetraethylene glycol monomethyl ether and propylene glycol monoethyl ether.

The polyvalent alcohol aryl ethers includes, for example, ethylene glycol monophenyl ether and ethylene glycol monobenzyl ether.

The nitrogen-containing heterocyclic compounds include, for example, N-methyl-2-pyrrolidone, N-hydroxyethyl-2-pyrrolidone, 2-pyrrolidone, 1,3-dimethylimidazolidinone and ε-caprolactam.

The amides include, for example, formamide, N-methylformamide, and N,N-dimethylformamide.

The amines include, for example, monoethanolamine, diethanolamine, triethanolamine, monoethylamine, diethylamine, and triethylamine.

The sulfur-containing compounds include, for example, dimethylsulfoxide, sulfolane, thiodiethanol and thiodiglycol.

Among them, glycerine, 2-pyrrolidone, diethylene glycol, thiodiethanol, polyethylene glycol, triethylene glycol, 1,2,6-hexanetriol, 1,2,4-butanetriol, petriol, 1,5-pentanediol, N-methyl-2-pyrrolidone, 1,3-butanediol and 3-methyl-1,3-butanediol are preferable in terms of spout stability of the ink. Among them, glycerine, 1,3-butanediol, 3-methyl-1,3-butanediol and 2-pyrrolidone are particularly preferable.

By making the total amount of the liquid component which has the higher boiling point than that of water and is the liquid at 25° C. containing the wetting agent as a major ingredient 20% by mass or less and preferably 15% by mass or less, it is possible to enhance the drying property. Components which are added if necessary, are the liquid at 25° C. and are other than the water and the wetting agent include penetrating agents and surfactants described below. Here, the liquid at 25° C. means the liquid at ambient temperature and atmospheric pressure (25° C., 1 atm), an environment in which the inkjet recording is typically used. But, since the amount of the components to be added other than the wetting agent is small, the total amount of the liquid component which has the higher boiling point than that of water and is the liquid at 25° C. may be approximated to the amount of the wetting agent to be added.

When an auxiliary means such as heating and air sending means is provided to the drying of the ink, it is possible to increase the content of the wetting agent up to about 30% by mass.

Meanwhile, when the amount of the wetting agent to be added is less than 10% by mass, if a carriage is operated for a long time by printing other colors except for one color, the nozzle for the not printed color is dried to sometimes cause nozzle clogging. At that time, it is necessary to perform an empty jet frequently on the place other than the recording medium, it is preferable to perform the empty jet at least once every printing on an A4 size sheet, and it is more preferable to perform the empty jet every one line printing. It is also one means for preventing the drying of the nozzle to supply the water in the cap which caps the nozzle when stopped for a long time.

This way, it is preferable to keep reliability of the spout by making a maintenance mechanism mechanically complete for the ink having the small amount of the wetting agent.

But, in the polymer emulsion containing the water insoluble or water hardly soluble color material in polymer fine particle which is the colorant used in the present invention, the spout is relatively stable although the concentration of the wetting agent is low, and thus, the specific maintenance mechanism as the above is not necessarily required.

Permeating Agent

The penetrating agent is calculated by including in the liquid component which has the higher boiling point than that of water and is the liquid at 25° C. if the penetrating agent has the higher boiling point than that of water and is the liquid at 25° C. As described above, when the amount of the penetrating agent to be added is small, the amount may be omitted in the calculation.

As the penetrating agent, polyol compounds having 8 to 11 carbon atoms or glycol ether compounds are used. At least any of these polyol compounds and glycol ether compounds accelerates a penetrating speed in the paper, has an effect to prevent the bleeding, and is the partially water-soluble compound having a solubility of 0.1% by mass to 4.5% by mass in water at 25° C.

The polyol compounds having 8 to 11 carbon atoms include, for example, 2-ethyl-1,3-hexanediol and 2,2,4-trimethyl-1,3-pentanediol.

The glycol ether compounds include, for example, polyvalent alcohol alkyl ether compounds and polyvalent alcohol aryl ether compounds.

The polyvalent alcohol alkyl ether compounds include, for example, ethylene glycol monoethyl ether, ethylene glycol monobutyl ether, ethylene glycol monomethyl ether, diethylene glycol monoethyl ether, diethylene glycol monobutyl ether, tetraethylene glycol monomethyl ether and propylene glycol monoethyl ether.

The polyvalent alcohol aryl ether compounds includes, for example, ethylene glycol monophenyl ether and ethylene glycol monobenzyl ether.

The content of the penetrating agent as the liquid component which has the higher boiling point than that of water and is the liquid at 25° C. in the recording ink is preferably 0% by mass to 10% by mass and more preferably 0.5% by mass to 5% by mass. But, the total content of the liquid component which has the higher boiling point than that of water and is the liquid at 25° C. is 20% by mass or less and preferably 15% by mass or less.

Surfactants

The surfactant is calculated by including in the liquid component which has the higher boiling point than that of water and is the liquid at 25° C. if the surfactant is added if necessary, has the higher boiling point than that of water and is the liquid at 25° C. As described above, when the amount of the surfactant to be added is small, its amount may be omitted in the calculation.

The surfactant is not particularly limited, and can be appropriately selected from surfactants which do not impair the dispersion stability by a type of the colorant and a combination with the wetting agent and the penetrating agent depending on the purpose. In particular, when printed on the paper for printing, those having the low surface tension and a high leveling property are preferable, and at least one selected from silicone surfactants and fluorine surfactants is suitable. Among them, the fluorine surfactant is particularly preferable.

When printed on the non-porous substrate such as polyester sheets, if the surface tension of the ink is lowered by adding the surfactant, the wettability and the leveling property to the recording medium are enhanced to give the good effect to the drying property and the image uniformity.

In the fluorine surfactant, the number of carbon atoms substituted with fluorine atoms is preferably 2 to 16, and more preferably 4 to 16. When the number of carbon atoms substituted with fluorine atoms is less than two, the effect of fluorine is not obtained in some cases. When it is more than 16, the problem occurs in storage stability of the ink.

The fluorine surfactants include, for example, perfluoroalkyl sulfonic acid compounds, perfluoroalkyl carboxylic compounds, perfluoroalkyl phosphate ester compounds, perfluoroalkyl ethylene oxide adducts and polyoxyalkylene ether polymer compounds having perfluoroalkyl ether group in side chain. Among them, the polyoxyalkylene ether polymer compounds having perfluoroalkyl ether group in side chain are particularly preferable because its foaming property is low.

The perfluoroalkyl sulfonic acid compounds include, for example, perfluoroalkyl sulfonic acid and perfluoroalkyl sulfonate salts.

The perfluoroalkyl carboxylic compounds include, for example, perfluoroalkyl carboxylic acid and perfluoroalkyl carboxylate salts.

The perfluoroalkyl phosphate ester compounds include, for example, perfluoroalkyl phosphate ester and salts of perfluoroalkyl phosphate ester.

The polyoxyalkylene ether polymer compounds having perfluoroalkyl ether group in side chain include polyoxyalkylene ether polymers having perfluoroalkyl ether group in side chain, sulfate ester of polyoxyalkylene ether polymers having perfluoroalkyl ether group in side chain and salts of polyoxyalkylene ether polymers having perfluoroalkyl ether group in side chain.

Counterions of the salts in these fluorine surfactants include Li, Na, K, $NH_4$, $NH_3CH_2CH_2OH$, $NH_2(CH_2CH_2OH)_2$, $NH(CH_2CH_2OH)_3$.

As the fluorine surfactants, those appropriately synthesized may be used or commercially available ones may be used.

The commercially available products include Surflon S-111, S-112, S-113, S-121, S-131, S-132, S-141, S-145 (supplied from Asahi Glass Co., Ltd.), Fullard FC-93, FC-95, FC-98, FC-129, FC-135, FC-170C, FC-430, FC-431 (supplied from Sumitomo 3M Ltd.), Megafac F-470, F1405, F-474 (Dainippon Ink And Chemicals, Incorporated), Zonyl TBS, FSP, FSA, FSN-100, FSN, FSO-100, FSO, FS-300, UR (supplied from DuPont), FT-110, FT-250, FT-251, FT-400S, FT-150, FT-400SW (Neos Corporation) and PF-151N (Omnova Inc.). Among them, FT-110, FT-250, FT-251, FT-400S, FT-150, FT-400SW supplied from Neos Corporation and PF-151N supplied from Omnova Inc. are particularly preferable in terms of good printing quality, particularly remarkably enhancing the color forming property and the evenly staining property for the paper.

(1) Anionic Fluorine Surfactants

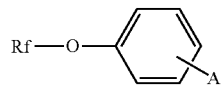

In the above structural formula, Rf represents a mixture of fluorine containing hydrophobic groups represented by the following structural formulae, and A represents $—SO_3X$, $—COOX$ or $—PO_3X$ (but X is counteranion, specifically includes hydrogen atom, Li, Na, K, $NH_4$, $NH_3CH_2CH_2OH$, $NH_2(CH_2CH_2OH)_2$, or $NH(CH_2CH_2OH)_3$).

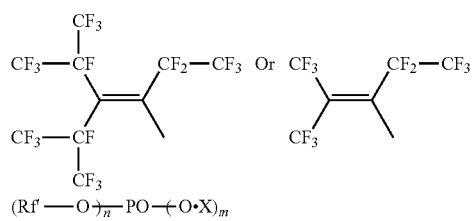

But, in the above structural formula, Rf represents a fluorine containing group represented by the following structural formula. X is the same defined as the above, n represents an integer of 1 or 2, and m represents 2-n.

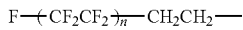

But, n represents an integer of 3 to 10.

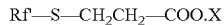

In the above structural formula, Rf and X are the same as defined above.

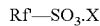

In the above structural formula, Rf and X are the same as defined above.

(2) Nonionic Fluorine Surfactants

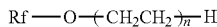

In the above structural formula, Rf is the same as defined above, and n represents an integer of 5 to 20.

In the above general formula, Rf' is the same as defined above, and n represents an integer of 1 to 40.

(3) Ampholytic Fluorine Surfactant

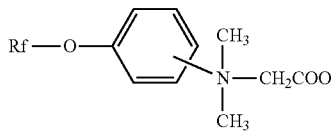

In the above general formula, Rf is the same as defined above (4) Oligomer Type Fluorine Surfactant

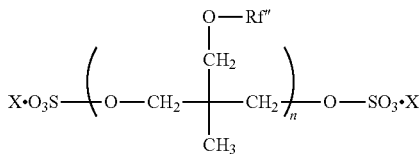

In the above general formula, Rf' represents the fluorine containing group represented by the following structural formula, n represents an integer of 0 to 10, and X is the same as defined above.

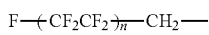

But, n represents an integer of 1 to 4.

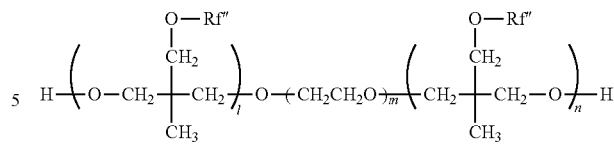

Rf' is the same as defined above, l, m, and n represent integers of 0 to 10.

The silicone surfactants are not particularly limited, can be appropriately selected depending on the purpose, are preferably those which are not decomposed at high pH, and include, for example, polydimethylsiloxane with modified side chain, polydimethylsiloxane with modified both ends, polydimethylsiloxane with modified one end and polydimethylsiloxane with modified side chain and both ends. As a modifying group, those having polyoxyethylene group or polyoxyethylene polyoxypropylene group are particularly preferable because they exhibit good natures as aqueous surfactants.

As such a surfactant, those appropriately synthesized may be used, or commercially available products may be used.

The commercially available products can be easily obtained from, for example, BYK Chemie GmbH, Shin-Etsu Silicones Co., Ltd., and Dow Corning Tray Co., Ltd.

The polyether modified silicone surfactant is not particularly limited, can be appropriately selected depending on the purpose, and includes, for example, compounds obtained by introducing a polyalkylene oxide structure represented by the following structural formula into Si portion side chain of dimethyl polysiloxane.

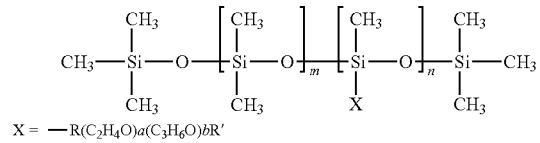

But, in the above structural formula, m, n, a and b represent integers. R and R' represent alkyl and alkylene groups.

As the polyether modified silicone compounds, the commercially available products can be used, and for example, KF-618, KF-642 and KF643 (supplied from Shin-Etsu Chemical Co., Ltd.) are included.

Anionic surfactants, nonionic surfactants and ampholytic surfactants can also be used in addition to the fluorine surfactants and silicone surfactants.

The anionic surfactants include, for example, polyoxyethylene alkyl ether acetate salts, dodecyl benzene sulfonate salts, succinate ester sulfonate salts, laurate salts and salts of polyoxyethylene alkyl ether sulfate.

The nonionic surfactants include, for example, acetylene glycol based surfactants, polyoxyethylene alkyl ether, polyoxyethylene alkyl phenyl ether, polyoxyethylene alkyl ester and polyoxyethylene sorbitan fatty acid ester.

The acetylene glycol based surfactants include, for example, 2,4,7,9-tetramethyl-5-decine-4,7-diol, 3,6-dimethyl-4-octine-3,6-diol and 3,5-dimethyl-1-hexine-3-ol. The acetylene glycol based surfactants include Surfynol 104, 82, 465, 485 and TG supplied from Air Products (USA) as the commercially available products.

The ampholytic surfactants include, for example, lauryl amino propionate salts, lauryl dimethylbetaine, stearyl dimethylbetaine, lauryl dihydroxyethylbetaine, lauryl dimethylamine oxide, myristyl dimethylamine oxide, stearyl dimethylamine oxide, dihydroxyethyl laurylamine oxide, polyoxyethylene palm oil alkyl dimethylamine oxide, dimethyl alkyl (palm) betaine and dimethyllauryl betaine.

As such a surfactant, the commercially available products can be easily obtained from Nikko Chemicals Co., Ltd., Nippon Emulsion Co., Ltd., Nippon Shokubai Co., Ltd., Toho Chemical Industry Co., Ltd., Kao Corporation, Adeka Co., Ltd., Lion Corporation, Aoki Oil Industrial Co., Ltd., and Sanyo Chemical Industries, Ltd.

The surfactants are not limited thereto, and may be used alone or in mixture of two or more. When a single surfactant is not easily dissolved in the recording ink, the surfactant can be solubilized to be present stably by mixing with another surfactant.

Among these surfactants, those represented by the following structural formulae (1) to (5) are suitable.

$$R^1-O-(CH_2CH_2O)_h-R^2 \qquad \text{Structural Formula (1)}$$

In the structural formula (1), $R^1$ represents a branched or unbranched C6-14 alkyl group, or a branched or unbranched C6-14 perfluoroalkyl group; $R^2$ represents a hydrogen atom or a branched or unbranched C1-4 alkyl group; and h represents an integer of 5 to 20.

$$R^1-COO-(CH_2CH_2O)_h-R^2 \qquad \text{Structural Formula (2)}$$

In the structural formula (2), $R^1$ represents a branched or unbranched C6-14 alkyl group; $R^2$ represents a hydrogen atom or a branched or unbranched C1-4 alkyl group; and h represents an integer of 5 to 20.

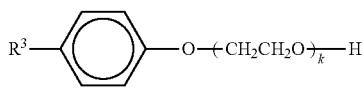

Structural Formula (3)

In the structural formula (3), $R^3$ represents a hydrocarbon group and, for example, includes a branched or unbranched C6-14 alkyl group; and k represents an integer of 5 to 20.

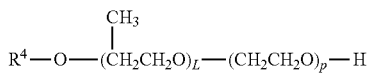

Structural Formula (4)

In the structural formula (4), $R^4$ represents a hydrocarbon group and for example represents a branched or unbranched C6-14 alkyl group; L represents an integer of 5 to 10; and p represents an integer of 5 to 20. A propylene glycol chain and an ethylene glycol chain may undergo the block polymerization or the random polymerization.

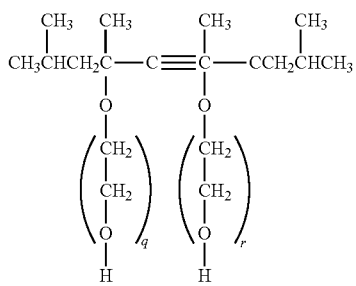

Structural Formula (5)

In the structural formula (5), q and p represent integers of 5 to 20.

The content of the surfactant in the recording ink is preferably 0.01% by mass to 3.0% by mass and more preferably 0.5% by mass to 2% by mass. But, the total content of the liquid component which has the higher boiling point than that of water and is the liquid at 25° C. is 20% by mass or less and preferably 15% by mass or less.

When the content is less than 0.01% by mass, the effect of the added surfactant is sometimes lost. When it exceeds 3.0% by mass, the permeability in the recording medium is unnecessarily increased, and the image density is reduced and the show through occurs in some cases.

<Solid Component which Contains Colorant and Resin and is Solid at 25° C.>

The total content of the resin component in the solid component is 40% by mass or more, preferably 70% by mass or more, more preferably 80% by mass or more, and preferably 95% by mass or less relative to the solid component which contains colorant and resin and which is solid at 25° C. When the content is less than 40% by mass, the fixing property and the glossy feeling of the colorant are sometimes inferior. Meanwhile, in order to increase the image density to some extent, the content of the colorant is necessary to be 5% by mass or more relative to the total amount of the solid component.

This way, the content of the resin component in the solid component is increased for enhancing the fixing property, the image sharpness and the glossiness.

Here, the resin component means a polymer solid component other than the colorant molecule having a chromophoric group and includes the resins which enfold the colorant or disperse the colorant. Also the resin emulsion added if necessary is of curse included. Namely, when the total amount of resin components is calculated in the case where "the total content of resin components in the solid component relative to the total content of the solid component", a resin containing colorant molecule (for example, pigment molecule) having a chromophoric group in the colorant and a resin in which the colorant is dispersed are included in the content of resin components.

The solid at 25° C. means the solid at ambient temperature and atmospheric pressure (25° C., 1 atm), an environment in which the inkjet recording is typically used.

In the present invention, "the total content of a solid component which contains a colorant and a resin and is a solid at 25° C." represents the total content of the colorant and the resin.

Resins

The resin is not particularly limited as long as it is the solid at 25° C., can be appropriately selected depending on the purpose, and a resin fine particle is preferable in terms of being capable of making the amount of the resin to be added large.

As the resin fine particle, one present as the resin emulsion in which the resin fine particles are dispersed as a continuous phase in water is used upon production of the ink. A dispersant such as surfactant may be contained in the resin emulsion if necessary.

The content of the resin fine particles as the dispersion phase (the content of the resin fine particles in the resin emulsion and not the content in the recording ink after the production) is preferably 10% by mass to 70% by mass generally.

Particularly considering the use for the inkjet recording apparatus, for a particle diameter of the resin fine particle, a volume average particle diameter is preferably 10 nm to 1,000 nm, more preferably 100 nm to 300 nm and still more preferably 50 nm to 200 nm. This is the particle diameter in the resin emulsion, and in the stable recording ink, the particle diameter in the resin emulsion is not largely different from the particle diameter of the resin fine particle in the recording ink. The larger the volume average particle diameter is, the larger amount of the emulsion can be added. When the volume average particle diameter is less than 100 nm, the amount of the emulsion to be added can not be sometimes increased. When it exceeds 300 nm, the reliability is sometimes reduced. But, the emulsion having the particle diameter in the range other than the above can not be always used. This is a general tendency not depending on the type of the emulsion.

In particular, to obtain the high image quality as the high resin fine particle density on the non-porous medium, the particle diameter of the resin fine particle is preferably 50 nm to 200 nm.

Here, the volume average particle diameter can be measured using a particle size analyzer (Microtrack Model UPA9340 supplied from Nikkiso Co., Ltd.)

Specifically, an aqueous solution of the emulsion is diluted within the signal level optimal range and measured under the condition of transparency-YES, tentatively Reflective Index 1.49, Partial Density 1.19, Spherical Particles-YES, and medium-water. Here, a value of 50% was rendered the volume average particle diameter.

It is preferable that the water dispersible resin does not fluidize the water dispersible colorant on the surface of the non-porous substrate such as polyester film (prevents the image density bias [beading]), and has an action to fix onto the recording medium or the action to help fixing, and forms a film at ambient temperature to enhance the fixing property of the colorant. Therefor, it is preferable that a minimum film forming temperature (MFT) of the water dispersible resin is equal to or less than the ambient temperature, and it is preferably 20° C. or below.

The resin fine particle (water dispersible resin) in the dispersion phase is not particularly limited, can be appropriately selected depending on the purpose, and includes, for example condensation based synthetic resins, addition based synthetic resins and natural polymer compounds. The condensation based synthetic resins include, for example, polyester resins, polyurethane resins, polyepoxy resins, polyamide resins, polyether resins and silicon resins. The addition based synthetic resins include, for example, polyolefin resins, polystyrene based resins, polyvinyl alcohol based resins, polyvinyl ester based resins, polyacrylic acid based resins and unsaturated carboxylic acid based resins. The natural polymer compounds include, for example, celluloses, rosins and natural rubbers.

The water dispersible resin may be used as a homopolymer or may be used as a complex based resin as a copolymer. Any of a single phase structure type, a core shell type and a power feed type of the emulsions can be used.

As the water dispersible resin, the resin itself having a hydrophilic group and the self-dispersibility and the resin itself not having the hydrophilic group and having the dispersibility imparted by the surfactant or the resin having the hydrophilic group can be used. Among them, the emulsion of the resin particles obtained by emulsification polymerization and suspension polymerization of an ionomer or an unsaturated monomer of the polyester resin or the polyurethane resin is optimal. The acrylic resin and the acryl silicone resin emulsion are also optimal. In the case of the emulsification polymerization of the unsaturated monomer, the reaction is performed in water in which the unsaturated monomer, a polymerization initiator, and the surfactant, a chain transfer agent, a chelating agent and a pH adjuster have been added, and thus, the water dispersible resin can be easily obtained and the objective nature is easily made because a resin constitution is easily changed.

As the unsaturated monomer, for example, unsaturated carboxylic acids, (meth)acrylic acid ester monomers, (meth)acrylic acid amide monomers, aromatic vinyl monomers, vinyl cyan compound monomers, vinyl monomers, allyl compound monomers, olefin monomers, diene monomers, oligomers having unsaturated carbon atoms and the like can be used alone or in combination of two or more. By combining these monomers, it is possible to flexibly modify the nature, and by performing the polymerization reaction and the graft reaction using the oligomer type polymerization initiator, it is also possible to modify the property of the resin.

The unsaturated carboxylic acids include, for example, acrylic acid, methacrylic acid, itaconic acid, fumaric acid and maleic acid.

The monofunctional (meth)acrylic acid esters include, for example, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloxyethyltrimethyl ammonium salts, 3-methacryloxypropyltrimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate and acryloxyethyltrimethyl ammonium salts.

The polyfunctional (meth)acrylic acid esters include, for example, ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1.6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane, trimethylol propane triacrylate, trimethylol ethane triacrylate, tetramethylol propane triacrylate, ditrimethylol tetraacrylate, tetramethylol methane tetraacrylate, pentaerythritol tetraacrylate and dipentaerythritol hexaacrylate.

The (meth)acrylic acid amide monomers include, for example, acrylamide, methacrylamide, N,N-dimethylacrylamide, methylenebisacrylamide and 2-acrylamide-2-methylpropane sulfonic acid.

The aromatic vinyl monomers include, for example, styrene, α-methylstyrene, vinyl toluene, 4-t-butylstyrene, chlorostyrene, vinyl anisole, vinyl naphthalene and divinyl benzene.

The vinyl cyan compound monomers include, for example, acrylonitrile and methacrylonitrile.

The allyl compound monomers include, for example, allylsulfonic acid and salts thereof, allylamine, allyl chloride, diallylamine, and diallyldimethyl ammonium salts.

The olefin monomers include, for example, ethylene and propylene.

The diene monomers include, for example, butadiene and chloroprene.

The vinyl monomers include, for example, vinyl acetate, vinylidene chloride, vinyl chloride, vinyl ether, vinyl ketone, vinyl pyrrolidone, vinylsulfonic acid and salts thereof, vinyl trimethoxysilane and vinyl triethoxysilane.

The oligomers having unsaturated carbon atoms include, for example, styrene oligomers having methacryloyl group, styrene-acrylonitrile oligomers having methacryloyl group, methyl methacrylate oligomers having methacryloyl group, dimethylsiloxane oligomers having methacryloyl group, and polyester oligomers having acryloyl group.

Since breakdown of the molecular chain due to dispersion breaking and hydrolysis is caused under a strong alkaline or acidic condition, pH of the water dispersible resin is preferably pH 4 to 12, more preferably pH 6 to 11 and still more preferably pH 7 to 9 particularly in terms of miscibility with the water dispersible colorant.

As the resin emulsion, commercially available ones may be used.

The commercially available resin emulsions include, for example, Microgel E-1002, E-5002 (styrene-acrylic resin emulsions, supplied from Nippon Paint Co., Ltd.); Boncoat 4001 (acrylic resin emulsion, supplied from Dainippon Ink And Chemicals, Incorporated); Boncoat 5454 (styrene-acrylic resin emulsions, supplied from Dainippon Ink And Chemicals, Incorporated); SAE-1014 (styrene-acrylic resin emulsions, supplied from Zeon Corporation); Saibinol SK-200 (acrylic resin emulsion, supplied from Saiden Chemical Industry Co., Ltd.); Primal AC-22, AC-61 (acrylic resin emulsion, supplied from Rohm and Haas); Nanocril SBCX-2821, 3689 (acryl silicone-based emulsion, supplied from Toyo Ink MFG Co., Ltd.); and #3070 (methyl methacrylate polymer resin emulsion, supplied from Mikuni Color Ltd.). Among them, acryl silicone emulsion is particularly preferable in terms of good fixing property.

A glass transition temperature of the resin component in the acryl silicone emulsion is preferably 25° C. or below and more preferably 0° C. or below. When the glass transition temperature is higher than 25° C., the resin itself becomes fragile, which causes deterioration of the fixing property. In particular, on the smooth paper for printing which hardly absorb the water, the fixing property is sometimes reduced. But, if the glass transition temperature of the resin component is 25° C. or above, the resin component can not always used.

The glass transition temperature can be measured using a differential scanning calorimeter (supplied from Rigaku Denki K.K.).

Specifically, the temperature of a resin piece obtained by drying the resin emulsion aqueous solution at ambient temperature is raised from around −50° C., and the temperature at which the level was changed was obtained using a Rigaku Denki differential scanning calorimeter.

Colorant

The colorant is not particularly limited as long as it is the solid at 25° C., and any of pigments and dyes can be suitably used.

When the pigment is used for the colorant, it is possible to obtain the ink excellent in light resistance. The pigment is not particularly limited, common pigments for the inkjet are used, and the followings are preferable.

(1) Pigments imparting the hydrophilic group on their surface;
(2) pigments of the polymer emulsion type containing the water insoluble or water hardly soluble color material in polymer particles; and
(3) pigments of the microcapsule type in which the pigment is covered with the resin having the hydrophilic group.

In the pigment of the above (1), the surface is modified so that at least one hydrophilic group is bound to the surface of the pigment directly or via another atomic group. The surface is modified by chemically binding a certain functional group (functional group such as sulfone or carboxyl group) to the surface of the pigment or performing a wet oxidation treatment using any of hypohalous acid or a salt thereof. Among them, the form in which the carboxyl group has been bound onto the surface of the pigment, which is dispersed in water is particularly preferable. Since the surface of the pigment is modified and the carboxyl group is bound, not only the dispersion stability is enhanced but also high printing quality is obtained as well as water resistance of the recording medium after printing is enhanced.

The ink in this form is excellent in redispersibility after drying. Thus, no clogging occurs when the printing is stopped for a long time and the water component in the ink around the nozzle of the inkjet head is evaporated, and the good printing is easily performed by simple cleaning.

The volume average particle diameter of the self-dispersible pigment is preferably 0.01 μm to 0.16 μm in the ink.

For example, as self-dispersible carbon black, those having an ionic property are preferable, and those charged anionically or cationically are suitable.

The anionic hydrophilic group includes, for example, —COOM, —SO$_3$M, —PO$_3$HM, —PO$_3$M$_2$, —SO$_2$NH$_2$ and —SO$_2$NHCOR (but, M represents a hydrogen atom, an alkali metal, ammonium or organic ammonium. R represents an alkyl group having 1 to 12 carbon atoms, a phenyl group which may have substituents or a naphthyl group which may have substituents). Among them, it is preferable to use those in which —COOM or —SO$_3$M has been bound to the surface of the pigment.

"M in the hydrophilic group includes, for example, lithium, sodium and potassium as the alkali metals. The organic ammonium includes, for example, mono- to trimethyl ammonium, mono- to triethyl ammonium, and mono- to trimethanol ammonium. As the method of obtaining the color pigment anionically charged, the method of introducing —COONa onto the surface of the color pigment includes, for example, the method of oxidation-treating the color pigment with sodium hypochlorite, the method by sulfonation and the method of reacting a diazonium salt.

As the cationic hydrophilic group, a quaternary ammonium group is preferable, the quaternary ammonium groups shown below are more preferable, and in the present invention, those in which any of these has been bound onto the carbon black surface are suitable as the color material.

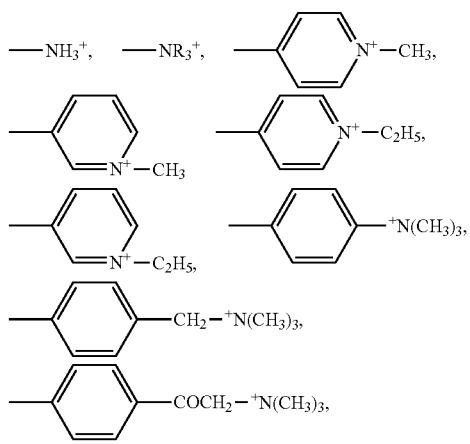

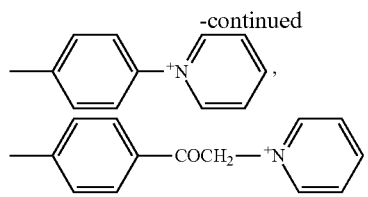

The method for producing the cationic self-dispersible carbon black to which the hydrophilic group has been bound is not particularly limited, can be appropriately selected depending on the purpose, and includes the method of treating the carbon black with 3-amino-N-ethylpyridium bromide as the method of binding an N-ethylpyridyl group represented by the following structural formula.

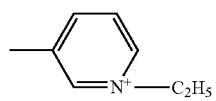

The hydrophilic group may be bound to the surface of the carbon black via the other atomic group. The other atomic group includes, for example, alkyl groups having 1 to 12 carbon atoms, phenyl groups which may have the substituents and naphthyl groups which may have the substituents. Specific examples when the hydrophilic group is bound to the carbon black surface via the other atomic group include, for example, —$C_2H_4COOM$ (M represents an alkali metal or quaternary ammonium), -$PhSO_3M$ (Ph represent a phenyl group, M represents an alkali metal or quaternary ammonium), and —$C_5H_{10}NH_3^+$.

In the pigment of the above (2), the polymer emulsion containing the color material means at least any one of those in which the pigment has been enclosed in the polymer fine particles or those in which the pigment has been adhered onto the surface of the polymer fine particles. For example, those described in JP-A No. 2001-139849 are included.

In this case, it is not necessary that all pigments are enclosed in and/or adhered onto the polymer fine particles, and the pigments may be dispersed in the emulsion in the range in which the effects of the present invention are not impaired.

The "water insoluble or water hardly soluble" means that 10 parts by mass or more of the color material is not dissolved in 100 parts by mass of water at 20° C. The "being dissolved" means that no separation or no precipitation of the color material is visually observed in an aqueous solution surface layer or lower layer.

The polymer which forms the polymer emulsion is not particularly limited, can be appropriately selected depending on the purpose, and includes, for example, vinyl based polymers, polyester based polymers, polyurethane based polymers and polymers disclosed in JP-A No. 2000-53897 and JP-A No. 2001-139849. Among them, the vinyl based polymers and the polyester based polymers are particularly preferable.

The volume average particle diameter of the polymer fine particles (colored fine particles) containing the color material is preferably 0.01 μm to 0.16 μm in the ink.

By the use of the pigment of the above (2), it is possible to obtain the ink excellent in light resistance and fixing property.

The pigment of the above (3) is obtained by covering the pigment with the hydrophilic and water insoluble resin and making a resin layer on the pigment surface hydrophilic to disperse the pigment in water, and includes, for example, those described in JP-A No. 2002-67473.

By the use of the pigment of the above (3), it is possible to obtain the ink excellent in light resistance and fixing property.

The pigments of the above (2) and (3) are thought to be similar in terms of integrating the pigment and the resin, and any of them can be suitably used in the present invention.

When the pigments of the above (1), (2) and (3) are used at a composition ratio of the ink of the present invention, the enhancement of the drying property and high color tone are particularly exerted.

A color forming component of the colorant is not particularly limited, can be appropriately selected depending on the purpose, and for example may be any of inorganic pigments and organic pigments.

The inorganic pigments include, for example, titanium oxide, iron oxide, calcium carbonate, barium sulfate, aluminium hydroxide, barium yellow, cadmium red, chromium yellow, and carbon black. Among them, carbon black is preferable. The carbon black includes those produced by the publicly known methods such as a contact method, a furnace method and a thermal method.

The organic pigments include, for example, azo pigments, polycyclic pigments, dye chelates, nitro pigments, nitroso pigments, and aniline black. Among them, azo pigments and polycyclic pigments are preferable. The azo pigments include, for example, azo lakes, insoluble azo pigments, condensed azo pigments, and chelate azo pigments. The polycyclic pigments include phthalocyanine pigments, perylene pigments, perinone pigments, anthraquinone pigments, quinacridone pigments, dioxadine pigments, indigoid pigments, thioindigoid pigments, isoindolinone pigments and quinophtalone pigments. The dye chelates include, for example, basic dye chelates and acidic dye chelates.

The color of the pigments is not particularly limited, can be appropriately selected depending on the purpose, and includes those for monochrome or color. These may be used alone or in combination of two or more.

Those for the monochrome include, for example carbon black (C.I. pigment black 7) such as furnace black, lamp black, acetylene black and channel black, metals such as copper, iron (C.I. pigment black 11) and titanium oxide, and organic pigments such as aniline black (C.I. pigment black 1).

As the ones for color printing, ones for the yellow ink include, for example, C.I. pigment yellow 1 (fast yellow G), 3, 12 (disazo yellow AAA), 13, 14, 17, 23, 24, 34, 35, 37, 42 (yellow iron oxide), 53, 55, 74, 81, 83 (disazo yellow HR), 95, 97, 98, 100, 101, 104, 108, 109, 110, 117, 120, 128, 138, 150, and 153.

Ones for the magenta ink include, for example, C.I. pigment red 1, 2, 3, 5, 17, 22 (brilliant fast scarlet), 23, 31, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 92, 101 (colcothar), 104, 105, 106, 108 (cadmium red), 112, 114, 122 (dimethyl quinacridone), 123, 146, 149, 166, 168, 170, 172, 177, 178, 179, 185, 190, 193, 209 and 219.

Ones for the cyan ink include, for example, C.I. pigment blue 1, 2, 15 (copper phthalocyanine blue R), 15:1, 15:2, 15:3 (phthalocyanine blue G), 15:4, 15:6 (phthalocyanine blue E), 16, 17:1, 56, 60, and 63.

Intermediumte colors for red, green and blue include C.I. pigment red 177, 194, 224, C.I. pigment orange 43, C.I. pigment violet 3, 19, 23, 37, C.I. pigment green 7 and 36.

When the dye is used as the colorant, it is possible to obtain the ink excellent in color tone. The dye includes, for example, water soluble dyes, oil soluble dyes and dispersible dyes.

The water soluble dyes are the dyes classified into acidic dyes, direct dyes, basic dyes, reactive dyes and edible dyes in color index, and preferably the dyes excellent in water resistance and light resistance are used.

The acidic dyes and the edible dyes include, for example, C.I. acid yellow 17, 23, 42, 44, 79, 142; C.I. acid red 1, 8, 13, 14, 18, 26, 27, 35, 37, 42, 52, 82, 87, 89, 92, 97, 106, 111, 114, 115, 134, 186, 249, 254, 289; C.I. acid blue 9, 29, 45, 92, 249; C.I. acid black 1, 2, 7, 24, 26, 94; C.I. food yellow 3, 4; C.I. food red 7, 9, 14; C.I. food black 1, 2

The direct dyes include, for example, C.I. direct yellow 1, 12, 24, 26, 33, 44, 50, 86, 120, 132, 142, 144; C.I. direct red 1, 4, 9, 13, 17, 20, 28, 31, 39, 80, 81, 83, 89, 225, 227; C.I. direct orange 26, 29, 62, 102; C.I. direct blue 1, 2, 6, 15, 22, 25, 71, 76, 79, 86, 87, 90, 98, 163, 165, 199, 202; C.I. direct black 19, 22, 32, 38, 51, 56, 71, 74, 75, 77, 154, 168, 171.

The basic dyes include, for example, C.I. basic yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91; C.I. basic red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112; C.I. basic blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; C.I. basic black 2, 8.

The reactive dyes include, for example, C.I. reactive black 3, 4, 7, 11, 12, 17; C.I. reactive yellow 1, 5, 11, 13, 14, 20, 21, 22, 25, 40, 47, 51, 55, 65, 67; C.I. reactive red 1, 14, 17, 25, 26, 32, 37, 44, 46, 55, 60, 66, 74, 79, 96, 97; C.I. reactive blue 1, 2, 7, 14, 15, 23, 32, 35, 38, 41, 63, 80, 95.

The amount of the resin component is 40% by mass to 95% by mass and preferably 70% by mass to 95% by mass relative to the total amount of the solid component (e.g., the total amount of the resin and the colorant). Therefore, the content of the colorant is preferably 60% by mass or less and preferably 30% by mass or less. The resin component calculated here includes the resin enclosing colorant molecule (e.g. pigment molecule) having chromophoric group in the colorant. That is, in total solid content=resin+colorant, the percentage of the total resin amount including the resin which encloses colorant molecule (e.g. pigment molecule) having chromophoric group in the colorant is meant to be 40% by mass or more.

The total amount of the solid component (total solid content of the resin and the colorant) is 20% by mass or more, preferably 20% by mass to 60% by mass and more preferably 20% by mass to 30% by mass. When the total solid content exceeds 60% by mass, the viscosity becomes high and the printing becomes difficult in the current apparatus, but it is not impossible to use by employing various measures as in the present invention. But, it is preferable that the solid content is more abundant for preventing the bleeding. As described later, the solid content can not be increased so much because of the combination with the wetting agent. Meanwhile, when the total solid content is less than 20% by mass, in conjunction with the wetting agent in a small amount, the viscosity becomes too low, and the image is sometimes inferior in sharpness.

However, to increase the drying property of the ink relative to a recording medium having low water absorbing capacity, it is effective to set a small amount of the wetting agent in the recording ink. The content of solid components in the ink and the resin component ratio are not necessarily prerequisites to improve the drying property. Since the reliability of the ink may degrade when the content of solid components is largely increased, the content of the wetting agent or the content of the liquid component which is a liquid at 25° C. can be set to 20% by mass or less, and the content of solid components can be restrained to near 10% by mass when recording information or an image on a recording medium having small water absorbing capacity and the drying property and reliability are emphasized. To enhance the drying property of the ink, it is more effective to set the amount of the wetting agent to 10% by mass or less.

The other components are not particularly limited, can be appropriately selected if necessary, and include anti-foaming agents, preservatives/anti-fungal agents, antirusts, pH adjusters, specific resistance adjusters, antioxidants, ultraviolet ray absorbers, oxygen absorbers, photo stabilizers and viscosity adjusters.

The anti-foaming agent is not particularly limited, can be appropriately selected depending on the purpose, and suitably includes, for example, silicone based anti-foaming agents, polyether based anti-foaming agents and fatty acid ester based anti-foaming agents. These may be used alone or in combination of two or more. Among them, the silicone based anti-foaming agent is preferable in terms of being excellent in foam breaking effect.

The silicone based anti-foaming agent includes, for example, oil type silicone anti-foaming agents, compound type silicone anti-foaming agents, self-emulsification type silicone anti-foaming agents, emulsion type silicone anti-foaming agents and modified silicone anti-foaming agents. The modified silicone anti-foaming agents include, for example, amino modified silicone anti-foaming agents, carbinol modified silicone anti-foaming agents, methacryl modified silicone anti-foaming agents, polyether modified silicone anti-foaming agents, alkyl modified silicone anti-foaming agents, higher fatty acid ester modified silicone anti-foaming agents and alkylene oxide modified silicone anti-foaming agents. Among them, considering the use for the recording ink which is the water-based medium, the self emulsification type silicone anti-foaming agent and the emulsion type silicone anti-foaming agent are preferable.

As the anti-foaming agent, commercially available products may be used. The commercially available products include silicone anti-foaming agents (KS508, KS531, KM72, KM85) supplied from Shin-Etsu Chemical Co., Ltd., silicone anti-foaming agents (Q2-3183A, SH5510) supplied from Dow Corning Tray Co., Ltd., silicone anti-foaming agents (SAG30) supplied from Nippon Unicar Co., Ltd., and anti-foaming agents (Adekanate series) supplied from Asahi Denka Co., Ltd.

The content of the anti-foaming agent in the recording ink is not particularly limited, can be appropriately selected depending on the purpose, and is preferably 0.001% by mass to 3% by mass and more preferably 0.05% by mass to 0.5% by mass.

The preservatives/anti-fungal agents include, for example, 1,2-benzisothiazoline-3-one, sodium dehydroacetate, sodium sorbate, sodium 2-pyridinethiol-2-oxide, sodium benzoate and sodium pentachlorophenol.

As the specific resistance adjusters, by containing inorganic salts, e.g., alkali metal halide or halogenated ammonium (e.g., lithium chloride, ammonium chloride, sodium chloride), it is possible to prepare a recording liquid used for the inkjet recording method in which the recording ink is electrically charged.

The pH adjuster is particularly limited as long as it can adjust pH to a desired value without harmfully affecting the prepared recording ink, can be appropriately selected depending on the purpose, and includes alcohol amines, alkali metal hydroxide, ammonium hydroxide, phosphonium hydroxide and alkali metal carbonate salts.

The alcohol amines include, for example, diethanolamine, triethanolamine and 2-amino-2-ethyl-1,3-propanediol.

The hydroxide of alkali metal elements includes, for example, lithium hydroxide, sodium hydroxide and potassium hydroxide.

The hydroxide of ammonium includes, for example, ammonium hydroxide, quaternary ammonium hydroxide and quaternary phosphonium hydroxide.

The carbonate salts of alkali metals include, for example, lithium carbonate, sodium carbonate and potassium carbonate.

The antirusts include, for example, acidic sulfite salts, sodium thiosulfate, ammonium thiodiglycolate, diisopropylammonium nitrate, pentaerythritol tetranitrate and cyclohexylammonium nitrate.

The antioxidants include, for example, phenol based antioxidants (including hindered phenol based antioxidants), amine based antioxidants, sulfur based antioxidants and phosphorous based antioxidants.

The phenol based antioxidants (including hindered phenol based antioxidants) include, for example, butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis(1,1-dimethyl-2-[β-(3-tert-butyl-4-hydroxy-5-methylphenyl)propionyloxy]ethyl]2,4,8,10-tetraixaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene and tetraxis[methylene-3-(3',5'-di-tert-butyl-4-hydroxyphenyl)propionate]methane.

The amine based antioxidants include, for example, phenyl-β-naphthylamine, α-naphthylamine, N,N'-di-sec-butyl-p-phenylenediamine, phenothiazine, N,N'-diphenyl-p-phenylenediamine, 2,6-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetraxis[methylene-3-(3,5-di-tert-butyl-4-dihydroxyphenyl)propionate]methane and 1,1,3-tris(3-methyl-4-hydroxy-5-tert-butylphenyl)butane.

The sulfur based antioxidants include, for example, dilauryl 3,3'-thiodipropionate, distearyl thiodipropionate, lauryl stearyl thiodipropionate, dimyristyl 3,3'-thiodipropionate, distearyl β,β'-thiodipropionate, 2-mercaptobenzimidazole and dilauryl sulfite.

The phosphorous based antioxidants include triphenyl phosphite, octadecyl phosphite, triisodecyl phosphite, trilauryl trithiophosphite, and trinonylphenyl phosphite.

The ultraviolet ray absorbers include, for example, benzophenone based ultraviolet ray absorbers, benzotriazole based ultraviolet ray absorbers, salicylate based ultraviolet ray absorbers, cyanoacrylate based ultraviolet ray absorbers, and nickel complex salt based ultraviolet ray absorbers.

The benzophenone based ultraviolet ray absorbers include, for example, 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

The benzotriazole based ultraviolet ray absorbers include, for example, 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

The salicylate based ultraviolet ray absorbers include, for example, phenyl salicylate, p-tert-butylphenyl salicylate, and p-octylphenyl salicylate.

The cyanoacrylate based ultraviolet ray absorbers include, for example, ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate, The nickel complex salt based ultraviolet ray absorbers include, for example, nickel bis(octylphenyl)sulfide, 2,2'-thiobis(4-tert-octylphelate)-n-butylamine nickel (II), 2,2'-thiobis(4-tert-octylphelate)-2-ethylhexylamine nickel (II) and 2,2'-thiobis(4-tert-octylphelate) triethanolamine nickel (II).

The recording ink of the present invention is produced by dispersing or dissolving the solid component which contains the colorant and the resin and is the solid at 25° C., the liquid component which has the higher boiling point than that of water and is the liquid at 25° C. and the water, and further the other ingredients if necessary in the water-based medium and further stirring and mixing them if necessary. Generally, the colorant and the resin previously dissolved or dispersed in water are used. The dispersion can be performed using a sand mill, a homogenizer, a ball mill, a paint shaker and an ultrasonic dispersing machine. The mixing with stirring can be performed using a usual stirrer using a stirring wing, a magnetic stirrer and a high speed dispersing machine.

The physical properties of the recording ink of the present invention is not particularly limited, can be appropriately selected depending on the purpose, and for example, it is preferable that the viscosity, the surface tension and pH are in the following ranges.

The viscosity of the recording ink is preferably 20 mPa·s or less and more preferably 15 mPa·s or less at 25° C. When the viscosity is more than 20 mPa·s, it sometimes becomes difficult to assure the jet stability. But, even if the viscosity exceeds 20 mPa·s, the ink can not be always used depending on the head structure. The surface tension of the recording ink is preferably 35 mN/m or less, more preferably 30 mN/m or less, and preferably 15 mN/m or more and more preferably 20 mN/m or more. When the surface tension is more than 35 mN/m, the leveling of the ink on the recording medium hardly occurs and the drying time is sometimes prolonged. Meanwhile, when the surface tension is too low, wetting of the ink on the nozzle surface becomes too strong, and meniscus formation is sometimes unstabilized to cause jet defect.

The surface tension can be measured using, for example, a full automatic tensiometer (CBVP-Z supplied from Kyowa Interface Science Co., Ltd.).

The pH value of the recording ink is preferably, for example, 7 to 10.

The coloration of the recording ink of the present invention is not particularly limited, can be appropriately selected depending on the purpose, and includes, yellow, magenta, cyan and black. When recorded using the ink set combining two or more of these colorations, the multicolor image can be recorded. When recorded using the ink set combining all of these colorations, the full color image can be recorded.

The recording ink of the present invention can be suitably used for the printer loading any inkjet head such as a so-called piezoelectric type inkjet head where the volume in an ink flow path is changed to jet the ink drop by deforming a vibration plate which forms a wall of the ink flow path using a piezoelectric element as a pressure generating means to apply the pressure to the ink in the ink flow path (see JP-A No. 02-51734), or a so-called thermal inkjet head where bubbles are generated by heating the ink in the ink flow path using an exothermic resistive element (see JP-A No. 61-59911), or an electrostatic inkjet head where the electrode and the vibration plate which forms the wall of the ink flow path are disposed in opposed positions, and the volume in the ink flow path is changed to jet the ink by an electrostatic power generated between the electrode and the vibration plate (see JP-A No. 06-71882).

The recording ink of the present invention can be used suitably in various fields, can be used suitably in an image forming apparatus (printer etc.) by the inkjet recoding system, for example can be used for the printer having the function to facilitate the printing fixation by heating the paper to be recorded or the recording ink at 50° C. to 200° C. during, before or after the printing, and particularly can be used suitably for the following ink cartridge, ink record, inkjet recording apparatus and inkjet recording method of the present invention.

(Ink Cartridge)

The ink cartridge of the present invention houses the recording ink of the present invention or a recording ink in the ink media set of the present invention, in a container, and further has other members appropriately selected if necessary.

The container is not particularly limited, and its shape, structure, size and material can be appropriately selected depending on the purpose. Examples thereof suitably include those having an ink bag formed by aluminium laminate film or resin film.

Subsequently, the ink cartridge will be described with reference to FIGS. 1 and 2. Here, FIG. 1 is a view showing one example of the ink cartridge of the present invention, and FIG. 2 is a view including a casing (outer packing) of the ink cartridge.

Figure 2:
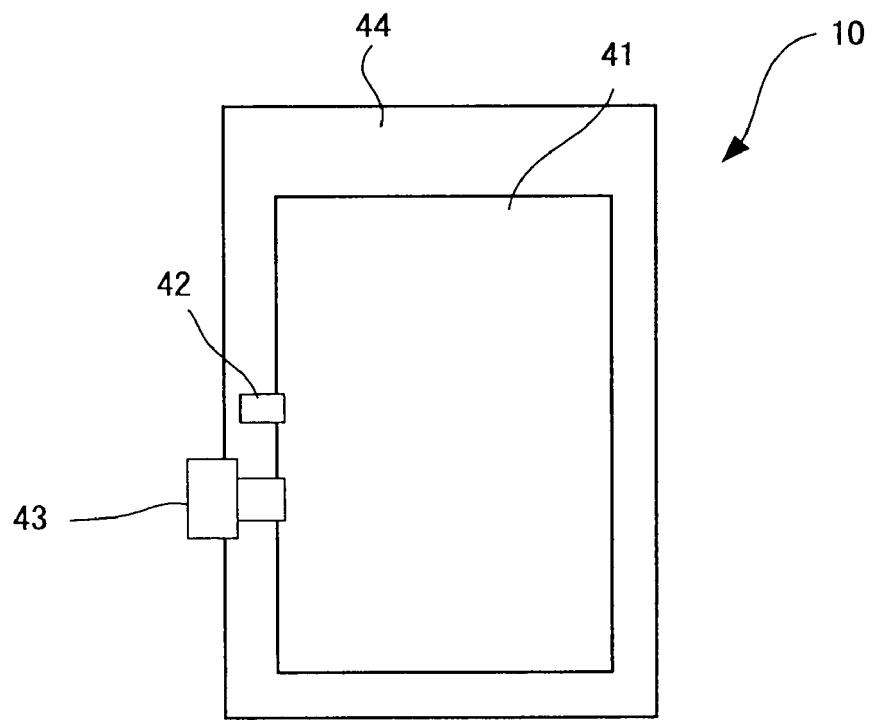
FIG. 2 is a view including a case (outer package) of the ink cartridge in FIG. 1.

As shown in FIG. 1, in the ink cartridge, the ink is filled from an ink inlet 42 into an ink bag 41, after deaerating, the ink inlet 42 is closed by fusion bond. In use, the ink is supplied by pushing a needle equipped with the main body of the apparatus into an ink outlet 43 composed of a rubber member.

The ink bag 41 is formed by a packing member such as aluminium laminate film having no air permeability. As shown in FIG. 2, this ink bag 41 is typically housed in a cartridge case 44 made from plastic, and used by detachably loading in various inkjet recording apparatuses.

(InkJet Recording Apparatus and InkJet Recording Method)

The inkjet recording apparatus of the present invention contains at least an ink ejecting unit, and further contains appropriately selected other units. e.g., an impulse generation unit and a control unit, if necessary.

The inkjet recording method of the present invention contains at least an ink ejecting step, and further contains appropriately selected other steps, e.g., an impulse generation step and a control step, if necessary.

The inkjet recording method of the present invention can be suitably carried out by the inkjet recording apparatus of the present invention, the ink ejecting step can be suitably carried out by the ink ejecting unit, and the aforementioned other steps can be suitably carried out by the aforementioned other units.

Ink Flying Step and Ink Flying Unit

The ink flying step is a step in which an impulse is applied to the recording ink of the present invention or a recording ink in the ink media set of the present invention to fly the recording ink and to thereby form an image.

The ink flying unit is a unit configured to apply an impulse to the recording ink of the present invention to thereby form an image. The ink ejecting unit is not particularly limited and can be appropriately selected depending on the purpose. Examples thereof include various recording heads (ink jet heads), and particularly, those having multiple nozzle lines and a subtank which houses a liquid supplied from a liquid storage tank and supplies the liquid to the head are preferable.

As the subtank, those having a negative pressure generation unit for generating negative pressure in the subtank, an air opening unit which exposes an inside of the subtank to air and a detection unit which detects the presence of absence of the ink by difference of electric resistance are preferable.

The impulse can be generated, for example by the impulse generation unit. The impulse is not particularly limited, can be appropriately selected depending on the purpose. Examples thereof include heat, pressure, vibration, and light. These may be used alone or in combination of two or more. Among them, the heat and the pressure are suitably preferable.

Examples of the impulse generation unit includes a heating device, a pressurizing device, a piezoelectric element, a vibration generating device, an ultrasonic oscillator and a light. Specifically, the examples thereof include a piezoelectric actuator such as a piezoelectric element, a thermal actuator which utilizes phase change by membrane boiling of the liquid using an electric thermal conversion element such as an exothermal resistive element, a shape memory alloy actuator using a metallic phase change by thermal change, and a electrostatic actuator using the electrostatic power.

The aspect of ejection of the recording ink is not particularly limited, is different depending on the impulse, and when the impulse is "heat", the method in which heat energy corresponding to recording signals is imparted using a thermal head to the recording ink in a recording head to generate bubbles in the recording ink by the heat energy and the recording ink is jetted and spouted as the liquid drop from a nozzle pore of the recording head by pressure of the bubbles is included. When the impulse is "pressure", the method in which the piezoelectric element is bended and the volume in a pressure room is reduced to jet and spout the recording ink as droplets from the nozzle pore of the recording head by applying voltage to the piezoelectric element adhered at a position called the pressure room in the ink flow path in the recording head is included.

The method in which the recording ink is ejected by applying the voltage to the piezoelectric element is preferable. Because of no heat generation, the piezoelectric system is advantageous to eject the ink containing the resin, and particularly is the advantageous method with less clogging of nozzles when the ink containing the wetting agent in a small amount is used.

In order to prevent the nozzle clogging, it is preferable to perform empty scanning by applying the voltage at an intensity at which the ink is not jetted to the piezoelectric element. In addition, it is preferable to jet the ink into an ink stock section before performing the empty scanning on one page of sheet.

It is preferable to have a scraping unit which scrapes the ink firmly fixed to an empty jet support. The scraping unit is preferably a wiper or a cutter.

When the inkjet image is formed using the recording ink containing the wetting agent in a small amount as in the present invention, in order to prevent the nozzle clogging, it is preferable to replace the recording ink in the nozzles of the recording head with a moisturizing liquid when the printing is stopped for a long time over one day or more (when the inkjet recording is not performed) and form the image by replacing the moisturizing liquid with the recording ink when the inkjet recording is restarted.

When stopped for a long time, by replacing the recording ink in the nozzles with the moisturizing liquid in this way, it is possible to prevent the clogging of the nozzles caused by exsiccation of the colorant and the resin due to evaporation of water. When the inkjet recording is restarted, by replacing the moisturizing liquid with the recording ink of the present invention and then forming the image, it is possible to form the image with high density.

The moisturizing liquid may be water or water containing the wetting agent (may be contain other additives in small amounts, pH adjusters and surfactants). The moisturizing liquid could be the solution which hardly produce the clogging due to water evaporation compared with the recording ink of the present invention, produces no precipitation when mixed with the recording ink of the present invention and can redisperse or clean the dried and fixed recording ink of the present invention. That is, the moisturizing liquid is the aqueous solution containing water or the wetting agent or the liquid containing water and wetting agent and less solid contents of the solids at 25° C. such as colorant and resins (or no solid). In particular, when printed on the offset coated paper on which the ink is hardly dried, the printing can be done using the ink with less amount of a wetting agent to enhance the drying property, and the clogging can be prevented by replacing the recording ink in the nozzles with the moisturizing liquid when stopped.

The moisturizing liquid is preferably any of (1) a liquid medium composed of water, (2) a liquid medium containing water as a major ingredient, (3) a liquid medium containing water and a liquid component which has the higher boiling point than that of water and is the liquid at 25° C. as the major ingredients, and (4) a liquid medium containing the same components as a recording ink, the content of the solid component being a solid at 25° C. in the liquid medium is less than that of the recording ink. The recording ink described in (4) is a recording ink commonly used in inkjet recording.

Here, the water as the major ingredient means containing water at 90% by mass or more.

The water and the liquid component which has the higher boiling point than that of water and is the liquid at 25° C. as the major ingredients means containing the water and the liquid component which has the higher boiling point than that of water and is the liquid at 25° C. at 90% by mass or more.

The moisturizing liquid may be the liquid having the same components as in the recording ink of the present invention, increasing the wetting agent amount and decreasing the solid content of the colorant than in the recording ink. In this case, the moisturizing liquid itself can be utilized as a low density colorant ink, a so-called light density ink.

It is preferable that the moisturizing liquid is stored in a different tank from a tank for the recording ink and supplied to the nozzle before being stopped for a long time. In this case, the ink tank itself may be exchanged, or the tank for the moisturizing liquid is originally provided and a path which supplies the moisturizing liquid to the nozzle may be provided differently from a path for the recording ink. But, these methods are absolutely the units for completely preventing the clogging of the nozzle, after being stopped for a long time, even if somewhat clogging occurs, the clogging is removed by cleaning, and thus the recording ink of the present invention can be used without using the moisturizing liquid.

When the inkjet image is formed using the recording ink containing the wetting agent in a small amount as in the present invention, in order to prevent the nozzle clogging, the water is supplied to a capping unit (moisturizing cap) which caps the nozzle of the recording head.

Generally, the moisturizing liquid has a high equilibrium water amount to cause the slow evaporation of water, and has an action to delay coagulation and drying of the ink. Meanwhile, such an action of the recording ink containing the wetting agent at low concentration as in the present invention is small. Thus, when the water is supplied in the moisturizing cap, a humidity in the moisturizing cap becomes about 100%, thus, even if the amount of the wetting agent is small, the clogging of the nozzle due to drying is inhibited. To supply the water, the cartridge which stores the liquid containing the water as the major ingredient and having the pH adjuster, the preservative and the anti-fungal agent in small amounts is separately prepared, and the liquid is spouted/supplied in the cap by nozzle imaging. As the liquid supplied in this cap, all moisturizing liquids described above can be used in addition to the water, but those in which the amounts of the wetting agent and the solids are small and the water amount is large are preferable. It is more preferable to separately prepare the liquid in which the water amount is large and the solid content is small as a water supply liquid in the cap, differently from the moisturizing liquid for liquid exchange in the nozzle when stopped for a long time.

The enhancement of reliability of the ink using a wetting agent is not limited to the case where the recording ink of the present invention is used and is also effective when a typical pigment ink is used and there are concerns about degradation of reliability of the pigment ink due to at least dry nozzle. However, it is more effective especially in the case of an ink containing less amount of a wetting agent and having concerns about degradation of reliability of the ink, like the recording ink of the present invention.

When a solid portion area with an area of 2 $mm^2$ or more, bias of the image density in a solid portion can be eliminated by printing by shifting a time and a place every printing of 2 $mm^2$.

It is preferable to use the non-porous substrate such as plastic film, plastic laminate paper, plastic coated paper, glass and metal and dry the recorded image by any of heating or air sending after recording on the non-porous substrate.

In the case of a recording ink whose content of a wetting agent is increased, it is preferable to include a dry-forcing step in the inkjet recording method to increase the drying rate. For the method of drying the recording ink, an ink dry-forcing unit may be provided before recording or may be provided after recording.

The drying unit may be a unit configured to apply microwave energy to paper by means of the microwave energy or may be a non-contact drying unit like a drying unit based on a heating wire technique. Further, a contact type drying unit such as a heat roller may be separately provided. A drying unit that directly heats a roller itself or a drying unit that indirectly heats a roller from another heating source may be used.

An image sample whose one side surface has been printed is heated and thereafter both sides of another image sample may be copied. When paper is dried before recording an image, it is possible to prevent nonuniformity of image density due to liquid bias called beading which is attributable to slow drying of dots of a recorded image. When paper is dried after recording an image, paper curling can be relatively easily prevented and the influence on the printer main body is relatively small.

The control unit is not particularly limited as long as it can control movements of each units, and can be appropriately selected depending on the purpose. Examples thereof include instruments such as a sequencer and a computer.

In the present invention, it is preferable to form an ink repellent layer on a plate surface on which an ink ejecting opening of an inkjet head for flying the ink are formed.

The surface roughness (Ra) of the ink repellent layer is preferably 0.2 μm or less. By setting the surface roughness (Ra) to 0.2 μm or less, unwiped portions can be reduced at the time of wiping.

FIGS. 22, and 23A to 23C are respectively a cross-section of the nozzle plate of the inkjet head used in the present invention.

In the present invention, a nozzle plate 32 serving as a plate base of the inkjet head is prepared with electroformed nickel, and an ink repellent layer 31 is formed on the surface of the nozzle plate 32. The ink repellent layer 31 is a silicone resin coating film having a film thickness of 0.1 nm or more. The surface roughness of the ink repellent layer 31 is preferably set to 0.2 μm or less. The film thickness of the ink repellent layer 31 is preferably 0.1 μm or more, and more preferably 0.5 μm or more.

Figure 23A:
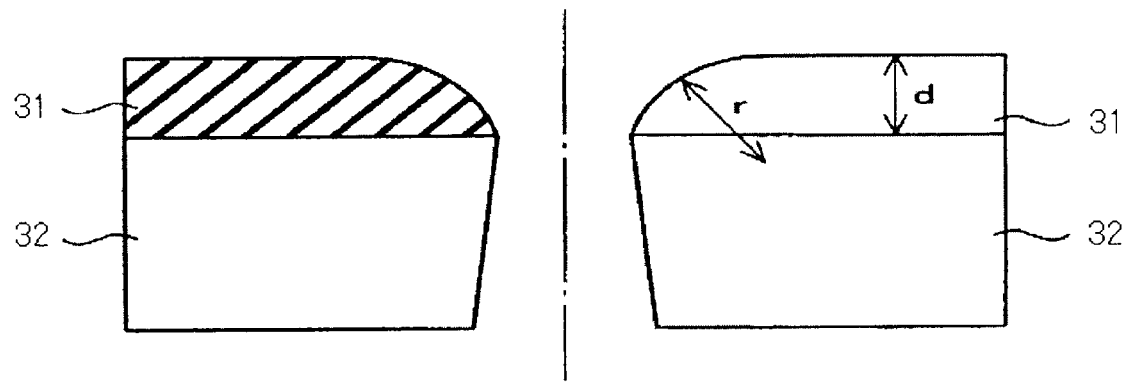
FIG. 23A is a schematic view exemplarily showing a nozzle plate of the inkjet heat according to the present invention.
Figure 23B:
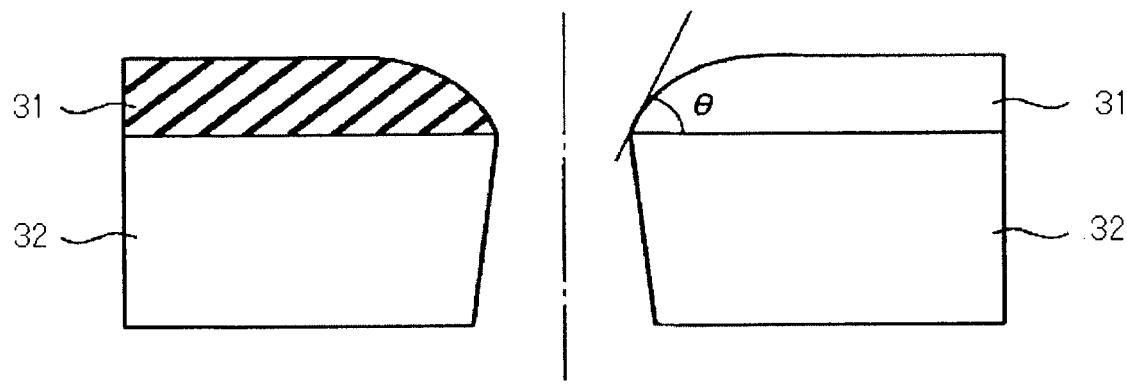
FIG. 23B is another schematic view exemplarily showing a nozzle plate of the inkjet heat according to the present invention.
Figure 23C:
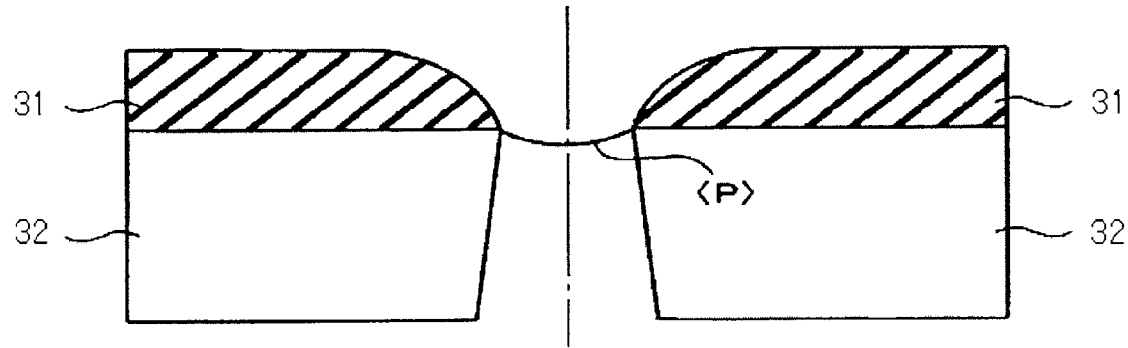
FIG. 23C is a yet another schematic view exemplarily showing a nozzle plate of the inkjet heat according to the present invention.

When feeding an ink 3, as shown in FIG. 23C, a meniscus (fluid level) P is formed at the boundary between the ink repellent layer 31 made of the silicone resin coating layer and the nozzle plate 32.

The ink repellent layer 31 formed on the plate surface where the opening for ink ejecting (nozzle) of the inkjet head is provided is formed such that the cross sectional area of the ink repellent layer of a plane surface perpendicular to the center line of the opening is gradually increased as more the cross sectional area separates from the plate base surface.

The shape of the ink repellent layer near the opening is preferably a curved surface shape. Further, the curvature radius of a curve near the opening of the ink repellent layer in the cross section of the plane surface including the center line of the opening is preferably greater than the thickness of the ink repellent layer.

The curve near the opening is represented by a substantially circular arc curve from an outside edge of the opening of the ink repellent layer in the cross section of the plane surface including the center line of the opening, and the curvature radius of the circular arc is preferably greater than the thickness of the ink repellent layer.

Further, the angel formed by the tangential line running at the outside edge of the opening of the ink repellent layer in the cross section of the plane surface including the center line of the opening from the surface of the nozzle including the outside edge is preferably less than 90 degrees.

With respect to the opening of the nozzle plate 32, the cross section of the plane surface perpendicular to the center line which is represented by a dashed-dotted line in FIGS. 23A to 23C is formed in a substantially a circle centering on the center line. The ink repellent layer 31 formed on the ink ejecting surface in the nozzle plate 32 is formed such that the cross sectional area of the ink repellent layer of a plane surface perpendicular to the center line of the opening is gradually increased as more the cross sectional area separates from the nozzle plate 32.

Specifically, in the opening of the ink repellent layer 31, as shown in FIG. 23A, a curve near the opening from the outside edge of the opening of the nozzle plate 32 is formed in a round shape having a curvature radias 'r'. The curvature radius 'r' is preferably greater than the thickness 'd' of a portion of the ink repellent layer 31 other than the vicinity of the opening of the ink repellent layer 31.

The thickness 'd' is a thickness of the portions other than the round part of the opening of the ink repellent layer 31. Preferably, the thickness 'd' may be the maximum thickness of the ink repellent layer.

As shown in the figure, by forming the opening of the ink repellent layer 31 which is articulated to the opening of the nozzle plate 32 in a shape having no substantially peaked edge (a smooth curve having no pointed portions) without having hooked portions, it is possible to prevent troubles that a wiper is caught on such pointed portions to peel off the ink repellent layer 31 from the nozzle plate 32.

As shown in FIG. 23B, the angel θ formed by the tangential line running at the outside edge of the opening of the ink repellent layer 31 in the cross section of the plane surface including the center line of the opening of the nozzle plate 32 from the surface of the nozzle plate 32 including the outside edge of the opening of the nozzle plate 32 which is articulated to the outside edge of the opening is preferably less than 90 degrees.

By setting the angle θ between the tangential line of the outside edge of the opening of the ink repellent layer 31 and the surface of the nozzle plate 32 less than 90 degrees, as shown in FIG. 23C, a meniscus (fluid level) P is stably formed at the boundary between the ink repellent layer 32 and the nozzle plate 32, and this can greatly reduce the possibility that a meniscus P is formed in the other portions. As the result, it is possible to gain excellent ink jetting stability of an ink when forming an image with the use of an image forming apparatus using an inkjet head including the nozzle plate 32 because the meniscus-formed surface can be stabilized.

For the silicone resin to be used in the embodiment, a liquid silicone resin which can be hardened at room temperature is preferable, and the one accompanying a hydrolysis reaction is more preferable. SR2411 manufactured by Toray DOW CORNING TORAY SILICONE CO., LTD. was used in the Examples to be hereinafter described.

Table A below shows the evaluation results on the shape formed from the outside edge of the opening of the nozzle plate 32 to the vicinity of the outside edge of the opening, ink deposit around the nozzle, edge peel-off, and ink jetting stability in the ink repellent layer 31 at the inkjet head according to the embodiment.

TABLE A

| Edge shape | | Ink deposit | Edge peel-off | Ink jetting stability |
|---|---|---|---|---|
| Pointed edge existed | | Partly occurred | Occurred | Stable |
| No pointed edge existed (formed in a round shape) | θ ≦ 90° | Not occurred | Not occurred | Stable |
| | θ > 90° | Not occurred | Not occurred | Not stable |
| | r ≧ d | Not occurred | Not occurred | Stable |
| | r < d | Not occurred | Partly occurred | Not stable |

The results shown in Table A demonstrated that an ink repellent layer 31 containing a substantially peaked edge at the edge portion (in the vicinity of the outside edge of the opening) caused ink deposit around the nozzle, and the edge was peeled off in the course of wiping.

Figure 24A:
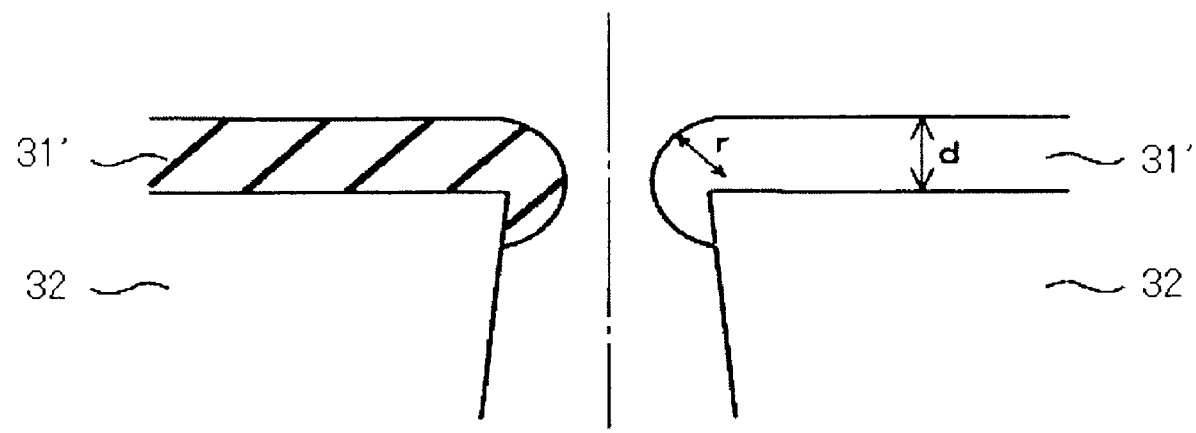
FIG. 24A is a schematic view exemplarily showing a nozzle plate of an inkjet heat for comparison.
Figure 24B:
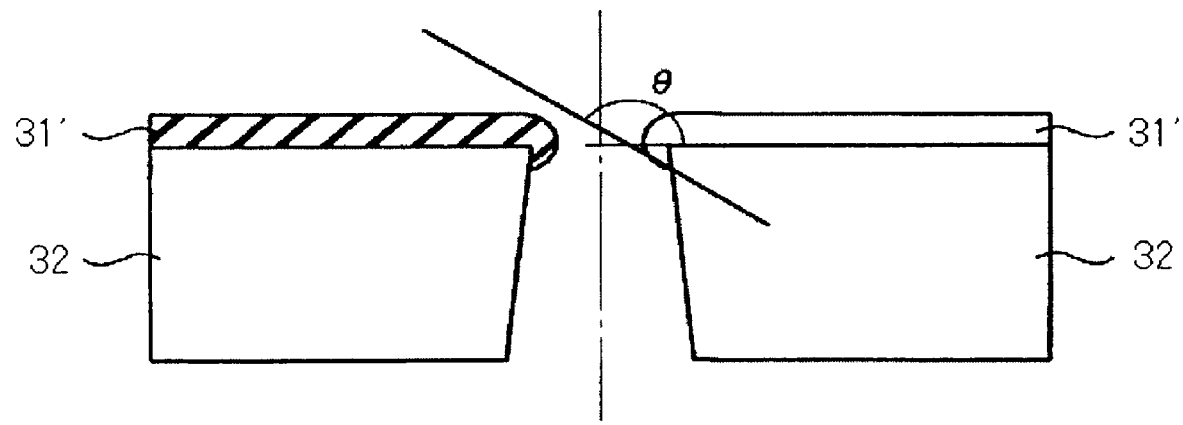
FIG. 24B is another schematic view exemplarily showing a nozzle plate of an inkjet heat for comparison.

Any of ink repellent layers 31 having a round shape of the edges thereof caused no ink deposit, however, by way of comparison, an ink repellent layer having r<d as exemplarily shown in FIG. 24A caused peel-off at part of edges, and an ink repellent layer having θ>90° as exemplarily shown in FIG. 24B resulted in unstable injection of ink droplets.

Figure 24C:
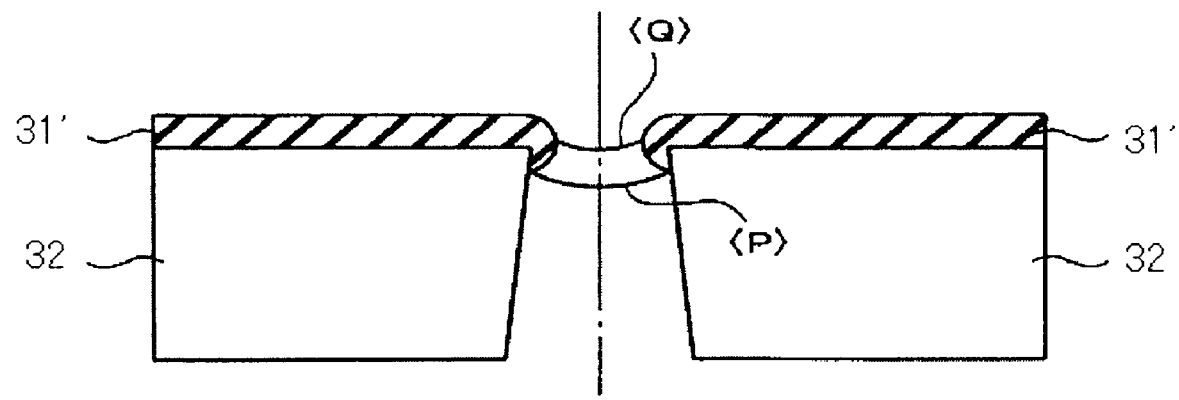
FIG. 24C is a yet another schematic view exemplarily showing a nozzle plate of an inkjet heat for comparison.

Further, as shown in FIG. 24C, with the use of an ink repellent layer having r<d or θ>90°, there was a case where a meniscus (fluid level) P was formed at the boundary between the ink repellent layer 31 and the nozzle plate 32 when feeding the ink and there was a case where a meniscus Q was formed at convex portion toward the center part of the opening of the ink repellent layer 31' (the portion at which the cross sectional area perpendicular to the center line in the opening is the smallest) when feeding the ink. For this reason, there may be cases where there are variations in ink jetting stability of the ink when an image is recorded using an inkjet recording apparatus using an inkjet head which includes the nozzle plate 32.

The method of producing a nozzle of the inkjet head according to the embodiment set forth will be described hereinafter.

Figure 25:
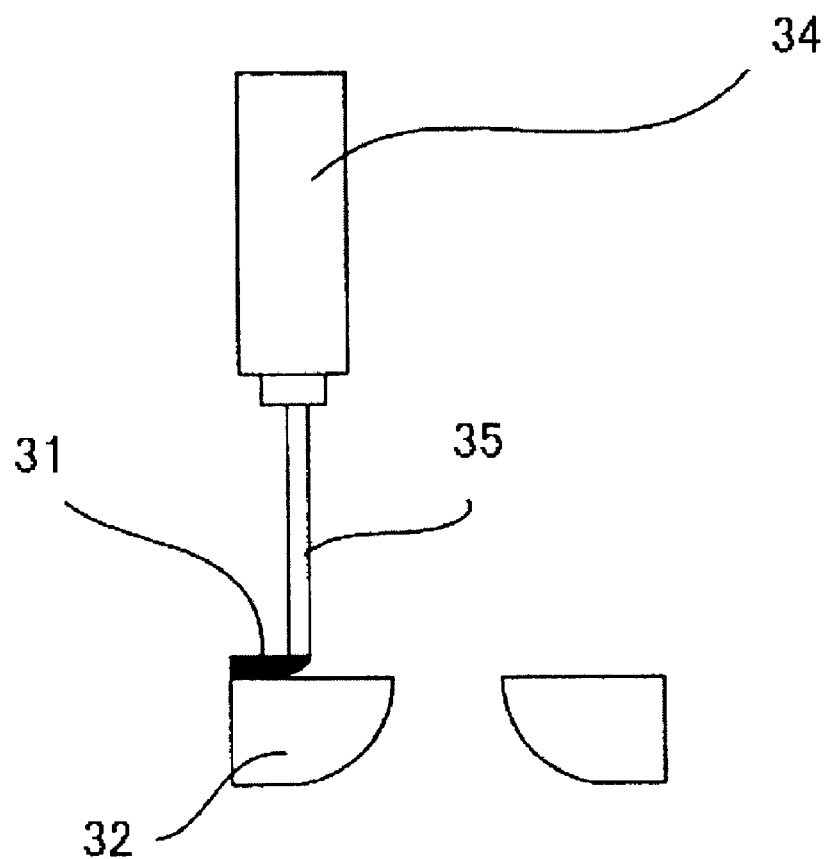
FIG. 25 is a view showing a state where an ink repellent layer is formed by applying a silicone resin using a dispenser.

FIG. 25 is a view showing a construction forming an ink repellent layer 31 by applying a silicone resin using a dispenser 34 according to the embodiment.

On the ink ejecting side of a nickel electroformed nozzle 32, a dispenser 34 to apply a silicone solution is arranged. It was possible to form a silicone resin film selectively on the ink ejecting surface of the nozzle plate 32 as shown in FIGS. 22, and 23A to 23C by moving the dispenser 34 while ejecting the silicone from the tip of a needle 35 such that the nozzle plate 32 and the tip of the needle 35 were arranged to keep a predetermined distance.

For the silicone resin used in the embodiment, silicone resin which can be hardened at room temperature SR2411 (manufactured by Toray DOW CORNING TORAY SILICONE CO., LTD.; viscosity: 10 mPa·s) was used. However, a slightly amount of dripping of the silicone was observed in the nozzle hole and the back face of the nozzle plate. The silicone resin film which was selectively formed in this way had a thickness of 1.2 µm and a surface roughness (Ra) of 0.18 µm.

Figure 26A:
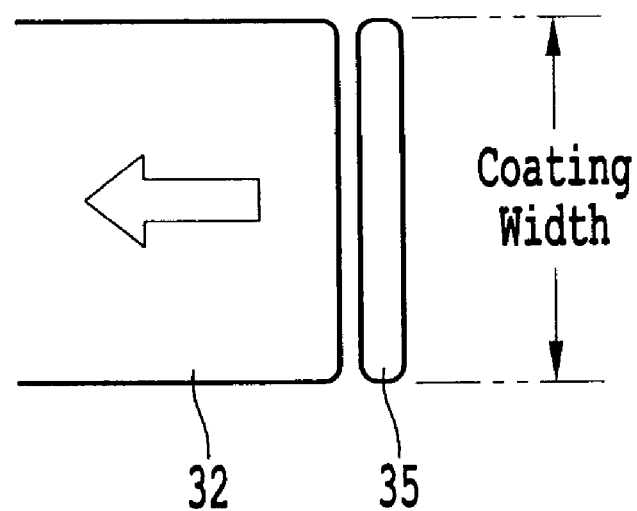
FIG. 26A is a view showing a relation between the application hole of the tip of a needle and a width required to apply the silicone resin to a nozzle plate which is an application target.

The application hole of the tip of the needle according to the embodiment is ensured with a width as large as the width required to apply the silicone resin to the nozzle plate 32 which is an application target as shown in FIG. 26A. With this configuration, the silicone resin can be completely applied over the entire surface of the application target by moving the dispenser 34 once in the application direction.

Figure 26B:
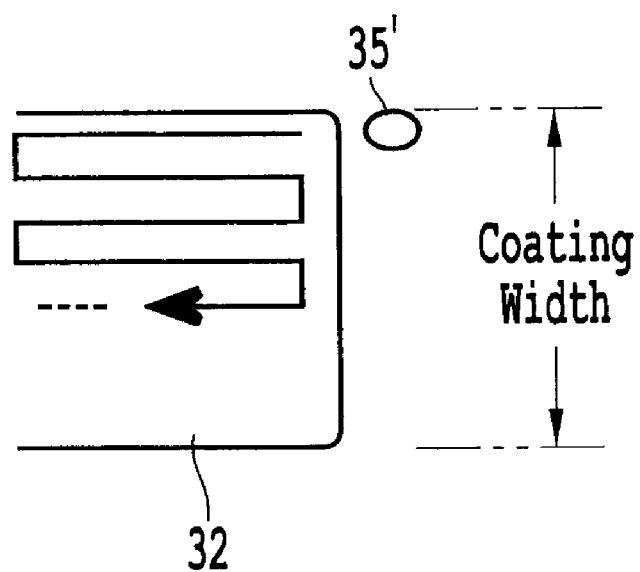
FIG. 26B is a view showing a relation between the tip of a generally used needle and a width required to apply the silicone resin to a nozzle plate which is an application target.

In other words, the configuration allows for only one moving direction of applying motion and cut out the need of altering the direction and moving the dispenser in the opposite direction as shown in FIG. 26B.

Here, the tip of a generally used needle 35 is significantly narrower than the width for application to the nozzle plate 32 which is the application target, and thus in order to complete the application of a silicone resin to the entire surface of the application target, there is a need to move a dispenser by changing the direction of application by 90 degrees and to move the dispenser in plural directions such as by moving the dispenser in the opposite direction. For this reason, it is difficult to apply a silicone resin to the entire surface of an application target with a uniform thickness.

According to the embodiment, by ensuring the width of the application hole at the tip of the needle 35 for only the width of application to the nozzle plate 32 which is the application target, the thickness of the silicone resin applied over the entire surface of the application target can be uniformed, and the surface finishing can be excellently and precisely achieved.

Figure 27:
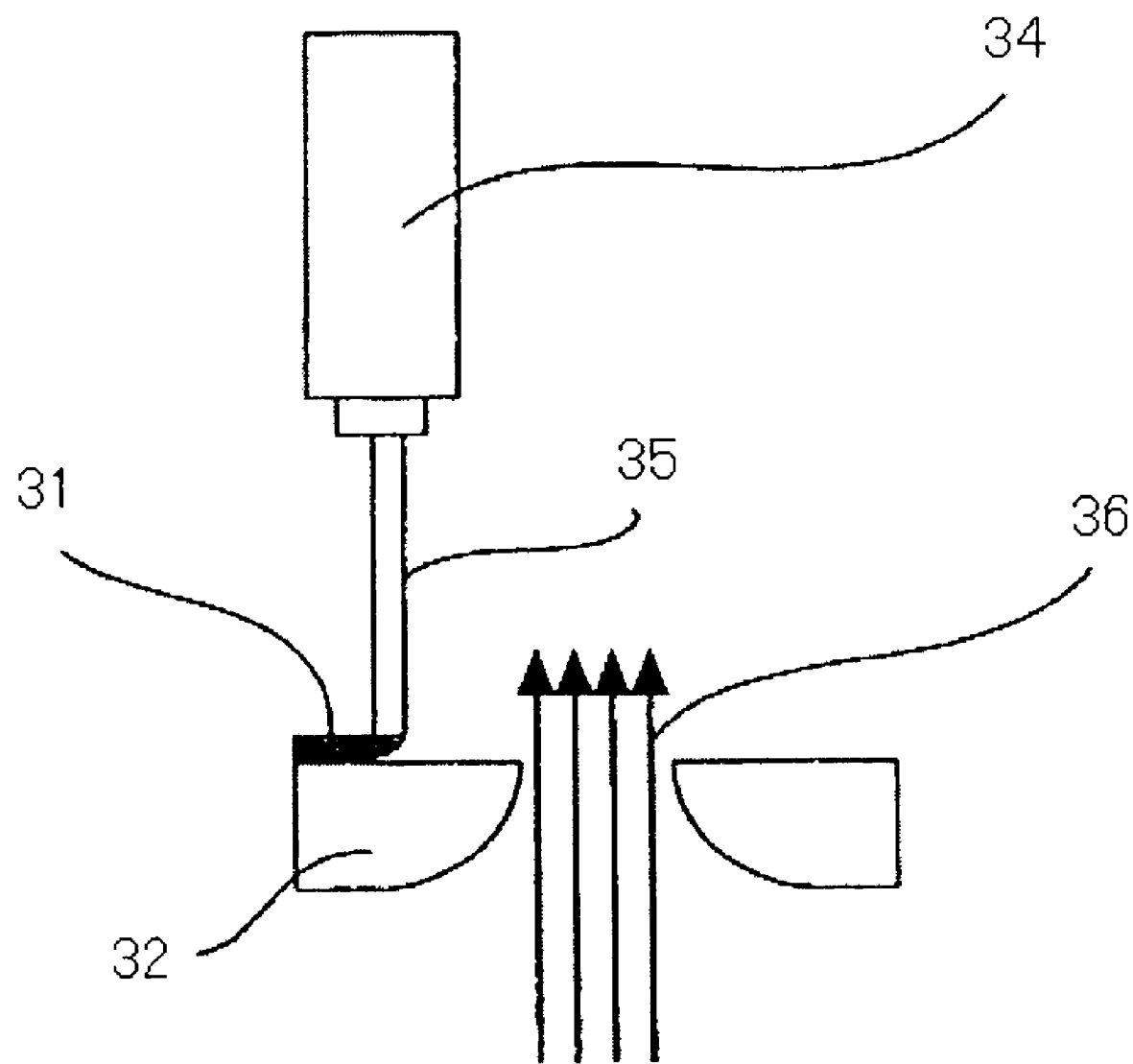
FIG. 27 is a view showing the movement of application of the silicone resin using a dispenser.

FIG. 27 is a view showing the movement of application of the silicone resin using the dispenser 34 according to the embodiment. The basic construction is similar to the one shown in FIG. 25, however, the silicone is applied while jetting a gas 36 from a nozzle hole (opening) of a nozzle plate 32. For the gas 36, various types of gas can be used as long as it is a gas which hardly initiates chemical reactions with the silicone to be applied. For example, the gas may be air.

By applying the silicone while jetting the gas 36 from the nozzle hole, a silicone resin film can be formed on only the surface of the nozzle of the nozzle plate except for the nozzle hole.

Figure 28:
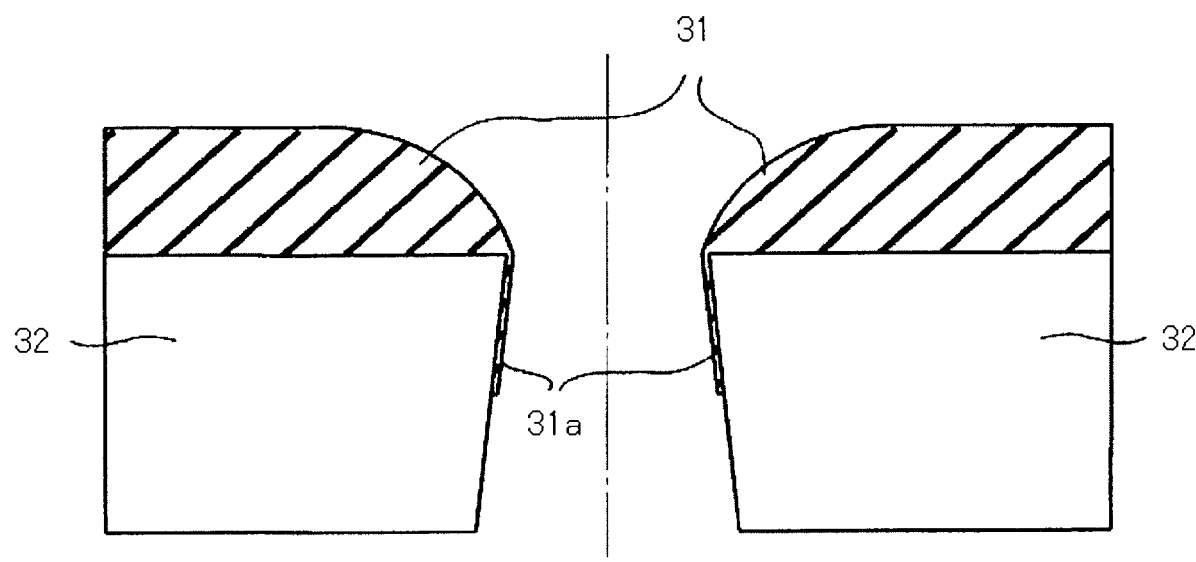
FIG. 28 is a view showing a state where an ink repellant layer made of the silicone resin is formed to a predetermined depth of the internal wall of the nozzle.

When the same silicone resin is used and applied without jetting the gas 36 to infiltrate the silicone resin to a predetermined depth and then the gas 36 is jetted from the nozzle 32, an ink repellent layer made of the silicone resin can be formed to the desired depth of the internal wall of the nozzle, for example, to the depth of around several micron meters, as shown in FIG. 28. Namely, an extremely thin ink repellent layer 31a (an ink repellent layer formed at the internal water of the opening of the nozzle plate 32) can be formed to a predetermined depth from the outside edge of the opening of the nozzle plate 32 as well as the ink repellent layer 31 having the ink ejecting surface set forth.

The thus prepared ink repellent layer 31 of the nozzle plate was wiped using an EPDM rubber (rubber hardness: 50 degrees). As the result, the ink repellent layer 31 of the nozzle plate could keep excellent ink repellency against 1,000 times wiping treatment. The nozzle member with the ink repellent layer 31 formed therein was immersed in the ink heated at 70° C. for 14 days. As the result, thereafter, the ink repellent layer 31 could keep the unchanged ink repellency from the early stage.

Figure 29:
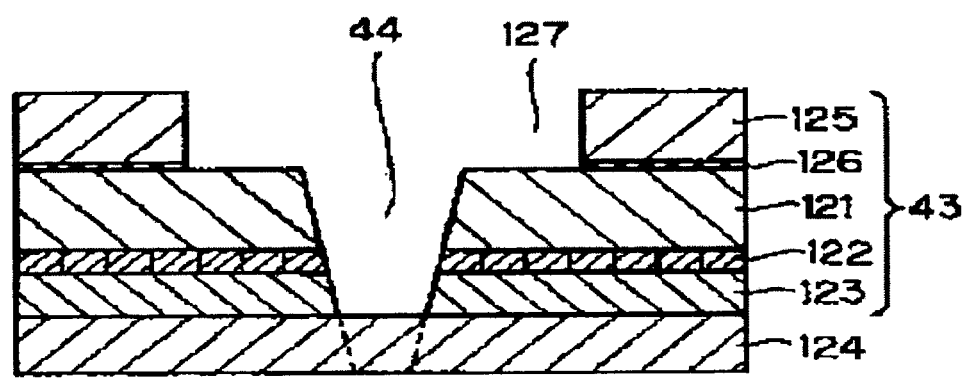
FIG. 29 is a view exemplarily showing the inkjet heat according to the present invention and a state where a nozzle hole is formed by excimer laser process.

FIG. 29 is a view exemplarily showing the inkjet head of the present invention and represents a state where a nozzle hole is formed by excimer laser processing. A nozzle plate 43 is formed by joining a resin material 121 and a highly rigid material 125 with a thermoplastic adhesive 126. On or above the surface of the resin material 121, a $SiO_2$ thin film layer 122 and a fluorine-water repellent layer are formed in this order in a laminate structure. In the resin material 121, a nozzle hole 44 having a desired diameter is formed. In the highly rigid material 125, a nozzle communicating hole 127 which is communicated with the nozzle hole 44 is formed. The $SiO_2$ thin film layer 122 is formed by a method by which a film can be formed within a temperature range where the resin material is not thermally affected. Specifically, sputtering, ion beam deposition, ion plating, CVD (Chemical Vapor Deposition), P-CVD (Plasma Chemical Vapor Deposition) and the like are preferable.

It is advantageous that the thickness of the $SiO_2$ thin film layer 122 is set to the minimum necessary thickness within a range where adhesive force can be ensured from the perspective of process time and material cost. This is because an excessively thick film may cause troubles at the time of excimer laser processing. In other words, even when the resin material 121 is finely processed to have a nozzle hole shape, part of the $SiO_2$ thin film layer 122 may not be satisfactorily processed to leave some to be processed. Thus, as a specific range where adhesive force can be ensured and no portion remains for excimer laser processing in the $SiO_2$ thin film layer 122, it can be said that a suitable film thickness of the $SiO_2$ thin film layer 122 is ranging from 0.1 nm to 30 nm. A film thickness ranging from 1 nm to 10 nm is more preferable. In the experimental result, the adhesive force of the $SiO_2$ thin film layer 122 was adequate even with a film thickness of 3 nm, and there was no problem with material workability by the use of excimer laser. A slight part to be processed was left with a film thickness of 30 nm, however, the film thickness was still within an available range. With a film thickness more than 30 nm, a substantial part to be processed was left, and the nozzle was deformed to such an extent that the nozzle was unusable.

For material of the ink repellent layer, various materials can be used as long as the material sheds water. Specific examples thereof include fluorine water repellent materials, and silicone water repellent materials.

With respect to the fluorine water repellent materials, various material are known, however, here, necessary water repellency is obtained by evaporating a mixture of perfluoropolyoxethane and a modified perfluoropolyoxethane (trade name: OPTOOL DSX manufactured by Daikin Industries, Ltd.) in a thickness of 0.1 nm to 3 nm. In the experimental result, there were not differences observed in water repellency and wiping durability with a thickness of OPTOOL DSX of 1 nm, 2 nm, or 3 nm. Thus, the thickness of the fluorine water repellent material for fluorine water repellent layer 123 is more preferably 0.1 nm to 2 nm in view of cost. However, since a water repellent layer having a thicker film thickness may maintain the water repellency for a longer time depending on the used ink from the perspective of reliability, in such a case, the thickness of the fluorine water repellent layer 123 is preferably 10 nm to 20 nm. A pressure sensitive adhesive tape 124 in which an adhesive material is applied to a resin film is attached to the surface of the fluorine water repellent layer 123 and serves as an assistance function at the time of excimer laser processing. A silicone water repellent material can also be used.

For the silicone water repellent materials, there are liquid silicone resins or elastomers each of which can be hardened at room temperature. It is preferable that an ink repellent film is formed by applying the liquid silicone resin or elastomer over a surface of a substrate and leaving the substrate with the silicone water repellent material applied to the surface thereof in the atmosphere at room temperature to thereby polymerize and harden the substrate surface.

The above noted silicone water repellent material may be a liquid silicone or an elastomer each of which can be hardened at room temperature, and an ink repellent film may be formed by applying the liquid silicone or elastomer over a surface of a substrate and heating the substrate surface to harden the substrate surface.

The silicone water repellent material may be a liquid silicone resin or elastomer each of which can be cured by ultraviolet ray, and an ink repellent film may be formed by applying the liquid silicone resin or elastomer over a surface of a substrate and irradiating the substrate surface with ultraviolet ray to harden the substrate surface.

The viscosity of the silicone water repellent material is preferably 1,000 cp (centipoises) or less.

Figure 30:
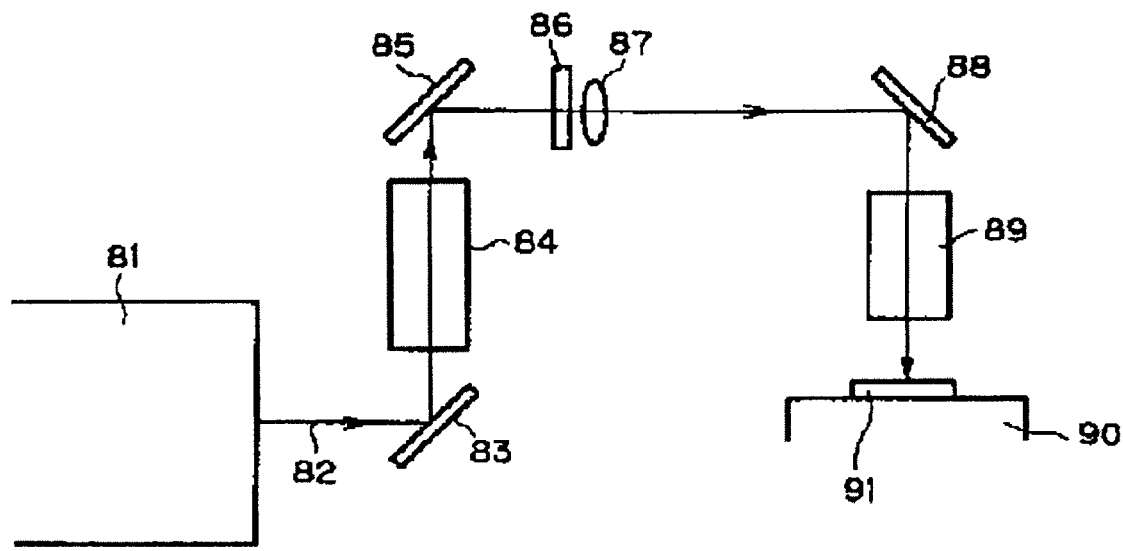
FIG. 30 is a view showing a construction of an excimer laser processor used when a nozzle hole is processed.

FIG. 30 is a view showing a construction of an excimer laser processor used when a nozzle hole is processed. An excimer laser beam 82 emitted from a laser oscillator 81 is reflected by mirrors 83, 85, and 88 to be guided to a processing table 90. In the optical path where the laser beam 82 is led to the processing table 90, a beam expander 84, a mask 86, and field lens 87, and an image forming optical system 89 are respectively arranged at a predetermined position such that an optimum beam reaches a processing target. A processing target (nozzle plate) 91 is placed on the processing table 90 to receive the laser beam. The processing table 90 is composed on an XYZ table known in the art, or the like and is configured to apply a laser beam to a desired position by moving the processing target 91 according to need. Hereinabove, the laser is explained using an excimer laser, however, various lasers can be used as long as the laser is a ultraviolet ray laser having a short wavelength and allows for abrasion processing.

FIGS. 31A to 31E are views schematically showing the production process of the nozzle plate in the method of producing an inkjet head according to the present invention.

Figure 31A:
FIG. 31A is a view showing a material to be used for a substrate which constitutes a nozzle forming member in the production process of a nozzle plate in the method of producing an inkjet heat.

FIG. 31A is a view showing a material to be used for the substrate which constitutes a nozzle forming member. Here, for a resin film 121, a film including no particles, KAPTON (trade name) manufactured by DuPont Electronics, was used. In a typical polyimide film, particles such as $SiO_2$ (silica) are added in the film material in consideration of handleability (slipperiness) in an apparatus to handle roll films. When a nozzle hole is processed with an excimer laser, the nozzle may be deformed due to poor processability with the excimer laser because the $SiO_2$ (silica) particles hinder the process. For the reason, in the present invention, a film to which no $SiO_2$ (silica) particles are added is used. For the material of the plate substrate, a polyimide film, UPILEX manufactured by Ube Industries Ltd. may be used. UPILEX can be directly used because it has extremely fine particles and it involves no troubles during processing.

Figure 31B:
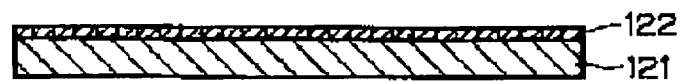
FIG. 31B is a view showing a step in which a SiO$_2$ thin film layer is formed on the surface of a resin film.

FIG. 31B is a view showing a step in which a $SiO_2$ thin film layer 122 is formed on the surface of the resin film 121. For the formation of the $SiO_2$ thin film layer 122, a sputtering process carried out in a vacuum chamber is suitable, and a film thickness ranging from around 0.1 nm to 30 nm is suitable. Here, the $SiO_2$ thin film layer 122 is formed to have a thickness of 1 nm to 10 nm. For the sputtering method, it is more effective to use a method in a $SiO_2$ layer is formed by sputtering the film with Si and then applying $O_2$ ion to the Si surface because the adhesive force of the $SiO_2$ film to the resin film 121 can be enhanced, a uniform and extremely precise film can be yielded, and the wiping durability of the water repellent layer can be enhanced.

Figure 31C:
FIG. 31C is a view showing a step in which a fluorine water repellent is applied over the surface of the SiO$_2$ film layer.

FIG. 31C is a view showing a step in which a fluorine water repellent 123a is applied over the surface of the $SiO_2$ film layer 122. For the method of applying the fluorine water repellent 123a, a spin coater, a roll coater, a screen printing, a spray coater can be used, however, a method of forming a film by vacuum evaporation is more effective because the method leads to more enhanced adhesive force of the water repellent film. After forming the $SiO_2$ thin film layer 122 shown in FIG. 31B, carrying out the vacuum evaporation in the vacuum chamber there can achieve further more excellent effect in the adhesive force of the water repellent film. Conventionally, after forming the $SiO_2$ thin film layer 122, the work is taken out from the vacuum chamber once, and thus it is considered that the adhesive force of the water repellent film is impaired due to adhered impurities on the surface of the work. For the fluorine water repellent material, various materials are known. Here, by using perfluoropolyoxethane or a modified perfluoropolyoxethane or a mixture thereof as a fluorine amorphous compound, required water repellency can be obtained against the ink. "OPTOOL DSX" manufactured by Daikin Industries, Ltd. may be called as "alkoxysilane end modified perfluoropolyether".

Figure 31D:
FIG. 31D is a view showing a step of leaving the work in the air after evaporation of the water repellent layer.

FIG. 31D is a view showing a step of leaving the work in the air after evaporation of the water repellent layer. By subjecting the work to this step, the fluorine water repellent 123a is chemically bonded the $SiO_2$ thin film layer 122 with mediation of moisture in the air to thereby form a fluorine water repellent layer 123.

Figure 31E:
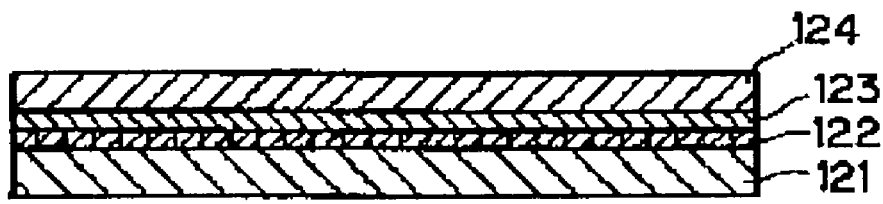
FIG. 31E is a view showing a step in which a pressure sensitive adhesive tape is attached to the surface of the work.

FIG. 31E is a view showing a step in which a pressure sensitive adhesive tape 124 is attached to the surface of the work. Specifically, the pressure sensitive adhesive tape 124 is attached to the surface of the work with the fluorine water repellent layer 123 applied thereon. The pressure sensitive adhesive tape 124 should be attached to the work surface such that no air bubbles arise therebetween. This is because when air bubbles arise therebetween, a nozzle hole opened at the position where air bubbles arise may result in a poor quality product due to deposits attached in the course of the processing.

Figure 31F:
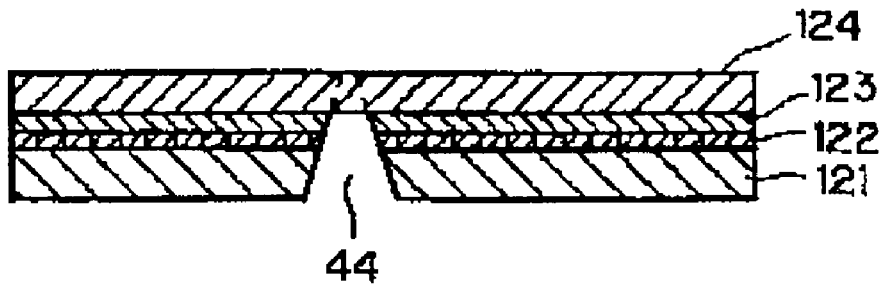
FIG. 31F is a view showing a step of processing a nozzle hole.

FIG. 31F is a view showing a step of processing a nozzle hole 44. In this step, the nozzle hole 44 is formed by applying an excimer laser from the side of the polyimide film 121. After processing the nozzle hole 44, the pressure sensitive adhesive tape 124 is peeled off from the work for use. Here, explanation of highly rigid material 125 which is to be used for enhancing the rigidity of the nozzle plate 43 explained in FIG. 29 is omitted, however, when the step is applied in the process, it is appropriate to perform the step between the step shown in FIG. 31D and the step shown in FIG. 31E.

Figure 32:
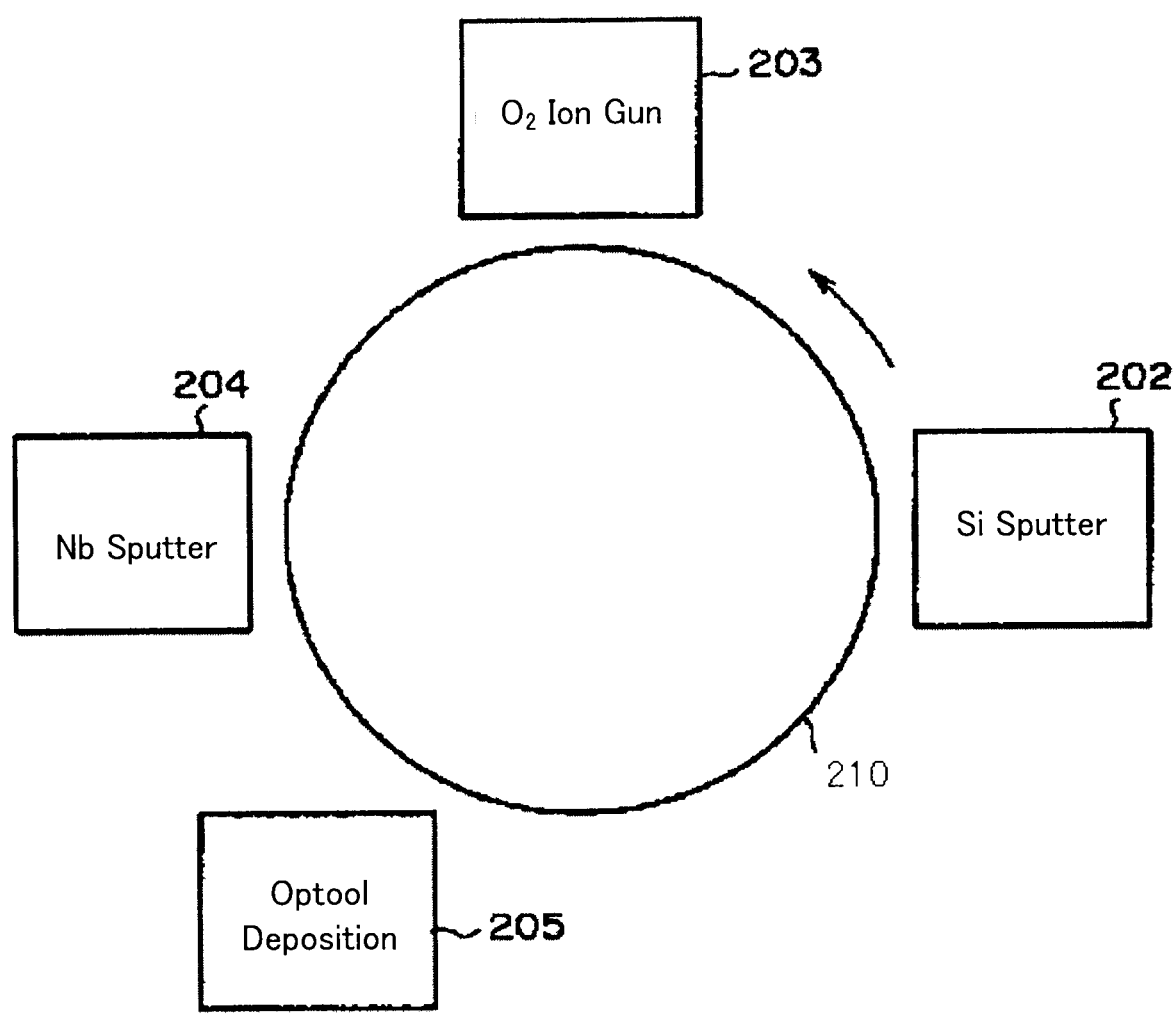
FIG. 32 is a view showing the outline on an apparatus used when producing an inkjet heat according to the method of producing an inkjet head in the present invention.

FIG. 32 is a view showing the outline on an apparatus used when producing an inkjet heat according to the method of producing an inkjet head in the present invention.

The apparatus is the one that is prepared into an apparatus using a process called "Metamode Process" that was developed by OCLI (Optical Coating Laboratory Inc.) in the U.S. and is used in preparing antireflection films and antifouling films for displays and the like. As shown in FIG. 32, a Si sputter 202, an $O_2$ ion gun 203, an Nb sputter 204, and an OPTOOL evaporator 205 are respectively arranged at four sites around a drum 210 and all the components are arranged in a chamber capable of vacuuming. First, the target is sputtered with Si by means of the Si sputter 202, and then, $O_2$ ion is applied to Si by means of the $O_2$ ion gun 203 to yield $SiO_2$. Thereafter, Nb and OPTOOL DSX are properly evaporated using the Nb sputter 204 and the OPTOOL evaporator 205. In the case of an antireflection film, Nb and $SiO_2$ are laminated in a laminate of required plural layers with a given thickness, and then the laminate is evaporated. In the present invention, since the function of an antireflection film is unnecessary, it is unnecessary to use Nb, and it is necessary to form only a single layer of $SiO_2$ and a single layer of OPTOOL DSX. As mentioned above, the use of the apparatus allows for carrying out vacuum evaporation of OPTOOL DSX without moving the work within the vacuum chamber after the $SiO_2$ thin film layer 122 is formed.

The critical surface tension of the ink repellent layer is preferably 5 mN/m to 40 mN/m, and more preferably 5 mN/m to 30 mN/m. When the critical surface tension is more than 30 mN/m, the nozzle excessively gets wet with the ink in long-term use, when printed repeatedly, the ejecting direction of the ink may be deflected, and it may cause abnormality in ink particles. When the critical surface tension is more than 40 mN/m, the nozzle plate excessively gets wet with the ink in the early stage of the use, and thus the ejecting direction of the ink may be deflected, and it may cause abnormality in ink particles.

Actually, ink repellent materials shown in Table B was respectively applied over a surface of an aluminum substrate, and the substrate surface was heated and dried to thereby prepare respective nozzle plates with an ink repellent layer formed therein. The critical surface tension of the respective ink repellent layers was measured. Table B also shows the measurement results.

Here, the critical surface tension can be determined by the Zisman method. Specifically, a liquid whose surface tension is known is dropped on the ink repellent layer surface, and the contact angle θ is measured. The surface tension of the liquid is plotted along 'x' axis and the "cos θ" is plotted along 'y' axis, and then a straight line on the downside can be obtained (Zisman Plot). The surface tension when the straight line is positioned at Y=1 (θ=0) can be calculated as the critical surface tension γc. For other methods to determine the critical surface tension, it can be determined by using Forwkes method, Owens and Wendt method, or Van Oss method.

An inkjet head was prepared using a nozzle plate with an ink repellent layer formed therein in the same manner as the method for producing an inkjet head set forth above. The following cyan ink (cyan ink of Production Example 1 to be explained below) was used in the inkjet head to eject the ink. The process of ink flying was recorded using a video set, and the video recording status was observed. It was verified that the ink normally was in particles and the ejecting stability was excellent with the use of any of the prepared nozzle plates, respectively. Table B also shows the results.

<Cyan Ink>

In a vessel, 20.0% by mass of a polymer fine particle dispersions containing a copper phthalocyanine pigment, 23.0% by mass of 3-methyl-1,3-butandiol, 8.0% by mass of glycerine, 2.0% by mass of 2-ethyl-1,3-hexanediol, 2.5% by mass of FS-300 (manufactured by DuPont Electronics Ltd.) as a fluorochemical surfactant, 0.2% by mass of PROXEL LV (manufactured by AVECIA Ltd.) as an antiseptic and fungicide, 0.5% by mass of 2-amino-2-ethyl-1,3-propanediol, and an appropriate amount of ion exchange water were added to total 100% by mass. Then, the composition was filtered through a membrane filter having an average hole diameter of 0.8 thereby preparing a cyan ink.

TABLE B

| | Trade name | Critical surface tension | Ejecting stability |
|---|---|---|---|
| Dow Corning Toray Silicone Co., Ltd. | SR2411 | 21.6 mN/m | Excellent |
| Shin-Etsu Chemical Co., Ltd. | KBM7803 | 16.9 mN/m | Excellent |
| Shin-Etsu Chemical Co., Ltd. | KP801M | 6.6 mN/m | Excellent |

Figure 3:
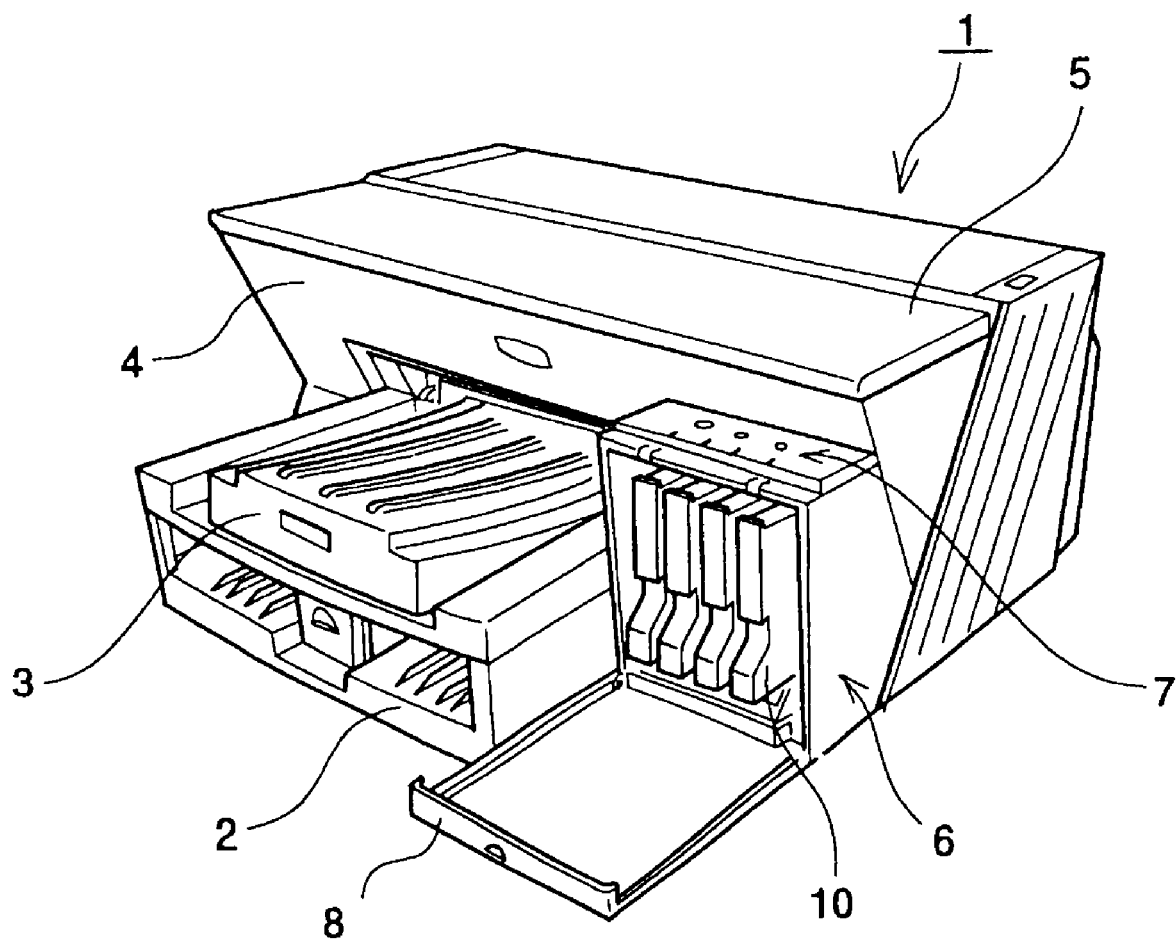
FIG. 3 is a schematic view showing one example of an inkjet recording apparatus of the present invention.

One aspect of carrying out the inkjet recording method of the present invention by the inkjet recording apparatus of the present invention will be described with reference to the drawings. FIG. 3 is a schematic view showing one example of the inkjet recording apparatus of the present invention. The inkjet recording apparatus shown in FIG. 3 has a main body 1 of the apparatus, a paper supply tray 2 for loading the paper loaded to the main body 1, a paper discharge tray 3 for stocking the paper on which the image has been recorded (formed) loaded to the main body 1, and an ink cartridge loading section 6. An operation section 7 such as operation keys and displays is disposed on the ink cartridge loading section 6. The ink cartridge loading section 6 has an openable and closable front cover 8 for detaching an ink cartridge 10.

Figure 4:
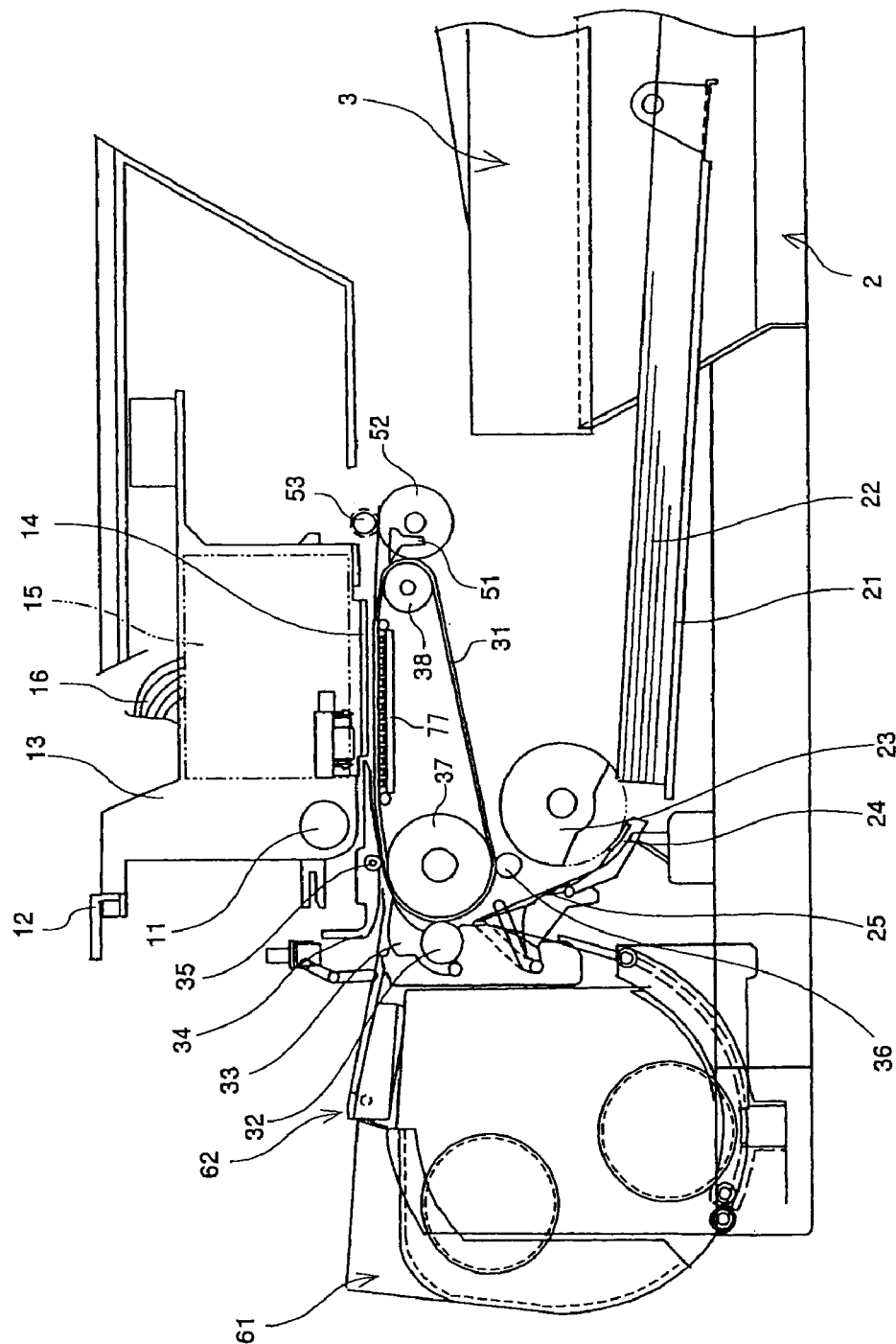
FIG. 4 is a schematic view showing one example of an internal structure of the inkjet recording apparatus in FIG. 3.
Figure 5:
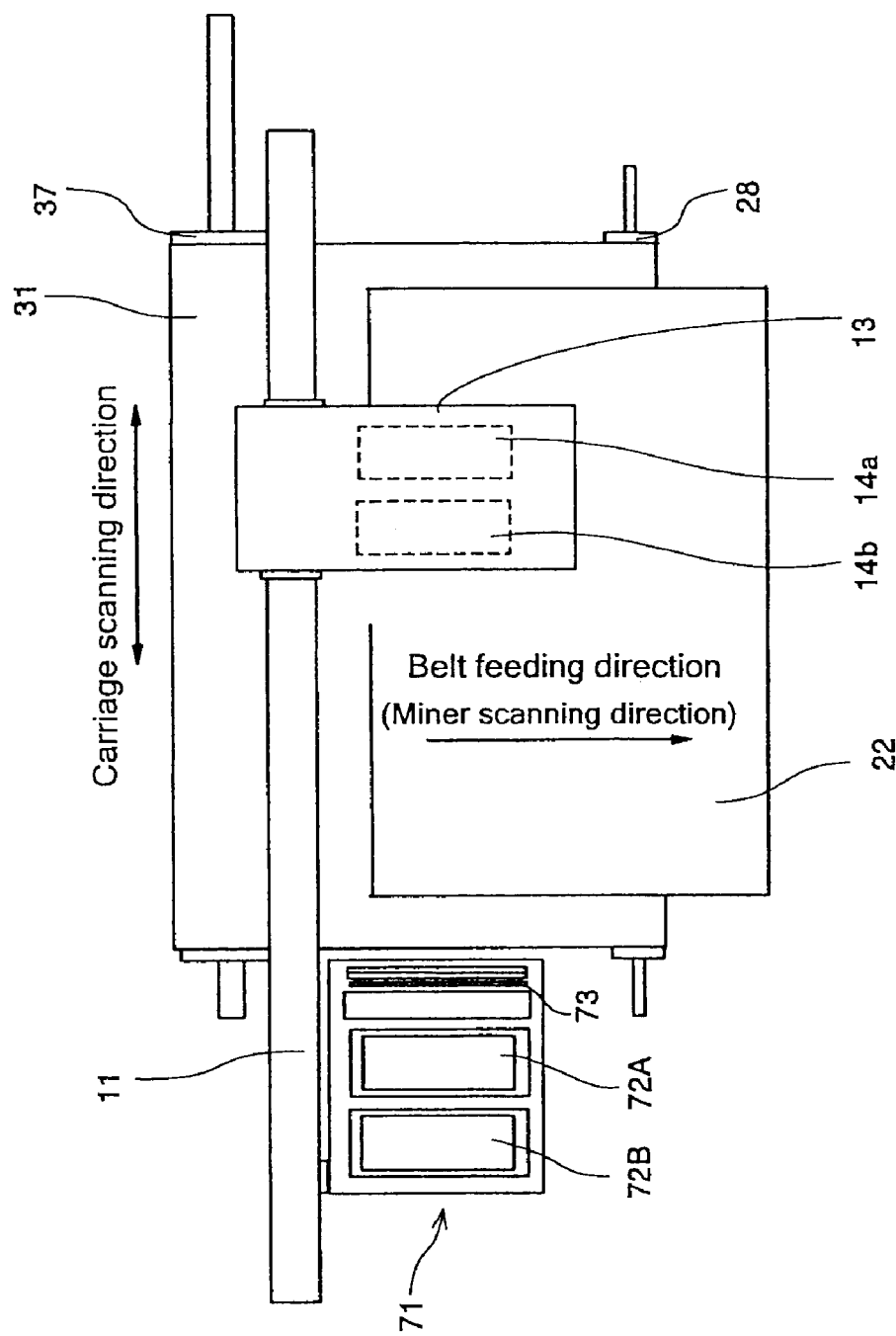
FIG. 5 is a schematic magnified view showing one example of an inkjet head of the present invention.

In the main body 1 of the apparatus, as shown in FIGS. 4 and 5, a carriage 13 is retained with freely sliding in a main scanning direction by a guide rod 11 which is a guide member bridged laterally to right and left side plates not shown in the figure and a stay 12, and is moved and scanned by a main scanning motor (not shown in the figure) in an arrow direction in FIG. 5.

In the carriage 13, a recording head 14 composed of four heads for inkjet recording which jet ink drops for recording of respective colors such as yellow (Y), cyan (C), magenta (M) and black (B) is loaded so that multiple ink jetting openings are arranged in a direction which intersects the main scanning direction and an ink drop jetting direction is directed downward.

As the head for inkjet recording which constitutes the recording head 14, it is possible to use those containing the piezoelectric actuator such as a piezoelectric element, the thermal actuator utilizing phase change by membrane boiling of the liquid using the electric thermal conversion element such as an exothermal resistive element, the shape memory alloy actuator using a metallic phase change by thermal change, and the electrostatic actuator using the electrostatic power, as the energy generation unit to jet the recording ink.

The carriage 13 carries a subtank 15 for each color to supply each color ink to the recording head 14. The recording ink of the present invention is supplied from an ink cartridge 10 of the present invention loaded in the ink cartridge loading section 6 to the subtank 15 through the supplying tube for the recording ink not shown in the figure.

Meanwhile, a paper supply section which supplies the paper 22 taken on a paper taking on section (pressure plate) 21 of the paper supply tray 2 contains a half moon type roller (paper supply roller 23) which separates and feeds the paper 22 one by one from the paper taking on section 21 and a separation pad 24 opposed to the paper supply roller 23 and composed of the material with large friction coefficient, and this separation pad 24 is biased toward the paper supply roller 23 side.

A feeding section for feeding the paper supplied from this paper supply section beneath the recording head 14 contains a feeding belt 31 for feeding the paper 22 by absorbing electrostatically, a counter roller 32 for feeding the paper 22 sent through a guide 25 from the paper supply section by sandwiching with the feeding belt 31, a feeding guide 33 for feeding the paper sent in a nearly vertical upward direction on the feeding belt 31 by changing the direction of the paper at about 90°, and a tip pressurizing roller 36 biased to the feeding belt 31 side with a pushing member 34. An electrical charged roller 36 which is an electrical charge mean to charge the surface of the feeding belt 31 is also contained.

The feeding belt is an endless belt, is disposed between a feeding roller 37 and a tension roller 38, and is capable of going around in a belt feeding direction. A guide member 77 corresponding to the printing region by the recording head 14 is disposed on the back side of the feeding belt 31. A paper discharging section for discharging the paper 22 recorded at the recording head 14 comprises a separation nail 51 for separating the paper 22 from the feeding belt 31, a paper discharging roller 52 and a discharging half moon type roller 53. A paper discharge tray 3 is disposed beneath the paper discharging roller 52.

A both side paper supply unit 61 is detachably loaded on the backside section of the main body 1. The both side paper supply unit 61 takes in the paper 22 returned in a reverse direction rotation of the feeding belt 31, reverses the paper 22 and supplies it again between the counter roller 32 and the feeding belt 31. A manual paper supply section 62 is provided on the upper surface of the both side paper supply unit 61.

In this inkjet recording apparatus, the paper 22 is separated and supplied one by one from the paper supply section, the paper 22 supplied in the nearly vertical upward direction is guided by the guide 25, and fed by being sandwiched with the feeding belt 31 and the counter roller 32. The tip of the paper is further guided by the feeding guide 33, mounted on the feeding belt 31 at the tip pressurizing half moon type roller 35, and changed in about 90° in its feeding direction.

At that time, the feeding belt 31 is charged by the electrical charged roller 36, and the paper 22 is fed by being absorbed electrostatically. The ink drop is jetted onto the stopping paper 22 to record one line by driving the recording head 14 depending on the image signals with moving the carriage 13 there, and next line is recorded after feeding the paper 22 to a given amount. A recording operation is terminated by receiving a recording termination signal or a signal that a back end of the paper 22 has reached the recording region, and the paper is discharged to the paper discharge tray 3.

When a remaining amount near end of the recording ink in the subtank 15 is detected, the recording ink in a given amount is supplied from the ink cartridge 10 to the subtank 15.

Here, the example in which the recording ink of the present invention was applied to a serial type (shuttle type) inkjet recording apparatus in which the carriage scans has been described, but the recording ink can be likewise applied to a line type inkjet recording apparatus containing a line type head.

Figure 6:
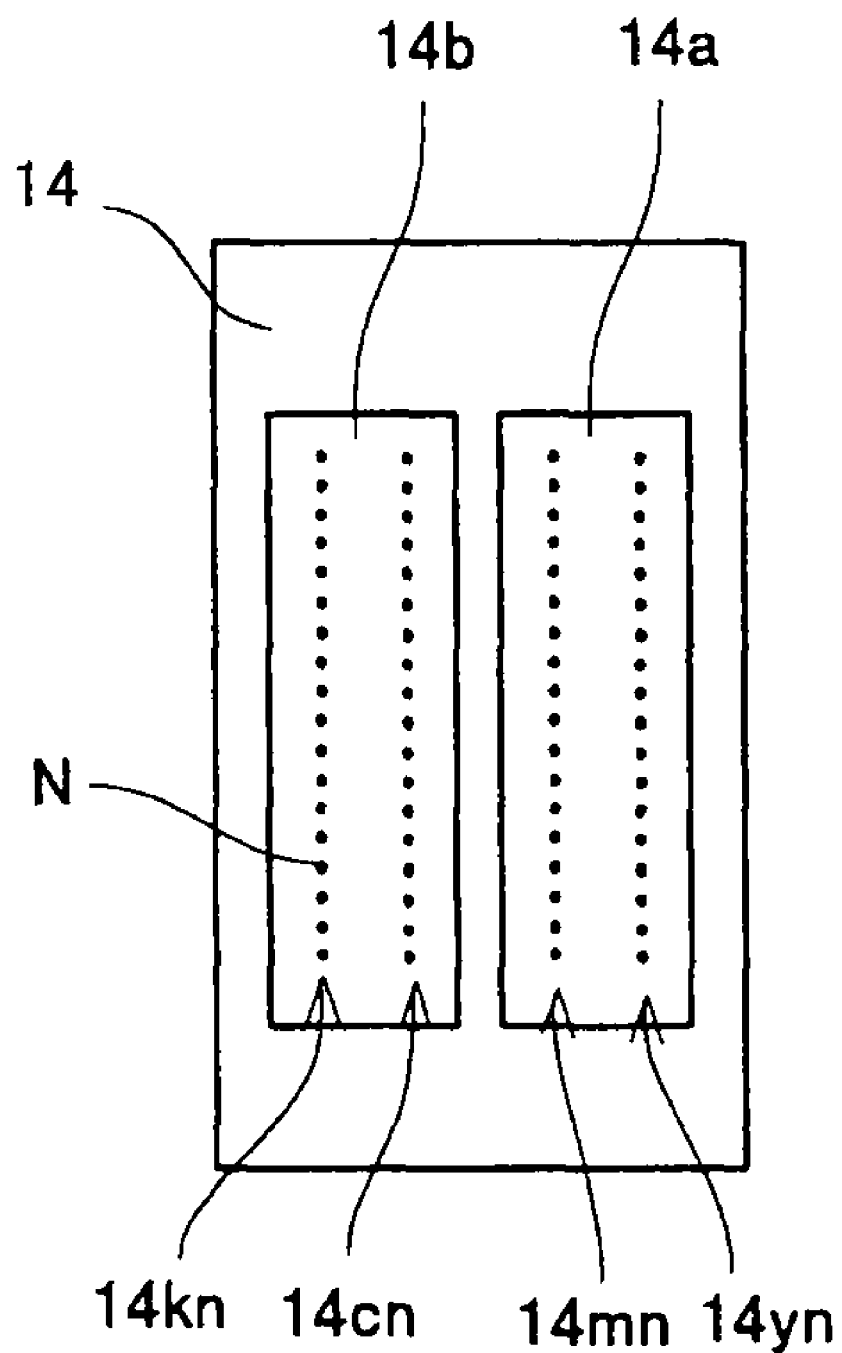
FIG. 6 is a schematic view showing nozzle lines of the inkjet head of the present invention.

Here, the recording head 14 (used by collectively meaning multiple heads) is constituted by a liquid drop jetting head 14*a* having a nozzle row 14*yn* composed of many nozzles N which jet yellow (Y) ink drops and a nozzle row 14*nm* composed of many nozzles N which jet magenta (M) ink drops, and a head 14*b* having a nozzle row 14*cn* composed of many nozzles N which jet cyan (C) ink drops and a nozzle row 14*kn* composed of many nozzles N which jet black (Bk) ink drops, for example as shown in FIG. 6.

In this case, four colors of Y, M, C and black are printed by supplying two colors from two distinct subtanks to one recording head and using four subtanks and two heads, but the four colors of Y, M, C and black may be printed by providing four heads having two nozzle rows, preparing a different color subtank for each and using four heads having two nozzle rows and four subtanks.

This example in FIG. 6 shows the inkjet printer (IPSiO G505 supplied from Ricoh Co., Ltd.), in which the same head is provided with the nozzles side by side, which jet the different color inks.

In the inkjet printer (IPSiO G707 supplied from Ricoh Co., Ltd.), although it is omitted to show in the figure, the four heads having the same structure are provided, and the yellow, magenta, cyan and black inks are supplied to respective heads.

Around the recording head, the cartridge which supplies the moisturizing liquid, the subtanks and the recording heads are provided, and dryness of the nozzle is prevented by spouting the moisturizing liquid into the capping means (moisturizing cap) which caps the nozzle in the recording head when stopped for a long time. When spouted in the cap in this way, the moisturizing liquid is preferably the liquid which contains the solid such as colorant in a small amount (or contains no solid) and whose major ingredient is water.

The inkjet printer (IPSiO G505 supplied from Ricoh Co., Ltd.) has two subtanks and nozzle rows in the same head, and one side of them may be assigned for the subtank and nozzle row for the moisturizing liquid. In this case, the heads in which the subtanks for the moisturizing liquid and the subtanks for colored inks have been provided are provided for four of the cyan, magenta, yellow and black.

In this case, since the same head has the moisturizing liquid and the recording ink, the moisturizing liquid also acts as a washing liquid for the ink for color recording upon head cleaning.

It is also possible to replace the colored ink at the nozzle with the moisturizing liquid which is hardly dried by providing a valve mechanism between the subtank of the moisturizing liquid and the subtank of the colored ink or wherever in the path from the subtank to the nozzle and opening this valve when stopped for a long time.

Even if the maintenance mechanism by the moisturizing liquid is not provided, the nozzle clogging can be prevented by performing the empty scanning by applying the voltage with strength not to jet the ink to piezoelectric elements to prevent the firmly fixed ink at the nozzle, or frequently performing so-called empty jet which jets the ink onto an empty jet receiving section (ink reservoir) other than the recording medium. It is preferable to certainly perform the empty jet at least during one page printing.

As the inkjet head which constitutes the recording head 14, it is possible to use those containing the piezoelectric actuator such as a piezoelectric element, thermal actuator utilizing phase change by membrane boiling of the liquid using the electric thermal conversion element such as an exothermal resistive element, the shape memory alloy actuator using a metallic phase change by thermal change, and the electrostatic actuator using the electrostatic power, as the energy generation unit to jet the recording ink. In Example describe later, the head using the piezoelectric actuator (piezoelectric element) for the energy generation unit is carried.

The carriage 13 carries the subtanks 15 (when each color is distinguished, signs 15*y*, 15*m*, 15*c* and 15*k* are used corresponding to the nozzle rows) which is liquid containers of respective colors to supply the respective color inks to respective nozzle rows 14*yn*, 14*nm*, 14*cn* and 14*kn* in the recording head 14. The ink is supplied from the aforementioned main tank (ink cartridge) 10 for each color (when each color is distinguished, signs 10*y*, 10*m*, 10*c* and 10*k* are used corresponding to the nozzle rows) to this subtank 15 through an ink supply tube 16. Here, the main tank 10 houses each color ink of yellow (Y), cyan (C), magenta (M) and black (K), and a capacity of the main tank 10K is larger than those of the main tanks 10*y*, 10*m* and 10*c*.

Figure 7:
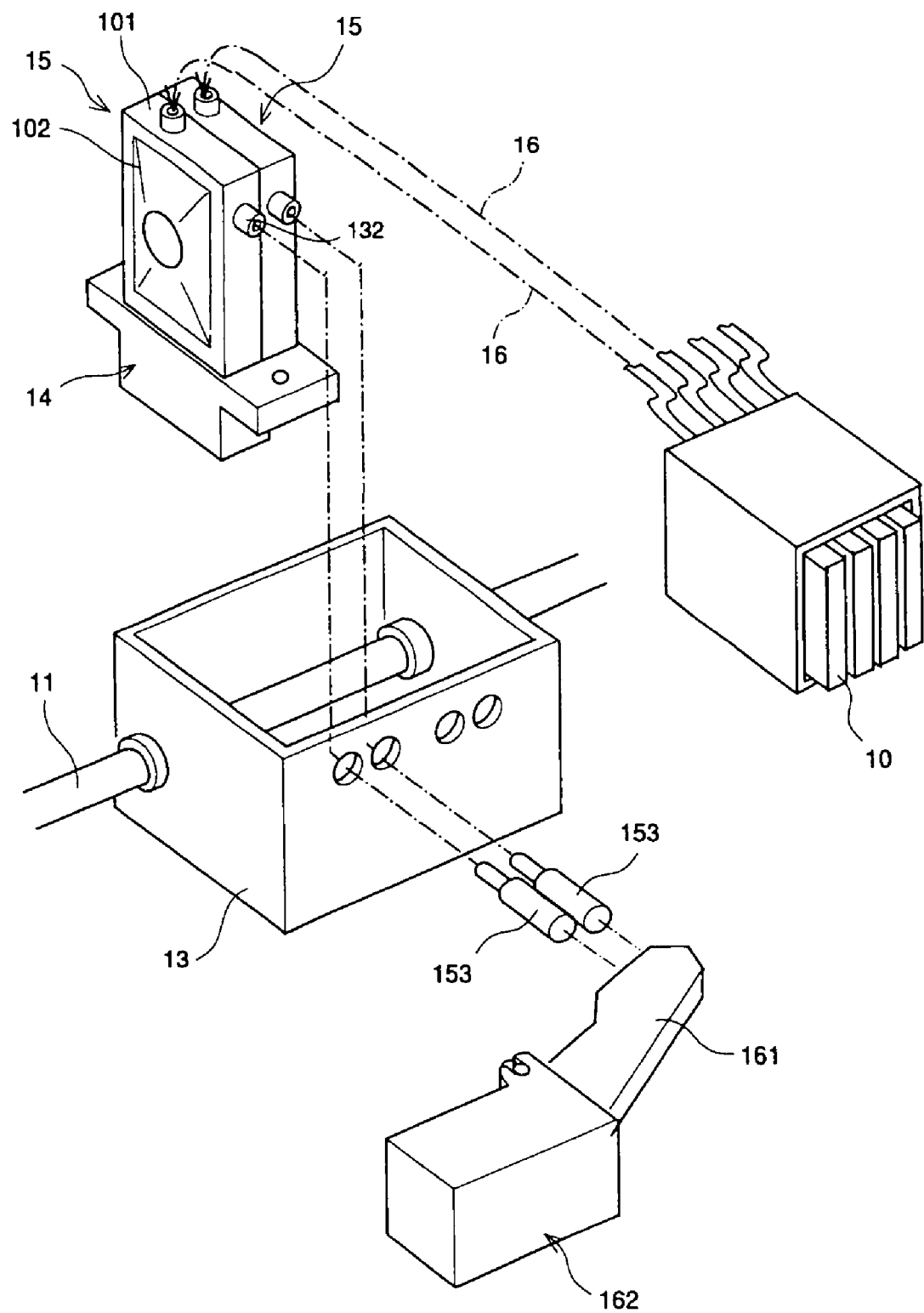
FIG. 7 is a decomposition perspective illustrative view of a liquid supply device in an inkjet recording apparatus of the present invention.
Figure 8:
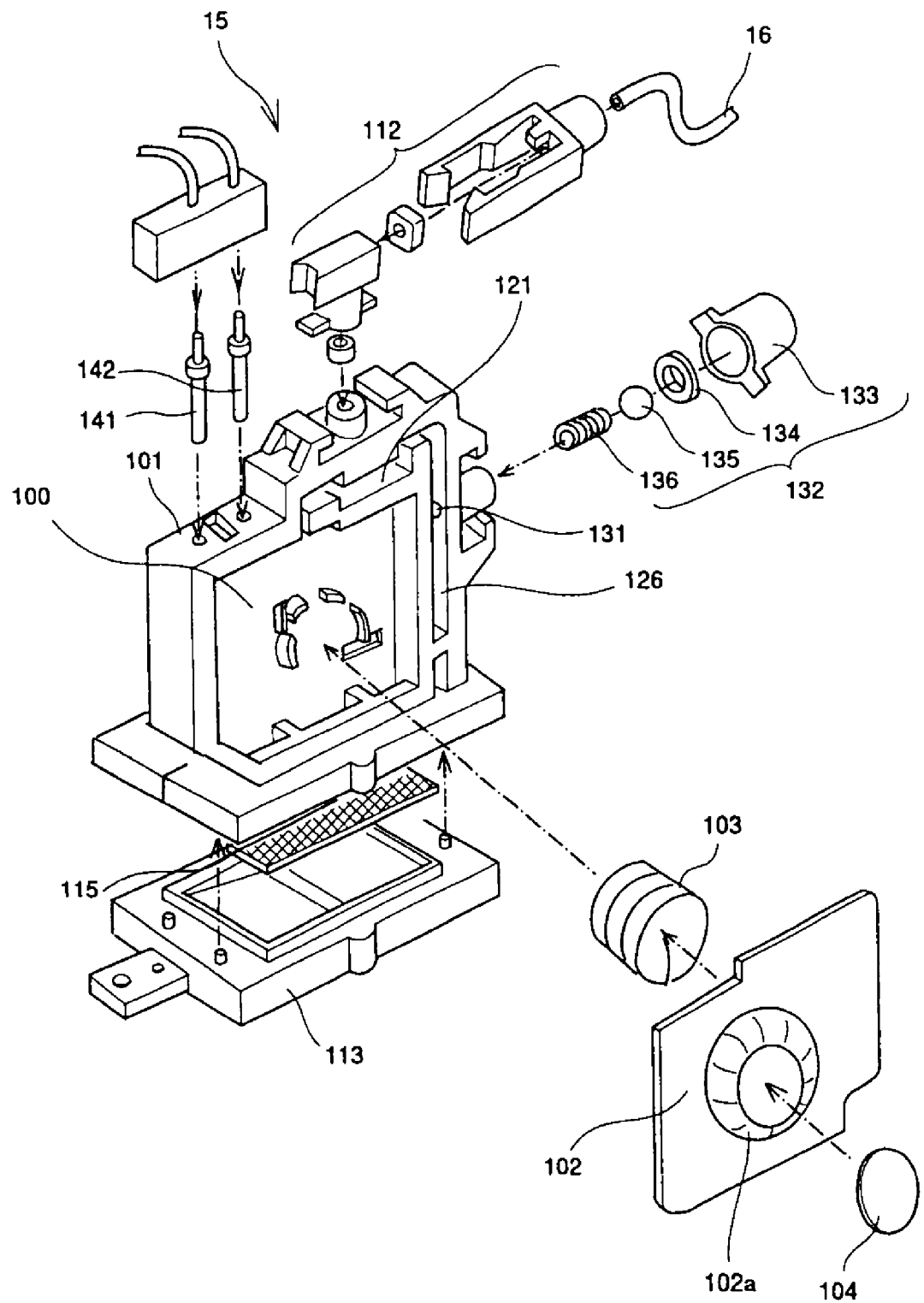
FIG. 8 is a magnified decomposition perspective view of FIG. 7.
Figure 9:
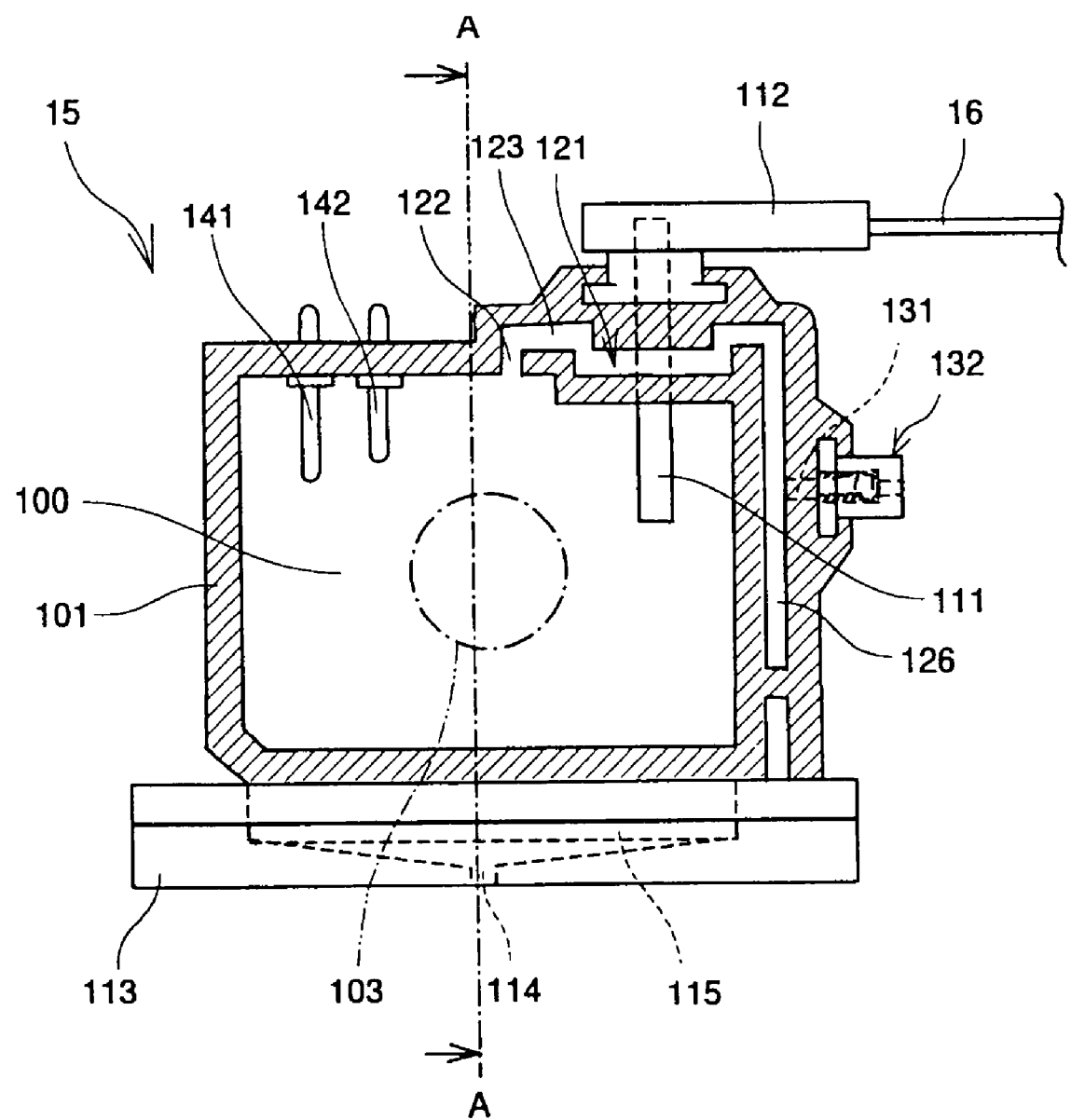
FIG. 9 is a schematic side illustrative view of a subtank.

Subsequently, the detail of an ink supply apparatus which is a liquid supply apparatus in this recording apparatus will be described with reference to FIGS. 7 to 9. FIG. 7 is a decomposition perspective illustrating view of portions according to the ink supply apparatus, FIG. 8 is a detailed view thereof, and FIG. 9 is a schematic side view of the subtank.

As described above, this ink supply apparatus is constituted by the subtank 15 which is the liquid container which is carried by the carriage 13 and supplies the ink to the respective recording heads 14 (14*a*, 14*b*), and the main tank (ink cartridge) 10 for supplying the ink to the subtank 15 through the supply tube 16.

In one subtank 15, a film-shaped member (flexible film-shaped member) 102 having flexibility to close an opening (one side of the subtank 15) of an ink housing section 100 is stuck by adhesion or deposition to a container main body (case main body) 101 which forms the ink housing section 100 in which the ink is housed, and further a spring 103 which is an elastic member to bias the film-shaped member 102 to an outer side is provided between the case main body 101 and the film-shaped member 102 inside the ink housing section 100.

Figure 10A:
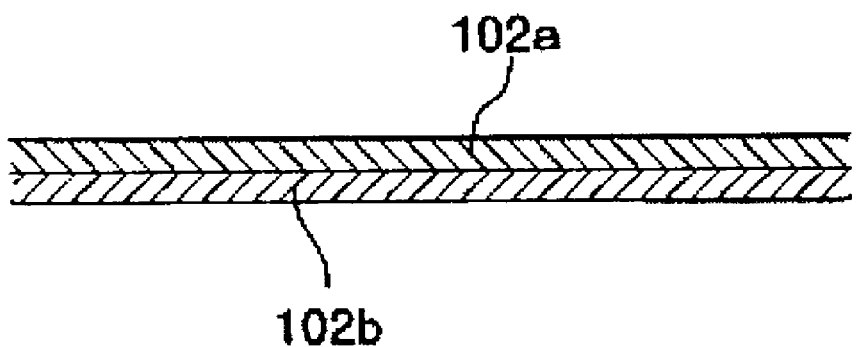
FIG. 10A is a schematic sectional view of an A-A line in FIG. 9.
Figure 10B:
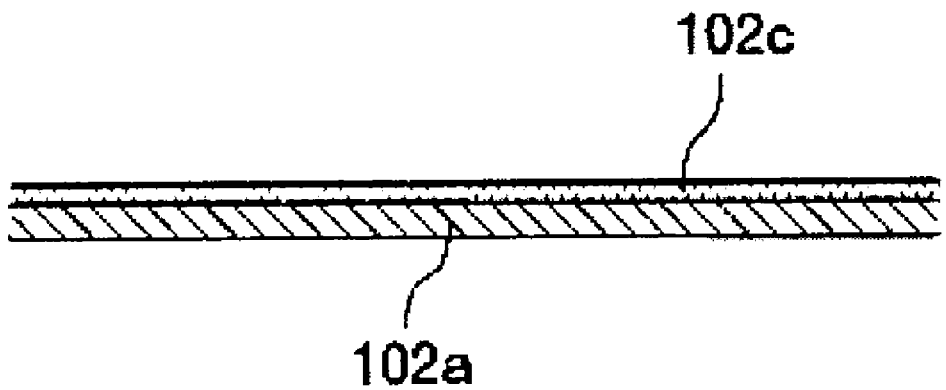
FIG. 10B is a schematic sectional view of an A-A line in FIG. 9.

Here, the above film-shaped member may have a single layer, but as shown in FIG. 10A, various different first layer 102*a* and second layer 102*b* may be laminated to make a bilayer structure, and the film-shaped members of polyethylene and nylon may be laminated, and as shown in FIG. 10B, a silica deposition layer 102*c* can be formed on the first layer 102*a*. By making such a constitution, it is possible to certainly assure liquid resistance to the ink. By including the silica deposition layer in the film-shaped member 102, it is also possible to enhance the liquid resistance to the ink.

The thickness of the film-shaped member 102 is preferably 10 μm to 100 μm. When the thickness is less than 10 μm, breakage due to deterioration with time easily occurs. When it exceeds 100 μm, efficient negative pressure sometimes hardly occurs due to the reduction of flexibility.

Furthermore, in the film-shaped member 102, a swelling section 102*a* which becomes a convex shape responding to the spring 103 is formed, and a reinforcing member 104 is attached to an outer side thereof. By providing the flexible film-shaped member 102 with the convex section in this way, it is possible to stably retain the elastic member (spring here) 103. In this case, in the flexible film-shaped member 102, the convex section can be easily formed by molding a sheet-shaped film member into a convex shape.

The case 101 is provided with an ink introducing path 111 to supply the ink to the ink housing section 100, and a joining means 112 to connect this ink introducing path 111 with the supply tube 16 connected to the ink cartridge 10 is loaded detachably. A liquid sending pump described later for sending the ink with pressure from the ink cartridge 10 to the subtank 15 is provided between the ink cartridge 10 and the subtank 15.

Furthermore, a joining member 113 for supplying the ink from the ink housing section 100 to the recording head 14 is attached beneath the case 101, an ink supply path 114 of the recording head 14 is formed in this joining member 113, and a filter stands between the ink housing section 100 and the joining member 113.

An air flow path 121 for sending out the air from the ink housing section 100 is formed at an upper part of the case 101. This air flow path 121 contains an inlet flow path portion 122 having an opening in the ink housing section 100 and a flow path portion (referred to as "orthogonal flow path portion") 123 subsequent to this inlet flow path portion 122, communicates with an air opening hole 131 provided downstream of the case 101, and further continuously forms an accumulating section 126 at a portion which is a lower side in use than the air opening hole 131.

This air opening hole 131 is provided with an air opening valve mechanism 132 which is an air opening means for switching a sealed state and an air opening state in the subtank 15. This valve mechanism 132 is constituted by housing a valve seat 134, a ball 135 which is a valve element and a spring 136 which biases this ball to the valve seat 134 side in a holder 133.

Describing about the action of the accumulating section 126, when the apparatus main body is inclined or swung, it is highly likely that the ink penetrates in the air flow path 121. Thus, by accumulating the ink penetrated from the air flow path 121 in the accumulating section 126, even when the ink penetrates due to falling upon transport, it is prevented that the air opening valve mechanism 132 goes into poor operation due to penetrating and fixing the ink in the air opening hole 131 and the air opening valve mechanism 132 which opens and closes this.

Two detection electrodes 141, 142 for detecting that the ink amount is equal to or less than the given amount (this state is made a "no ink state") in the subtank 15 is loaded at the upper portion of the case 101. The "no ink state" can be detected by changing a conductive state between the detection electrodes 141 and 142 in the state in which both detection electrodes are immersed in the ink and in the state in which at least either one is not immersed in the ink.

Figure 11:
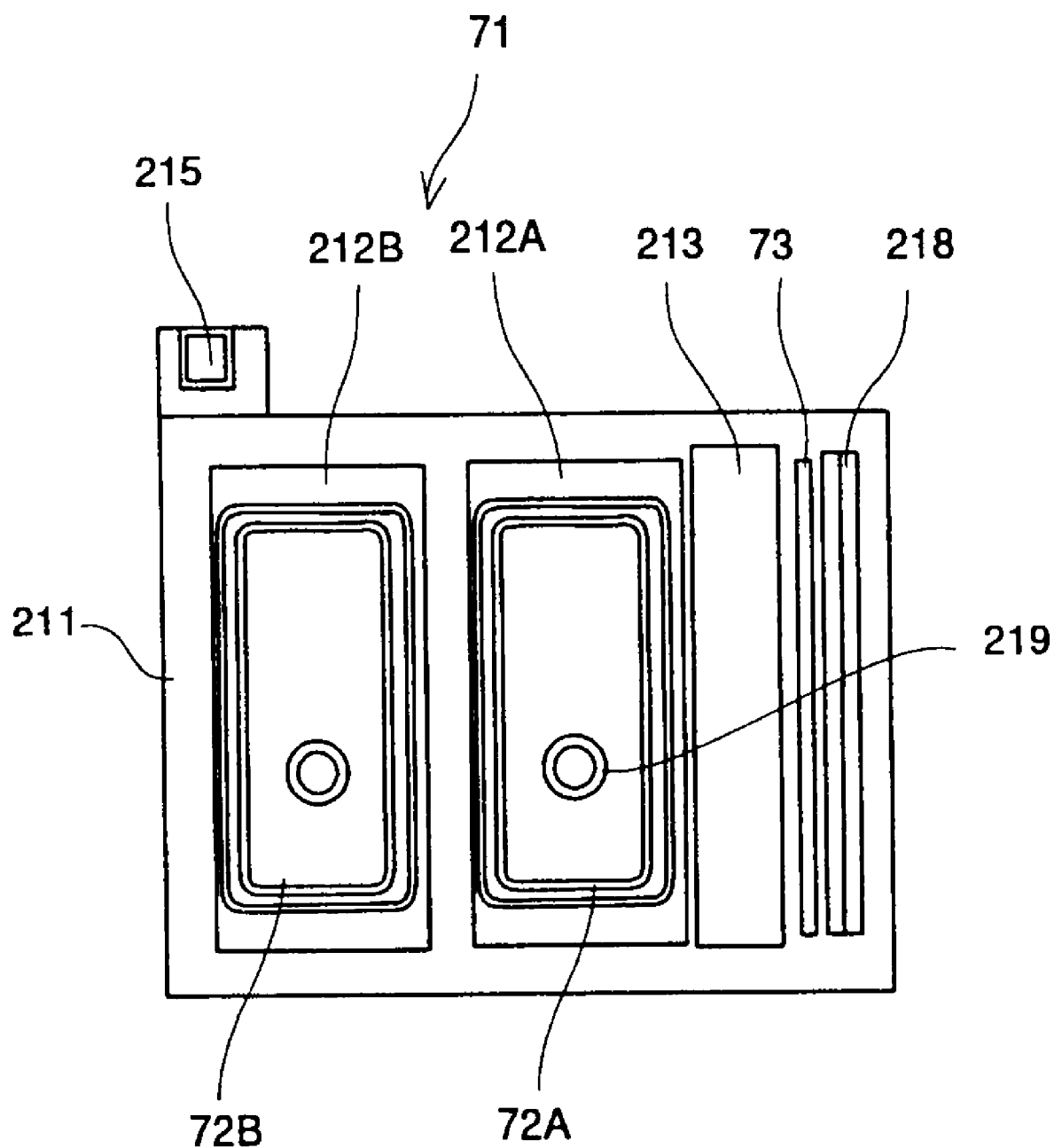
FIG. 11 is a view seen from a top of a maintenance unit of an inkjet printer of the present invention.
Figure 12:
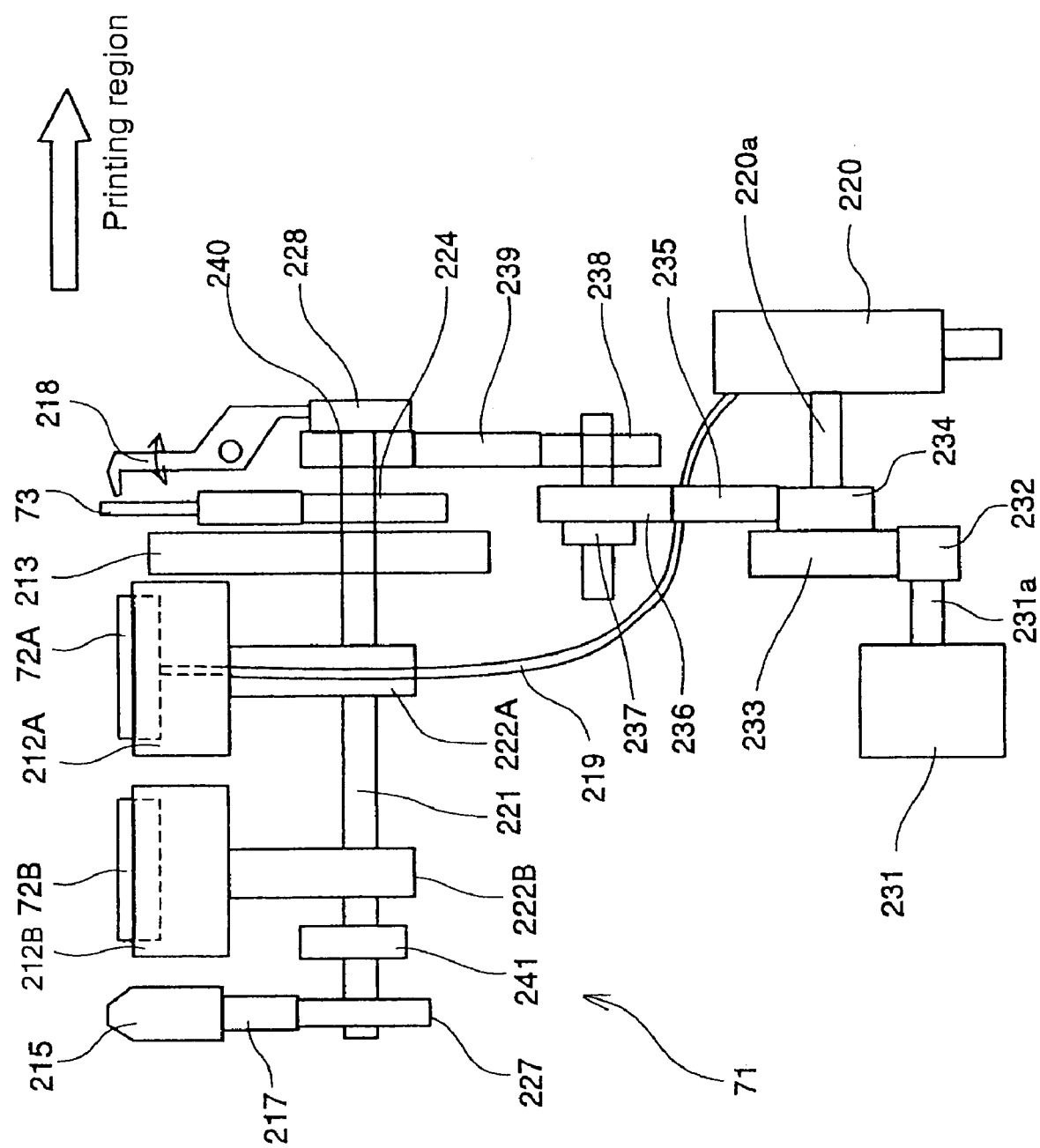
FIG. 12 is a schematic illustrative view showing one example of the maintenance unit of the inkjet printer of the present invention.

In the inkjet recording apparatus of the present invention, as shown in FIGS. 11 and 12, a maintenance recovery mechanism (hereinafter sometimes referred to as a "subsystem") 71 for maintaining and recovering the nozzle state in the recording head 14 is disposed in a non-printing region at one side (or may be both sides) in the scanning direction of the carriage 13. FIG. 11 is a view of the maintenance recovery mechanism seen from the top, and FIG. 12 is a schematic illustrating view of a maintenance unit. This subsystem 71 contains capping members 72A, 72B for capping respective nozzle sides of the recording heads 14a, 14b and a wiper blade 73 for wiping the nozzle side. An empty jet catcher upon empty jet is provided between this capping member 72A and the wiper blade 73. This empty jet catcher is constituted so that the jetted ink flows to a lower waste tank, and since the ink is easily fixed firmly onto this portion (jetted portion), the wiper which automatically scrapes the firmly fixed ink is provided.

Subsequently, the maintenance recovery mechanism 71 according to the inkjet recording apparatus of the present invention will be described.

As shown in FIGS. 11 and 12, when first a motor 231 is normally rotated, a motor gear 232, an intermediumte gear 235, an intermediumte gear 236 and an intermediumte gear 237 are rotated, and then a tube pump runs to suck in a cap at the far right (recording region side) joined with the pump and the tube 219. Other gears do not run because a one way clutch 237 is not joined.

When the motor 231 is reversely rotated, the one way clutch 237 is joined, parts from the motor to a cam shaft are rotated. The tube pump is reversely rotated, but it does not run as the pump.

The cam shaft is attached so that a carriage lock cam 227 and cap cams 222B and 222A and a wiper cam 224, and a wiper cleaner cam 228, and a cam 241 for a home position sensor are integrally rotated.

A carriage lock 215 is biased to an upward direction (lock direction) by a compression spring (not shown in the figure). The carriage lock 215 goes up and down by a carriage lock arm 217 in contact with a cam side of the carriage lock cam 227.

Caps 72A and 72B and a cap holder 212A go up and down by the cap cams 222A and 222B.

The wiper 73 goes up and down by the wiper cam 228.

A wiper cleaner 218 is biased by a spring to a direction moving away from the wiper 73, and operates in a wiper direction by the wiper cleaner cam 218. The wiper 73 is sent down as being sandwiched with the wiper cleaner 218 and the empty jet catcher to scrape the ink on the wiper into empty jet.

A sensor (photointeruptor not shown in the figure) is secured in the main body of the maintenance unit. Motor (other than the pump) home positions are detected by operating an HP lever (not shown in the figure) to make the sensor "on" when the cap comes to the lowest end by the home position cam (in the case other than this, the HP lever is not operated and the sensor is made always "off").

When the power is "on", the caps 72A and 72B go up and down regardless of the positions of the cap holders 212A and 212B (the position is not detected until starting the movement). After detecting the home position of the cap (during the elevation), the cap moves a given amount to move to the lowest end. Thereafter, the carriage moves from side to side to detect the position, and then returns to the cap position to undergo the capping.

In the operation order when the motor is reversely rotated, a series of operation composed of a cap elevation (simultaneous carriage lock), a cap descent (simultaneous carriage lock), home position sensor "on", a wiper elevation, start of wiper cleaner operation (the wiper is pushed to the empty jet catcher), wiper descent (the wiper is wiped with the wiper cleaner) and return to the wiper cleaner is repeated.

The inkjet recording apparatus and the inkjet recording method of the present invention can be applied to various recordings by the inkjet recording system, and for example, can be suitably applied to printers for inkjet recording, facsimile apparatuses, copying apparatuses, printer/facsimile/copia composite machines, and the like (Ink Media Set)

An ink media set according to a first aspect of the present invention has a recording ink, and a recording medium, and further has other constitutions if necessary, wherein the recording ink contains at least a solid component, a liquid component, and water; the solid component contains a colorant and a resin and is a solid at 25° C.; the liquid component has a higher boiling point than that of water and is a liquid at 25° C.; and the total content of the liquid component in the recording ink is 20% by mass or less.

The contents other than stated above on the recording ink in the ink media set according to the first aspect are same as those in the recording ink of the present invention.

An ink media set according to a second aspect of the present invention has a recording ink and a recording medium, and further has other constitutions if necessary.

An ink media set according to a third aspect of the present invention has a recording ink and a recording medium composed of the non-porous substrate, and further has other constitutions if necessary.

A recording ink in the ink media set according to any one of the second aspect ant the third aspect contains at least a solid component, a liquid component, and water; the solid component contains a colorant and a resin and is a solid at 25° C.; the liquid component has a higher boiling point than that of water and is a liquid at 25° C.; and the total content of the liquid component in the recording ink is 30% by mass or less.

The components other than the total content of the liquid component of the recording ink in the ink media set according to any one of the second aspect and the third aspect are the same as in the recording ink of the present invention.

An ink media set according to a fourth aspect of the present invention contains a recording ink and a recording medium, wherein the recording ink contains at least a pigment of a polymer emulsion type containing a color material which is water insoluble or hardly water soluble in polymer fine particles, water dispersible resin fine particles and a wetting agent; the total solid content of the pigment of polymer emulsion type and the water dispersible resin fine particles is 20% by mass or more; and the content of the wetting agent is 20% by mass or more.

An ink media set according to a fifth aspect of the present invention contains a recording ink and a recording medium, wherein the recording ink contains at least a colorant, a water dispersible resin, and a wetting agent; the total solid content of the recording ink is 20% by mass or more; the content of the wetting agent is 20% by mass or more; and the wetting agent is composed of a glycerine alone or the content of the glycerine in the wetting agent is 80% by mass or more.

In the case of such a recording ink in having a large content of a wetting agent, it is preferable to provide an ink dry-forcing step to increase the drying speed. For the method of drying the recording ink, the ink dry-forcing step may be provided before recording or may be provided after recording.

The drying unit may be a unit configured to apply microwave energy to paper by means of the microwave energy or may be a non-contact drying unit like a drying unit based on a heating wire technique. Further, a contact type drying unit such as a heat roller may be separately provided. A drying unit that directly heats a roller itself or a drying unit that indirectly heats a roller from another heating source may be used.

For the recording medium used in an ink media set according to any one of the first, the second, the fourth, and the fifth aspects of the present invention, the following ink medium is used.

<Recording Medium>

The recording medium of the present invention has a support and a coating layer on at least one surface of the support, and further has other layers if necessary.

In the recording medium, a transfer amount of purified water to the recording medium is 2 mL/m$^2$ to 35 mL/m$^2$ and preferably 2 mL/m$^2$ to 10 mL/m$^2$ for a contact time of 100 ms measured using a dynamic scanning absorptometer.

When the transfer amount of the ink and purified water for the contact time of 100 ms is too small, beading easily occurs. When it is too large, a diameter of an ink dot after recording is sometimes much smaller than the desired diameter.

The transfer amount of purified water to the recording medium is 3 mL/m$^2$ to 40 mL/m$^2$ and preferably 3 mL/m$^2$ to 10 mL/m$^2$ for the contact time of 400 ms measured using the dynamic scanning absorptometer.

When the transfer amount for the contact time of 400 ms is too small, the drying property is insufficient and thus a spur mark easily occurs. When it is too large, the glossiness of the image portion after drying sometimes becomes low.

Here, the dynamic scanning absorptometer (DSA, Kami-Pa-Gi-Kyou-Shi vol. 48, 88-92, May, 1994, Sigenori Kukan) is a device capable of exactly measuring an absorbed liquid amount for an extremely short time. The dynamic scanning absorptometer automates the measurement by the method of directly reading a speed of absorbing the liquid in a capillary from the movement of meniscus, the method of making a sample a disc shape and spirally scanning a absorbing liquid head thereon and the method of automatically changing a scanning speed according to a predetermined pattern to measure only a number of necessary points on one sample. A liquid supply head to a paper sample is connected to the capillary through a Teflon (registered trade name) tube, and the position of the meniscus in the capillary is automatically read by an optical sensor. Specifically, using the dynamic scanning absorptometer (K350 series D type supplied from Kyowa Seiko Co., Ltd.), the transfer amount of purified water or the ink was measured. The transfer amount for the contact time of 100 ms and 400 ms can be calculated by interpolation from a measured value of the transfer amount at contact time adjacent to each contact time.

Support

The support is not particularly limited, can be appropriately selected depending on the purpose, and includes, for example, paper whose major ingredient is wood fiber and sheet-shaped substances such as nonwoven fabrics whose major ingredients are wood fibers and synthetic fibers.

The paper is not particularly limited, can be appropriately selected depending on the purpose, and includes, for example, wood pulps and used paper pulps. The wood pulps include, for example, broad leaved tree bleached kraft pulps (LBKP), needle leaved tree bleached kraft pulps (NBKP), NBSP, LBSP, GP and TMP.

Raw materials of the used paper pulps include super white, white with rule marks, cream white, cards, particular white, medium white, simili paper, color white, Kent paper, white art, special high cut, another high cut, newspapers and journals shown in used paper standard quality specification table in Paper Recycling Promotion Center. Specifically, non-coated computer sheets, printer sheets such as thermal papers and pressure-sensitive papers which are information-related sheets; used OA sheets such as PPC sheets; used papers of papers or plate papers of coated papers such as art papers, coated papers, finely coated papers and mat papers; and non-coated papers such as quality papers, color high quality papers, notepapers, letter papers, packing papers, facsimile papers, medium quality papers, newspapers, fancy-figured papers, super ceremony papers, structure papers, pure white rolling papers and milk cartons are included, and chemical pulp papers and high process yield pulp-containing papers are included. These may be used alone or in combination of two or more.

The used paper pulp is generally produced by combining the following 4 steps:
(1) a dissociation step in which the used paper is crumbed into fibers using a pulper by treating with a mechanical force and chemicals, and printed inks are peeled from the fibers;
(2) a cleaning step in which foreign matters (plastics and the like) and dusts contained in the used paper are eliminated by a screen or a cleaner;
(3) a deinking step in which the printed inks peeled from the fibers using the surfactant are eliminated out of the system by a floatation method or a washing method; and
(4) a bleaching step in which a white degree of the fibers is enhanced using an oxidation action or a reduction action.

When the used paper pulp is mixed, a mixed rate of the used paper pulp is preferably 40% or less relative to the entire pulps in terms of measure for curling after the recording.

As an internally added filler used in the support, for example, conventionally and publicly known white pigments are used. The white pigments include, for example, white inorganic pigments such as light calcium carbonate, heavy calcium carbonate, kaolin, clay, talc, calcium sulfate, barium sulfate, titanium dioxide, zinc oxide, zinc sulfide, zinc carbonate, satin white, aluminium silicate, diatom earth, calcium silicate, magnesium silicate, synthetic silica, alumina, lithopone, zeolite, magnesium carbonate and magnesium carbonate, and organic pigments such as styrene based plastic pigments, acrylic plastic pigments, polyethylene, microcapsules, urea resins and melamine resins. These may be used alone or in combination of two or more.

An internally added sizing agent used for making the support includes, for example, neutral rosin sizing agents used for neutral paper making, alkenyl succinic acid anhydrate (ASA), alkyl ketene dimers (AKD) and petroleum resin based sizing agents. Among them, the neutral rosin sizing agent and alkenyl succinic acid anhydrate are particularly suitable. The alkyl ketene dimer is required in a small amount because of its high sizing effect, but since a friction coefficient on the recording paper (medium) is reduced and the ink is easily slid, and thus this is not preferable in terms of feeding property upon inkjet recording in some cases.

Coating Layer

The coating layer contains a pigment and a binder, and further contains a surfactant and other ingredients if necessary.

As the pigment, inorganic pigments or those combining the inorganic pigment and an organic pigment can be used.

The inorganic pigments include, for example, kaolin, heavy calcium carbonate, light calcium carbonate, calcium sulfite, amorphous silica, titanium white, magnesium carbonate, titanium dioxide, aluminium hydroxide, calcium hydroxide, magnesium hydroxide, zinc hydroxide and chlorite. Among them, kaolin is preferable because this is excellent in glossiness expression and texture close to the paper for offset printing can be made.

In the kaolin, there are delaminated kaolin, baked kaolin and engineered kaolin obtained by modifying its surface. Considering the glossiness expression, it is preferable that kaolin having a particle diameter distribution in which an amount of kaolin with particle diameter of 2 µm or less is 80% by mass occupies 50% by mass or more in entire kaolin.

The amount of kaolin to be added is preferably 50 parts by mass or more relative to 100 parts by mass of the binder.

When the amount is less than 50 parts by mass, the efficient effect is not obtained in glossiness. An upper limit of the amount to be added is not particularly limited, but considering fluidity, particularly thickening property under high shearing force, it is preferable that the amount to be added is 90 parts by mass or less in terms of coating suitability.

The organic pigments include, for example, water soluble dispersions of styrene-acryl copolymer particles, styrene-butadiene copolymer particles, polystyrene particles and polyethylene particles. These organic pigments may be used in mixture of two or more.

The amount of the organic pigment to be added is preferably 2 parts by mass to 20 parts by mass relative to 100 parts by mass of all pigments in the coating layer. The organic pigment is excellent in glossiness expression and its specific gravity is smaller than that of the inorganic pigment. Thus, the bulky and highly glossy coating layer having a good surface coating property can be obtained. When the amount to be added is less than 2 parts by mass, no effect is obtained. When it exceeds 20 parts by mass, the fluidity of a coating solution is deteriorated, which leads to the reduction of coating operability, and it is not economical in terms of cost.

The organic pigment may be in a form of a compact type, a hollow type and a doughnut type, and in the light of surface coating property and fluidity of the coating solution, the average particle diameter is preferably 0.2 μm to 3.0 μm, and more preferably the hollow type with a void rate of 40% or more is employed.

As the binder, it is preferable to use a water-based resin.

As the water-based resin, at least either water soluble resins or water dispersible resins are suitably used. The water soluble resins are not particularly limited, can be appropriately selected depending on the purpose, and include, for example, polyvinyl alcohol, modified polyvinyl alcohols such as cation modified polyvinyl alcohol and acetal modified polyvinyl alcohol; polyvinyl pyrrolidone and modified polyvinyl pyrrolidone such as copolymers of polyvinyl pyrrolidone and vinyl acetate, copolymers of vinyl pyrrolidone and dimethylaminoethyl methacrylate, copolymers of quaternized vinyl pyrrolidone and dimethylaminoethyl methacrylate and copolymers of vinyl pyrrolidone and metacrylamidepropyl trimethyl ammonium chloride; celluloses such as carboxymethylcellulose, hydroxyethylcellulose and hydroxypropylcellulose; modified cellulose such as cationized hydroxyethylcellulose; polyester, polyacrylic acid (ester), melamine resins or modified products thereof; synthetic resins such as copolymers of polyester and polyurethane; poly(meth)acrylic acid, poly(meth)acrylamide, oxidized starch, phosphate esterified starch, self-modified starch, cationized starch or various modified starch, polyethylene oxide, soda polyacrylate and soda alginate. These may be used alone or in combination of two or more.

Among them, polyvinyl alcohol, cation modified polyvinyl alcohol, acetal modified polyvinyl alcohol, polyester, polyurethane and copolymers of polyester and polyurethane and the like are particularly preferable in terms of absorbability of the ink.

The water dispersible resins are not particularly limited, can be appropriately selected depending on the purpose, and include, for example, polyvinyl acetate, copolymers of ethylene and vinyl acetate, polystyrene, copolymers of styrene and (meth)acrylic acid, copolymers of (meth)acrylate ester, copolymers of vinyl acetate and (meth)acrylate ester, styrene-butadiene copolymers, ethylene-propylene copolymers and silicone-acryl based copolymers. Crosslinking agents such as methylolized melamine, methylolized urea, methylolized hydroxypropylene urea and isocyanate may be contained, and the resins may be copolymers having a unit of N-methylol acrylamide and may have self crosslinking property. These water-based resins can be used simultaneously in combination of two or more.

The amount of the water-based resin to be added is preferably 2 parts by mass to 100 parts by mass, and more preferably 3 parts by mass to 50 parts by mass relative to 100 parts by mass of the pigment. The amount of the water-based resin to be added is determined so that the absorbing property of the recording medium falls into the desired range.

When the water dispersible colorant is used as the colorant, the cationic organic compound is not always necessary to be combined, is not particularly limited, can be appropriately selected depending on the purpose, and includes, for example, primary to tertiary amines, monomers, oligomers and polymers of quaternary ammonium salts which form insoluble salts by reacting with sulfone group, carboxyl group or amino group in the direct dye and the acidic dye in the water soluble ink. Among them, the oligomer or the polymer is preferable.

The cationic organic compounds include, for example, dimethylamine epichlorohydrin polycondensates, dimethylamine ammonia epichlorohydrin condensates, poly(trimethylaminoethyl methacrylate methyl sulfate salt), diallylamine hydrochloride salts, acrylamide copolymers, poly(diallylamine hydrochloride salt sulfur dioxide), polyallylamine hydrochloride salts, poly(diallylamine hydrochloride salt diallylamine hydrochloride salt), acrylamide diallylamine copolymers, polyvinylamine copolymers, dicyandiamide ammonium chloride urea formaldehyde condensates, polyalkylenepolyamine dicyandiamide ammonium salt condensates, dimethyldiallyl ammonium chloride polydiallylmethylamine hydrochloride salts, poly(diallyldimethyl ammonium chloride), poly(diallyldimethyl ammonium chloride sulfur dioxide), poly(diallyldimethyl ammonium chloride diallylamine hydrochloride salt derivative), acrylamide diallyldimethyl ammonium chloride copolymers, acrylate salts, acrylamide diallylamine hydrochloride salt copolymers, ethyleneimine derivatives such as polyethyleneimine and acrylamine polymers and modified polyethyleneimine alkylene oxide. These may be used alone or in combination of two or more.

Among them, it is preferable to use by combining the low molecular weight cationic organic compound such as dimethylamine epichlorohydrin polycondensate and polyallylamine hydrochloride salt with the relatively high molecular weight cationic organic compound such as poly(diallyldimethyl ammonium chloride). By the combination, the image density is enhanced and feathering is further reduced compared with the case of a single use.

A cation equivalent of the cationic organic compound by colloid titration method (use polyvinyl potassium sulfate and toluidine blue) is preferably 3 meq/g to 8 meq/g. When the cation equivalent is in this range, the good result is obtained in the range of the above dried adhesion amount.

Here, when the cation equivalent is measured by the colloid titration method, the cationic organic compound is diluted with distilled water so that the solid content is 0.1% by mass, and pH is not adjusted.

The dried adhesion amount of the cationic organic compound is preferably 0.3 g/m$^2$ to 2.0 g/m$^2$. When the dried adhesion amount of the cationic organic compound is less than 0.3 g/m$^2$, the image density is not sufficiently enhanced and the feathering is not reduced in some cases.

The surfactant is not particularly limited, can be appropriately selected depending on the purpose, and any of anionic surfactants, cationic surfactants, ampholytic surfactants, and nonionic surfactants can be used. Among them, the nonionic surfactants are particularly preferable. By adding the surfactant, the water resistance of the image is enhanced as well as the image density is increased and the bleeding is improved.

The nonionic surfactants include, for example, higher alcohol ethylene oxide adducts, alkylphenol ethylene oxide adducts, fatty acid ethylene oxide adducts, polyvalent alcohol fatty acid ester ethylene oxide adducts, higher aliphatic amine ethylene oxide adducts, fatty acid amide ethylene oxide adducts, ethylene oxide adducts of fats and oils, polypropylene glycol ethylene oxide adducts, fatty acid ester of glycerol, fatty acid ester of pentaerythritol, fatty acid ester of sorbitol and sorbitan, fatty acid ester of sucrose, alkyl ether of polyvalent alcohol and fatty acid amide of alkanolamine. These may be used alone or in combination of two or more.

The polyvalent alcohol is not particularly limited, can be appropriately selected depending on the purpose, and includes, for example, glycerol, trimethylolpropane, pentaerythrit, sorbitol and sucrose. For the ethylene oxide adduct, those in which a part of ethylene oxide is substituted with alkylene oxide such as propylene oxide or butylene oxide in the range in which water solubility can be kept are available. A substitution rate is preferably 50% or less. HLB (ratio of hydrophilicity/hydrophobicity) of the nonionic surfactant is preferably 4 to 15 and more preferably 7 to 13.

The amount of the surfactant to be added is preferably 0 part by mass to 10 parts by mass and more preferably 0.1 parts by mass to 1.0 part by mass relative to 100 parts by mass of the cationic organic compound.

Other ingredients can be added to the coating layer if necessary in the range in which the objects and effects of the present invention are not impaired. The other ingredients include additives such as alumina powders, pH adjusters, preservatives and antioxidants.

The method of forming the coating layer is not particularly limited, can be appropriately selected depending on the purpose, and can be performed by the method of impregnating or applying a coating layer solution in/on the support. The method of impregnating or applying the coating layer solution layer is not particularly limited, can be appropriately selected depending on the purpose, and for example, it is possible to coat using various coating machines such as a conventional size press, a gate roll size press, a film transfer size press, a blade coater, a rod coater, an air knife coater and a curtain coater. In terms of cost, the coating layer solution may be impregnated or adhered using the conventional size press, the gate roll size press or the film transfer size press installed in a paper making machine, and finished up on machine.

The amount of the coating layer solution to be adhered is not particularly limited, can be appropriately selected depending on the purpose, and preferably 0.5 g/m$^2$ to 20 g/m$^2$ and more preferably 1 g/m$^2$ to 15 g/m$^2$ in terms of solid content.

After the impregnation or the application, drying may be performed if necessary. In this case, a temperature for the drying is not particularly limited, can be appropriately selected depending on the purpose, and is preferably about 100° C. to 250° C.

In the recording medium, a back layer on a backside of the support, and another layer between the support and the coating layer or between the support and the back layer may be further formed, and a protection layer may also be formed on the coating layer. These layers may be a monolayer or a multilayer.

The recording medium may be commercially available coated papers for offset printing and coated papers for gravure printing in addition to the medium for inkjet printing if the absorbing property is in the range of the present invention.

The basis weight of the recording medium is preferably ranging from 50 g/m$^2$ to 250 g/m$^2$, and more preferably 50 g/m$^2$ to 200 g/m$^2$. When the basis weight of the recording medium is less than 50 g/m$^2$, the recording medium cannot curve around a curved part in the course of the conveyance path due to excessively large stiffness of the recording medium to easily cause conveyance troubles such as the recording medium is clogged in the conveyance path.

In the ink media set according to the second aspect of the present invention, the non-porous substrate is used as the recording medium.

The non-porous substrate includes, for example, plastic films, plastic laminate papers, plastic coated papers, glasses and metals. These are the recording medium not having the water absorbing capacity which the common papers specific for water-based inkjet recording have.

The plastic films include, for example, polyester (PET) films and polyolefin films. Here, for example, in the PET film, typically about 10% inorganic fine particle filler may be kneaded.

The plastic coated paper is the film having a plastic surface, e.g., resin processing papers where paper surface is coated with a plastic material by application treatment or impregnation treatment with the plastic material.

An absorbable material is applied on the common OHP sheet for inkjet, but in the present invention, it is possible to print on unabsorbable sheet to which such a coating has not been given.

It is also possible to print on the glass and the metal as the non-porous substrate.

(Ink Record)

The ink record of the present invention is recorded by means of the inkjet recording apparatus in accordance with the inkjet recording method of the present invention. The ink record of the present invention has an image formed on the recording medium using the recording ink of the present invention.

The recording ink contains a solid component, a liquid component, and water; the solid component contains a colorant and a resin and is a solid at 25° C.; the liquid component has a higher boiling point than that of water and is a liquid at 25° C.; the total content of the liquid component in the recording ink is 20% by mass or less; the total content of the solid component in the recording ink is 20% by mass or more; and the total content of resin components in the solid component is 40% by mass to 95% by mass relative to the total amount of the solid components.

The recording medium is not particularly limited, and can be appropriately selected depending on the purpose, and includes, for example, plain paper, coated paper for printing glossy paper, special paper, fabric, film, OHP sheet, or the like. These may be used alone or in combination of two or more.

Among them, at least either the plain paper or the coated paper for printing is preferable.

The plain paper is advantageous in terms of low cost. The coated paper for printing is advantageous in terms of being more inexpensive and giving the smooth and glossy image compared with the glossy paper. However, the coated paper for printing has the poor drying property and has been difficult to be used for inkjet, but becomes possible to use by enhancing the drying property by the recording ink of the present invention.

The coated paper for printing is the recording medium which provides the support and the coating layer on at least one surface of the support. The transfer amount of purified water to the recording medium is 2 mL/m$^2$ to 35 mL/m$^2$ for the contact time of 100 ms measured using the dynamic scanning absorbing liquid meter and the transfer amount of purified water to the recording medium is 3 mL/m$^2$ to 40 mL/m$^2$ for the contact time of 400 ms. The transfer amount, i.e., the water absorbing capacity in these is smaller compared with the commercially available paper for inkjet.

Among them, in the recording medium having the small transfer amount, i.e., the low water absorbing capacity, the recording ink of the present invention is particularly effective. Specifically, the transfer amount of the purified water to the recording medium is 2 mL/m$^2$ to 10 mL/m$^2$ for the contact time of 100 ms and the transfer amount of purified water to the recording medium is 3 mL/m$^2$ to 10 mL/m$^2$ for the contact time of 400 ms measured using a dynamic scanning absorbing liquid meter.

When the transfer amount of the liquid for the contact time of 100 ms is below the above range, the beading easily occurs, and when it exceeds the above range, the ink dot diameter after recording becomes smaller than the desired diameter. When the transfer amount of the liquid for the contact time of 400 ms is below the above range, the spur mark easily occurs because of insufficient drying property and glossiness of the image portion after drying is easily reduced. But, these are absolutely related to the drying time, and the recording ink of the present invention in which the amount of liquid component having the high boiling point is reduced has the effect to some extent on drying property enhancement even on the paper which is below the above range.

These papers having the low water absorbing capacity are available as the commercially available coated papers for offset.

It is preferable that the recording medium is composed of a non-porous substrate and that the non-porous substrate is any one selected plastic films, plastic laminate papers, plastic coated papers, glasses and metals. As the plastic film, polyester films are particularly preferable.

The ink record has the high image quality with no bleeding, is excellent in stability with time, and can be suitably used for various intended uses as documents on which various printing or images have been recorded.

Examples of the present invention will be described below, but the present invention is not limited to these Examples at all.

Production Example 1

Preparation of Polymer Solution A

An inside of a 1 L flask equipped with a mechanical stirrer, a thermometer, a nitrogen gas introducing tube, a reflux tube and a drop funnel was sufficiently replaced with nitrogen gas, then, 11.2 g of styrene, 2.8 g of acrylic acid, 12.0 g of lauryl methacrylate, 4.0 g of polyethylene glycol methacrylate, 4.0 g of styrene macromer and 0.4 g of mercaptoethanol were mixed, and the temperature is raised to 65° C. Subsequently, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercaptoethanol, 2.4 g of azobismethyl valeronitrile and 18 g of methyl ethyl ketone was dripped over 2.5 hours in the flask. After dripping, a mixed solution of 0.8 g of azobismethyl valeronitrile and 18 g of methyl ethyl ketone was dripped over 0.5 hours in the flask. After maturing at 65° C. for one hour, 0.8 g of azobismethyl valeronitrile was added, and the mixture was further matured for one hour. After the termination of the reaction, 364 g of methyl ethyl ketone was added in the flask to prepare 800 g of a polymer solution A at a concentration of 50% by mass.

Production Example 1-1

Preparation of Polymer Fine Particle Water Dispersion Containing Magenta Pigment Subsequently, 28 g of the resulting polymer solution A, 42 g of C.I. pigment red 122, 13.6 g of an aqueous solution of 1 mol/L potassium hydroxide, 20 g of methyl ethyl ketone and 13.6 g of ion-exchange water were sufficiently stirred and then kneaded using a roll mill. A resulting paste was placed in 200 g of purified water, which was sufficiently stirred, and then methyl ethyl ketone was distilled off using an evaporator to yield a water dispersion of magenta pigment polymer particles containing 15% by mass of the pigment and 20% by mass of a solid content of Production Example 1-1.

Production Example 1-2

Preparation of Polymer Fine Particle Water Dispersion Containing Cyan Pigment

A water dispersion of cyan pigment polymer fine particles of Production Example 1-2 was made in the same way as in Production Example 1-1 except that copper phthalocyanine pigment was used in place of C.I. pigment red 122. The water dispersion was prepared so that the solid content was 20% by mass and the amount of pigment colorant was 12% by mass.

Production Example 1-3

Preparation of Polymer Fine Particle Water Dispersion Containing Yellow Pigment

A water dispersion of yellow pigment polymer fine particles of Production Example 1-3 was made in the same way as in Production Example 1-1 except that C.I. pigment yellow 74 was used in place of C.I. pigment red 122. The water dispersion was prepared so that the solid content was 20% by mass and the amount of pigment colorant was 12% by mass.

Production Example 2

Preparation of Surface Treatment Pigment Dispersion

Carbon black 890 g having 150 m$^2$/g of CTAB specific surface area and 100 mL/100 g of DBP oil absorption amount was added to 3,000 mL of a solution of 2.5 N sodium sulfate, stirred at a speed of 300 rpm at a temperature of 60° C., and reacted for 10 hours to perform the oxidation treatment. This reaction solution was filtrated, filtrated carbon black was neutralized with a sodium hydroxide solution and ultrafiltration was performed. The resulting carbon black was washed, dried, and dispersed in purified water so that the solid content was 20% by mass to make a black pigment dispersion of Production Example 2.

Production Example 3

Preparation of Polymer Fine Particle Dispersion (Acryl Silicone Based Emulsion) B The inside of a 1 L flask equipped with a mechanical stirrer, a thermometer, a nitrogen gas introducing tube, a reflux tube and a drop funnel was sufficiently replaced with nitrogen gas, then, 8.0 g of Latemul S-180 and 180 g of ion-exchange water were added and mixed, and the temperature was raised to 65° C. After raising the temperature, 6.0 g of t-butylperoxobenzoate and 1.0 g of sodium isoascorbate which were reaction initiators were added. After 5 minutes, 45 g of methyl methacrylate, 160 g of 2-ethylhexyl methacrylate, 5 g of acrylic acid, 45 g of butyl methacrylate, 30 g of cyclohexyl methacrylate, 15 g of vinyl triethoxysilane, 8.0 g of Latemul S-180 and 340 g of ion-exchange water were mixed and dripped over 3 hours. Thereafter, thermal maturation was performed at 80° C. for 2 hours, the mixture was cooled to ambient temperature, and adjusted to pH 7 to 8 with sodium hydroxide. Ethanol was distilled off using the evaporator and the water content was adjusted to make 730 g of a polymer dispersion B solution having the solid content of 40% by mass of Production Example 3.

An average particle diameter of the resulting polymer dispersion B was 130 nm (measured at 23° C.). The average particle diameter was measured using a particle size measurement device UPA150 supplied from Microtrack, and measured at a dilution rate of 500 times.

Example 1

Preparation of Recording Ink

An ink composition having the following formulation was prepared, pH was adjusted and the composition was filtrated using a membrane filter having an average pore diameter of 5 μm to make a recording ink.

<Ink Composition>

| | |
|---|---|
| Copper phthalocyanine pigment-containing polymer fine particle dispersion of Production Example 1-2 (solid content = 20% by mass, balanced with water, colorant/resin in solid content (mass ratio) = 6/4) | 32% by mass |
| Acryl silicone emulsion of Production Example 3 (solid content = 40% by mass, balanced with water, glass transition temperature of resin component, −15° C. (differential heat initial rise) to −6° C. (inflection point) | 50% by mass |
| Glycerine as wetting agent | 3.2% by mass |
| 1,3-Butanediol as wetting agent | 2% by mass |

-continued

| | |
|---|---|
| 2-Ethyl-1,3-hexanediol as penetrating agent | 2% by mass |
| Fluorine based surfactant (number of carbon atoms substituted with fluorine atoms = 4 to 16) | 1% by mass |
| Preservative anti-fungal agent | 0.05% by mass |
| Amine based organic pH adjuster | 0.6% by mass |
| Silicone emulsion based anti-foaming agent | 0.1% by mass |
| Water | balance |

In the above ink composition, the total content of glycerine and 1,3-butanediol as the wetting agents which were the liquids at ambient temperature (25° C.), 2-ethyl-1,3-hexanediol as the penetrating agent which was the liquid at ambient temperature (25° C.) and the surfactant was 8.2% by mass. These correspond to the liquid component which has the higher boiling point than that of water and is the liquids at 25° C.

The amount of water was 64.7% by mass, and the ratio of water in the liquid component which was the liquid at ambient temperature (25° C.) was 88% by mass.

The content of the colorant which was the solid at ambient temperature (25° C.) was 3.8% by mass.

The resin component was the resin from the copper phthalocyanine pigment-containing polymer fine particle dispersion and the resin from the acryl silicone emulsion, and the total amount thereof was 22.6% by mass.

The total content of the resin component was 85% by mass from [22.6/(22.6+3.8)]×100 relative to the total amount of the colorant and the resin components.

The resin component here also includes the resin from the copper phthalocyanine pigment-containing polymer fine particle dispersion, and this is the same in the following Examples and Comparative Examples.

Example 2

Preparation of Recording Ink

An ink composition having the following formulation was prepared, pH was adjusted and the composition was filtrated using a membrane filter having an average pore diameter of 5 μm to make a recording ink.

<Ink Composition>

| | |
|---|---|
| Magenta pigment-containing polymer fine particle dispersion of Production Example 1-1 (solid content = 20% by mass, balanced with water, colorant/resin in solid content (mass ratio) = 7.5/2.5) | 32% by mass |
| Acryl silicone emulsion of Production Example 3 (solid content = 40% by mass, balanced with water, volume average particle diameter 150 nm, glass transition temperature of resin component, −15° C. (differential heat initial rise) to −6° C. (inflection point) | 50% by mass |
| Glycerine as wetting agent | 3.2% by mass |
| 1,3-Butanediol as wetting agent | 2% by mass |
| 2-Ethyl-1,3-hexanediol as penetrating agent | 2% by mass |
| Fluorine based surfactant (number of carbon atoms substituted with fluorine atoms = 4 to 16) | 1% by mass |
| Preservative anti-fungal agent | 0.05% by mass |
| Amine based organic pH adjuster | 0.6% by mass |
| Silicone emulsion based anti-foaming agent | 0.1% by mass |
| Water | balance |

In the above ink composition, the total content of glycerine and 1,3-butanediol as the wetting agents which were the liquids at ambient temperature (25° C.), 2-ethyl-1,3-hexanediol as the penetrating agent which was the liquid at ambient temperature (25° C.) and the surfactant was 8.2% by mass. These correspond to the liquid component which has the higher boiling point than that of water and is the liquids at 25° C.

The amount of water was 64.7% by mass, and the ratio of water in the liquid component which was the liquid at ambient temperature (25° C.) was 89% by mass.

The content of the colorant which was the solid at ambient temperature (25° C.) was 4.8% by mass.

The resin component was the resin from the pigment dispersion and the resin from the acryl silicone emulsion, and the total amount thereof was 21.6% by mass.

The total content of the resin component was 82.0% by mass from $[21.6/(21.6+4.8)]\times 100$ relative to the total amount of the colorant and the resin components.

Example 3

Preparation of Recording Ink

An ink composition having the following formulation was prepared, pH was adjusted and the composition was filtrated using a membrane filter having an average pore diameter of 5 μm to make a recording ink.

<Ink Composition>

| | |
|---|---|
| Yellow pigment-containing polymer fine particle dispersion of Production Example 1-3 (solid content = 20% by mass, balanced with water, colorant/resin in solid content (mass ratio) = 6/4) | 32% by mass |
| Acryl silicone emulsion of Production Example 3 (solid content = 40% by mass, balanced with water, volume average particle diameter 150 nm, glass transition temperature of resin component, −15° C. (differential heat initial rise) to −6° C. (inflection point) | 50% by mass |
| Glycerine as wetting agent | 3.2% by mass |
| 1,3-Butanediol as wetting agent | 2% by mass |
| 2-Ethyl-1,3-hexanediol as penetrating agent | 2% by mass |
| Fluorine based surfactant (number of carbon atoms substituted with fluorine atoms = 4 to 16) | 1% by mass |
| Preservative anti-fungal agent | 0.05% by mass |
| Amine based organic pH adjuster | 0.6% by mass |
| Silicone emulsion based anti-foaming agent | 0.1% by mass |
| Water | balance |

In the above ink composition, the total content of glycerine and 1,3-butanediol as the wetting agents which were the liquids at ambient temperature (25° C.), 2-ethyl-1,3-hexanediol as the penetrating agent which was the liquid at ambient temperature (25° C.) and the surfactant was 8.2% by mass. These correspond to the liquid component which has the higher boiling point than that of water and is the liquids at 25° C.

The amount of water was 64.7% by mass, and the ratio of water in the liquid component which was the liquid at ambient temperature (25° C.) was 89% by mass.

The content of the colorant which was the solid at ambient temperature (25° C.) was 3.8% by mass.

The resin component was the resin from the pigment dispersion and the resin from the acryl silicone emulsion, and the total amount thereof was 22.6% by mass.

The total content of the resin component was 85.5% by mass from $[22.6/(22.6+3.8)]\times 100$ relative to the total amount of the colorant and the resin components.

Example 4

Preparation of Recording Ink

An ink composition having the following formulation was prepared, pH was adjusted and the composition was filtrated using a membrane filter having an average pore diameter of 5 μm to make a recording ink.

<Ink Composition>

| | |
|---|---|
| Carbon black dispersion having hydrophilic group of Production Example 2 (solid content = 20% by mass, balanced with water, colorant/resin in solid content (mass ratio) = 10/0) | 32% by mass |
| Acryl silicone emulsion of Production Example 3 (solid content = 40% by mass, balanced with water, volume average particle diameter 150 nm, glass transition temperature of resin component, −15° C. (differential heat initial rise) to −6° C. (inflection point) | 45% by mass |
| 1,3-Butanediol as wetting agent | 5% by mass |
| 2-pyrrolidone as wetting agent | 2% by mass |
| 2-Ethyl-1,3-hexanediol as penetrating agent | 2% by mass |
| Fluorine based surfactant (number of carbon atoms substituted with fluorine atoms = 4 to 16) | 1% by mass |
| Preservative anti-fungal agent | 0.05% by mass |
| Stabilizer | 0.0005% by mass |
| Organic pH adjusters (two types) | 0.65% by mass |
| Silicone emulsion based anti-foaming agent | 0.1% by mass |
| Water | balance |

In the above ink composition, the total content of 1,3-butanediol and 2-pyrrolidone as the wetting agents which were the liquids at ambient temperature (25° C.), 2-ethyl-1,3-hexanediol as the penetrating agent which was the liquid at ambient temperature (25° C.) and the surfactant was 10% by mass. These correspond to the liquid component which has the higher boiling point than that of water and is the liquids at 25° C.

The amount of water was 65% by mass, and the ratio of water in the liquid component which was the liquid at ambient temperature (25° C.) was 87% by mass.

The content of the colorant which was the solid at ambient temperature (25° C.) was 6% by mass.

The resin component was the resin from the acryl silicone emulsion, and the content thereof was 18% by mass.

The total content of the resin component was 75% by mass from [18/(18+6)]×100 relative to the total amount of the colorant and the resin components.

For the inks for recording obtained in Examples 1 to 4, surface tension, pH values and viscosity were measured as follows. Results are shown in Table 1

<Measurement of pH Value>

The pH value was measured at 23° C. using a pH meter, Model HM3A (supplied from To a Denpa Kogyo Co., Ltd.).

<Measurement of Viscosity>

The viscosity was measured at 25° C. under the condition of corn 34×R24, 180 rpm and after 3 minutes using an RE500 type viscometer (supplied from Toki Sangyo Co., Ltd.).

<Measurement of Surface Tension>

The surface tension is a static surface tension measured at 25° C. using a surface tension measurement apparatus (CBVP-Z supplied from Kyowa Interface Science Co., Ltd.).

TABLE 1

| | Surface tension(mN/m) | pH | Viscosity (mPa · s) |
|---|---|---|---|
| Example 1 | 24.7 | 9.28 | 5.17 |
| Example 2 | 24.3 | 9.40 | 5.49 |
| Example 3 | 24.2 | 9.25 | 5.22 |
| Example 4 | 24.2 | 8.95 | 5.25 |

<Imaging Experiment>

Imaging was performed using obtained each ink by an inkjet printer (G707 supplied from Ricoh Co., Ltd.).

As the paper, plain papers (T6200 paper supplied from Ricoh Co., Ltd.) and papers for printing (supplied from Oji paper Co., Ltd.) which hardly absorbed the water were used. The transfer amount of purified water to the recording medium was 3.1 mL/m$^2$ for the contact time of 100 ms, and 3.5 mL/m$^2$ for the contact time of 400 ms measured for these papers using the dynamic scanning absorptometer.

As a result, using any of the inks for recording, on the plain paper supplied from Ricoh Co., Ltd., the image having no show through, the high image density and no bleeding with good color formation was obtained regardless of the plain paper.

On the POD gloss coated paper in which the water was hardly permeated, the image having almost no problem in drying time was obtained because almost no color smear occurs even when the image is rubbed within one minute after printing. Furthermore, the image on the POD gloss coat 100 g/m$^2$ paper was sharp and close to the printed matter.

Comparative Example 1

An ink composition having the following formulation was prepared, pH was adjusted and the composition was filtrated using a membrane filter having an average pore diameter of 0.8 μm to make a recording ink.

<Ink Composition>

| | |
|---|---|
| Dimethyl quinacridone pigment-containing polymer fine particle dispersion of Production Example 1-1 (solid content = 20% by mass, balanced with water, colorant/resin in solid content (mass ratio) = 7.5/2.5) | 33.5% by mass |
| Acryl silicone emulsion of Production Example 3 (solid content = 40% by mass, balanced with water, volume average particle diameter 150 nm, glass transition temperature of resin component, −15° C. (differential heat initial rise) to −6° C. (inflection point) | 25% by mass |

-continued

| | |
|---|---|
| Glycerine as wetting agent | 7.5% by mass |
| 1,3-Butanediol as wetting agent | 22.5% by mass |
| 2-Ethyl-1,3-hexanediol as penetrating agent | 2% by mass |
| Fluorine based surfactant | 1% by mass |
| Preservative anti-fungal agent | 0.05% by mass |
| Amine based organic pH adjuster | 0.6% by mass |
| Silicone emulsion based anti-foaming agent | 0.1% by mass |
| Water | balance |

In the above ink composition, the total content of glycerine and 1,3-butanediol as the wetting agents which were the liquids at ambient temperature (25° C.), 2-ethyl-1,3-hexanediol as the penetrating agent which was the liquid at ambient temperature (25° C.) and the surfactant was 33% by mass. These correspond to the liquid component which has the higher boiling point than that of water and is the liquids at 25° C.

The amount of water was 49.5% by mass, and the ratio of water in the liquid component which was the liquid at ambient temperature (25° C.) was 60% by mass.

The content of the colorant which was the solid at ambient temperature (25° C.) was 5% by mass.

The resin component was the resin from the pigment dispersion and the resin from the acryl silicone emulsion, and the total amount thereof was 11.7% by mass.

The total content of the resin component was 70% by mass relative to the entire solid content.

Comparative Example 2

An ink composition having the following formulation was prepared, pH was adjusted and the composition was filtrated using a membrane filter having an average pore diameter of 0.8 μm to make a recording ink.
<Ink Composition>

| | |
|---|---|
| Dimethyl quinacridone pigment-containing polymer fine particle dispersion of Production Example 1-1 (solid content = 20% by mass, balanced with water, colorant/resin in solid content (mass ratio) = 7.5/2.5) | 54% by mass |
| Acryl silicone emulsion of Production Example 3 (solid content = 40% by mass, balanced with water, volume average particle diameter 150 nm, glass transition temperature of resin component, −15° C. (differential heat initial rise) to −6° C. (inflection point) | 9% by mass |
| Glycerine as wetting agent | 7% by mass |
| 1,3-Butanediol as wetting agent | 22.5% by mass |
| 2-Ethyl-1,3-hexanediol as penetrating agent | 2% by mass |
| Fluorine based surfactant (number of carbon atoms substituted with fluorine atoms = 4 to 16) | 1% by mass |
| Preservative anti-fungal agent | 0.05% by mass |
| Amine based organic pH adjuster | 0.6% by mass |
| Silicone emulsion based anti-foaming agent | 0.1% by mass |
| Water | balance |

In the above ink composition, the total content of glycerine and 1,3-butanediol as the wetting agents which were the liquids at ambient temperature (25° C.), 2-ethyl-1,3-hexanediol as the penetrating agent which was the liquid at ambient temperature (25° C.) and the surfactant was 32.5% by mass. These correspond to the liquid component which has the higher boiling point than that of water and is the liquids at 25° C.

The amount of water was 52.3% by mass, and the ratio of water in the liquid component which was the liquid at ambient temperature (25° C.) was 61.7% by mass.

The content of the colorant which was the solid at ambient temperature (25° C.) was 8.1% by mass.

The resin component was the resin from the pigment dispersion and the resin from the acryl silicone emulsion, and the total amount thereof was 6.3% by mass.

The total content of the resin component was 44% by mass from $[6.3/(6.3+8.1)] \times 100$ relative to the total amount of the colorant and the resin components.

Comparative Example 3

An ink composition having the following formulation was prepared, pH was adjusted and the composition was filtrated using a membrane filter having an average pore diameter of 0.8 μm to make an recording ink.
<Ink Composition>

| | |
|---|---|
| Dimethyl quinacridone pigment-containing polymer fine particle dispersion of Production Example 1-1 (solid content = 20% by mass, balanced with water, colorant/resin in solid content (mass ratio) = 7.5/2.5) | 74% by mass |
| Glycerine as wetting agent | 7% by mass |
| 1,3-Butanediol as wetting agent | 15% by mass |
| 2-Ethyl-1,3-hexanediol as penetrating agent | 2% by mass |

-continued

| | |
|---|---|
| Polyoxyalkylene alkyl ether based surfactant (Softal EP-5035 supplied from Nippon Shokubai Co., Ltd.) | 1% by mass |
| Preservative anti-fungal agent | 0.05% by mass |
| Amine based organic pH adjuster | 0.2% by mass |
| Silicone emulsion based anti-foaming agent | 0.1% by mass |
| Water | balance |

In the above ink composition, the total content of glycerine and 1,3-butanediol as the wetting agents which were the liquids at ambient temperature (25° C.), 2-ethyl-1,3-hexanediol as the penetrating agent which was the liquid at ambient temperature (25° C.) and the surfactant was 25% by mass. These correspond to the liquid component which has the higher boiling point than that of water and is the liquids at 25° C.

The amount of water was 59.9% by mass, and the ratio of water in the liquid component which was the liquid at ambient temperature (25° C.) was 71% by mass.

The content of the colorant which was the solid at ambient temperature (25° C.) was 11% by mass.

The resin component was from the pigment dispersion and the amount thereof was 3.7% by mass.

The total content of the resin component was 25% by mass relative to the entire solid content.

Comparative Example 4

An ink composition having the following formulation was prepared, pH was adjusted and the composition was filtrated using a membrane filter having an average pore diameter of 0.8 μm to make a recording ink.
<Ink Composition>

| | |
|---|---|
| Dimethyl quinacridone pigment-containing polymer fine particle dispersion of Production Example 1-1 (solid content = 20% by mass, balanced with water, colorant/resin in solid content (mass ratio) = 7.5/2.5) | 29% by mass |
| Acryl silicone emulsion of Production Example 3 (solid content = 40% by mass, balanced with water, volume average particle diameter 150 nm, glass transition temperature of resin component, −15° C. (differential heat initial rise) to −6° C. (inflection point) | 43% by mass |
| Glycerine as wetting agent | 6% by mass |
| 3-methyl-1,3-Butanediol as wetting agent | 19% by mass |
| 2-Ethyl-1,3-hexanediol as penetrating agent | 1.7% by mass |
| Fluorine based surfactant | 0.85% by mass |
| Preservative anti-fungal agent | 0.05% by mass |
| Stabilizer | 0.0005% by mass |
| Amine based organic pH adjusters (two types) | 0.2% by mass |
| Silicone emulsion based anti-foaming agent | 0.1% by mass |
| Water | balance |

In the above ink composition, the total content of glycerine and 1,3-butanediol as the wetting agents which were the liquids at ambient temperature (25° C.), 2-pyrrolidone and 2-ethyl-1,3-hexanediol as the penetrating agents which was the liquid at ambient temperature (25° C.) and the surfactant was 28% by mass. These correspond to the liquid component which has the higher boiling point than that of water and is the liquids at 25° C.

The amount of water was 49% by mass, and the ratio of water in the liquid component which was the liquid at ambient temperature (25° C.) was 64% by mass.

The content of the colorant which was the solid at ambient temperature (25° C.) was 4.4% by mass.

The resin component was from the pigment dispersion and from the acryl silicone emulsion, and the total amount thereof was 18.7% by mass.

The total content of the resin component was 81% by mass relative to the entire solid content.

Subsequently, concerning the inks for recording of Comparative Examples 1 to 4, the surface tension (25° C.) and the viscosity (25° C.) were measured in the same way as in Examples 1 to 4. The results are shown in Table 2.

TABLE 2

| | Surface tension(mN/m) | Viscosity (mPa · s) |
|---|---|---|
| Comparative Example 1 | 25.2 | 10.8 |
| Comparative Example 2 | 25.7 | 8.2 |
| Comparative Example 3 | 31.0 | 7.9 |
| Comparative Example 4 | 26.3 | 23.2 |

<Imaging Experiments of Comparative Examples 1 to 4>

The imaging experiment was performed using the inks for recording of Comparative Examples 1 to 4 in the same way as in Examples 1 to 4. As a result, the inks of Comparative Examples 1, 2 and 3 were inferior in drying property on the paper for printing (POD gloss coat 100 g/m² paper supplied from Oji paper Co., Ltd.) compared with Examples. In particular, in Comparative Example 2, it was confirmed that the drying property was deteriorated when a secondary color was made by overlaying with the other color having the same composition. It seems to be caused because the solid content is low whereas the solvent amount is large and the ratio of water which easily evaporates is low in the solvent. However, Comparative Example 1 is inferior in drying property on the gloss paper compared with Example 1, but the solid content is relatively high and the resin amount is large, and thus, the image is good. It is possible to use on the gloss paper if the amount of the adhered ink is adjusted to be low upon printing. In particular, in Comparative Example 1, the resin amount is large and the solid content is high, and thus the image quality on the paper for printing (POD gloss coat 100 g/m² paper supplied from Oji paper Co., Ltd.) as well as on plain papers is also enhanced.

On the contrary, as in Examples 1 to 4, when the solid content is 20% by mass or more and the ratio of water in the liquid component is 85% by mass or more (i.e., the amount of the liquid component which has the higher boiling point than that of water and is the liquid at 25° C. is small), the drying speed is high and the quality of image is excellent even on the papers such as papers for printing, which hardly absorb the water. In Comparative Example 4, the solid content is high and the resin ratio in the solid content is high but the wetting agent ratio is also high. Thus, the ink viscosity becomes high and the spout become difficult in some machines (but, since the solid content is high, if the amount of the adhered ink is controlled and the spout is stabilized, it is possible to use even on the gloss paper). In Comparative Example 3, the image glossiness and marker resistance were slightly inferior because the resin ratio is low.

TABLE 3

|  | Solid content* | Resin ratio in solid content* | Water ratio in liquid* | Total amount of liquid component** |
|---|---|---|---|---|
| Example 1 | 26.4 | 85 | 89.0 | 8.2 |
| Example 2 | 26.4 | 82 | 89.0 | 8.2 |
| Example 3 | 26.4 | 85 | 89.0 | 8.2 |
| Example 4 | 24.0 | 75 | 87.0 | 10.0 |
| Comparative Example 1 | 16.7 | 70 | 60.0 | 33.0 |
| Comparative Example 2 | 14.4 | 44 | 62.0 | 32.5 |
| Comparative Example 3 | 14.3 | 25 | 71.0 | 25.0 |
| Comparative Example 4 | 23.0 | 81 | 64.0 | 28.0 |

*% by mass
**Liquid component which has the higher boiling point than that of water and is the liquid at 25° C. % by mass Table 3 shows the ratio of components used in Examples 1 to 4 and Comparative Examples 1 to 4.

TABLE 4

| Resin ratio in solid content | | |
|---|---|---|
| 40% by mass or more and less than 70% by mass | 70% by mass to 95% by mass | More than 95% by mass |
| Fixing property: slightly inferior, Image glossiness: slightly inferior | Fixation and image are good | Image density is reduced. |

The higher the ratio of the solid component at 25° C. is, the more the ink viscosity is, but when the amount of the solid is increased, the ink viscosity is increased. Since the ink viscosity cannot be so increased, at most 50% by mass is a limit. A lower limit of the solid amount is not particularly determined, but 10% by mass is required for assuring the image density. When the wetting agent is at low concentration, to increase the viscosity to some extent and make the image good, the solid amount is preferably 20% by mass or more. Problems when the viscosity is low and the solid amount is changed are summarized in the following Table 5. However, when emphasis is placed especially on the ejecting reliability, it may be a case where the content of solid components is set to 20% by mass or less to make the ink have a lower viscosity. In such a case, setting the content of solid components to 20% by mass or less is also useful in enhancing the drying property of the ink on a recording medium having small water absorbing capacity like the recording medium of the present invention.

As shown in Table 5, in terms of drying speed on the offset coated paper, the wetting agent amount is preferably 20% by mass or less and more preferably 15% by mass or less. But, at the low imaging speed not affected by the drying, the above amount is not limited as the above. Meanwhile, when the wetting agent amount is less than 3% by mass, if the solid content is high, a spout reliability is impaired. But, the ink is not absolutely used by contriving the various maintenance mechanisms.

Here, the paper for printing means the smooth paper such as POD gloss coat 100 g/m² paper supplied from Oji paper Co., Ltd., which hardly absorbs the water compared with the common paper specific for inkjet or the plain paper (not always identical to intended uses indicated by manufacturers). These papers have no water absorbing capacity which the papers specific for inkjet or the plain papers have, and take a very long time for drying when the common inkjet ink is used.

<Imaging Test after Inkjet Recording is Stopped for a Long Time>

Subsequently, each recording ink of Examples 1 to 4 was imaged using the inkjet printer (G707 supplied from Ricoh Co., Ltd.). At that time, the printing was stopped in the state where the moisturizing cap was closed and about 0.1 cc of water was placed therein, which was then stored. Thereafter, when 3 days had passed, the printing with no clogging could be restarted. From this, it was confirmed that it was effective to supply the water in the moisturizing cap when being stopped. When no water was placed in the cap, some clogging occurred upon restart, but the clogging was removed by cleaning.

Each recording ink of Examples 1 to 4 was imaged using the inkjet printer (G707 supplied from Ricoh Co., Ltd.). After being suspended for one day, cyan and yellow could be imaged by all channels, but the nozzle clogging occurred in 10% channels for magenta. Thus, the printer was stored after being replacing with the magenta ink of Comparative Example 2 in which the wetting agent amount was large. After being stored, the imaging was performed by replacing with the low wetting agent ink of Example 2 upon imaging on the offset coated paper, and consequently the imaging was possible with no problem.

This way, by making the ink used depending on the paper medium the low wetting agent ink and using the high wetting agent ink in storage, it is possible to image with fast drying even on the paper for printing which hardly absorbs the water.

Instead of each recording ink of Examples 1 to 4, the moisturizing liquid which contained 5% by mass of glycerine, 20% by mass of butanediol and water as the balance and

TABLE 5

| | Amount of liquid component* | More than 20% by mass | 20 to 15% by mass | 3 to 15% by mass | Less than 3% by mass |
|---|---|---|---|---|---|
| Solid content | 10 to 20% by mass<br>20 to 30% by mass<br>30 to 50% by mass | Drying speed on papers for offset [D] But, if required speed is low, it is possible to use Difficult to spout depending on machines | Drying speed on papers for offset [C] | Drying speed on papers for offset [B] | Spout reliability [C] |

*Liquid component which has the higher boiling point than that of water and is the liquid at 25° C.

was adjusted pH=9 with the amine based pH adjuster was used. By changing to this moisturizing liquid when being stopped for a long time, it was possible to continue the imaging with no problem.

Example 5

Preparation of Recording Ink

A recording ink of Example 5 was made in the same way as in Example 1, except that fluorine based surfactant (number of carbon atoms substituted with fluorine atoms=4 to 16) was changed to polyether modified silicone based surfactant (product name KF-642 supplied from Shin-Etsu Chemical Co., Ltd.) in Example 1.

Example 6

Preparation of Recording Ink

A recording ink of Example 6 was made in the same way as in Example 2, except that fluorine based surfactant (number of carbon atoms substituted with fluorine atoms=4 to 16) was changed to polyether modified silicone based surfactant (product name KF-642 supplied from Shin-Etsu Chemical Co., Ltd.) in Example 2.

Example 7

Preparation of Recording Ink

A recording ink of Example 7 was made in the same way as in Example 3, except that fluorine based surfactant (number of carbon atoms substituted with fluorine atoms=4 to 16) was changed to polyether modified silicone based surfactant (product name KF-642 supplied from Shin-Etsu Chemical Co., Ltd.) in Example 3.

Example 8

Preparation of Recording Ink

A recording ink of Example 8 was made in the same way as in Example 4, except that fluorine based surfactant (number of carbon atoms substituted with fluorine atoms=4 to 16) was changed to polyether modified silicone based surfactant (product name KF-642 supplied from Shin-Etsu Chemical Co., Ltd.) in Example 4.

In the resulting respective inks of Examples 5 to 8, the surface tension at 25° C. was in the range of 26±2 mN/m, and the viscosity was 5.3±0.4 mPa·s (25° C.). In these inks, the surface tension was hardly changed even when being stored for a long time.
<Printing Experiment>
Concerning the resulting respective inks, the printing experiment was performed in the same way as in Examples 1 to 4. As a result, when any of the inks was used, the leveling property was good and the beautiful image was obtained even on the POD gloss coat 100 g/m² paper having the poor water absorbing capacity. And there was no problem in drying property.

Example 9

A recording ink of Example 9 was made in the same way as in Example 1, except that fluorine based surfactant (number of carbon atoms substituted with fluorine atoms=4 to 16) was changed to nonionic polyoxyethylene based surfactant in Example 1.

In the resulting recording ink of Example 9, the surface tension at 25° C. was 30 mN/m, pH was 9.1 and the viscosity was 5.3 mPa·s (25° C.).
<Imaging Experiment>
Concerning the resulting ink, the imaging experiment was performed in the same way as in Examples 1 to 4. As a result, the image was good to some extent, but slightly inferior compared with the case of using the silicone based surfactant or the fluorine based surfactant.

Comparative Example 5

A recording ink of Comparative Example 5 was made in the same way as in Example 2, except that fluorine based surfactant (number of carbon atoms substituted with fluorine atoms=4 to 16) and the penetrating agent were not added in Example 2.

In the resulting recording ink of Comparative Example 5, the surface tension at 25° C. was 40 mN/m or more, pH was 9.2 and the viscosity was 4.8 mPa·s (25° C.).
<Imaging Experiment>
Concerning the resulting ink, the imaging experiment was performed in the same way as in Examples 1 to 4. As a result, the imaging was unstable probably because the surface tension of the ink was high and the nozzle was hardly wetted.

Comparative Example 6

A recording ink was made in the same way as in Example 4, except that the amount of the carbon black dispersion was changed to 55% by mass and the amount of acryl silicone emulsion was changed to 17% by mass in Example 4. In this ink, the resin ratio in the solid content is 38% by mass, and the content of the liquid component having the high boiling point, which was the liquid at 25° C. was 7% by mass.
<Imaging Experiment>
Concerning the resulting ink, the imaging experiment was performed in the same way as in Examples 1 to 4. As a result, although the drying speed on the paper for printing was fast, the color tone was opaque and the fixing property was slightly inferior because the resin amount was small.

Example 10

Preparation of Ink Set and Ink Media Set

An ink set of Example 10 was made by combining respective inks of Examples 1 to 4. Performance evaluation was performed as follows using this ink set and the following various papers for recording.
<Paper for Recording (1)>
Commercially available paper (brand name: Aurora Coat, weighing capacity=104.7 g/m², supplied from Nippon Paper Industries Co., Ltd.)
<Paper for Recording (2)>
POD gloss coat 100 g/m² paper supplied from Oji paper Co., Ltd.
<Paper for Recording (3)>
Commercially available matte coated paper for inkjet (brand name: Super Fine supplied from Seiko Epson Corporation)

Concerning the above papers for recording, the transfer amount of purified water was measured as follows. The results are shown in Table 6.

<Measurement of Transfer Amount of Water and Ink by Dynamic Scanning Absorptometer>

Concerning the above papers for recording (1) to (3), an absorption curve of purified water was made using the dynamic scanning absorptometer (model: KS350D supplied from Kyowa Seiko Co., Ltd.). The absorption curve was obtained by plotting the transfer amount (mL/m$^2$) with a square root of the contact time and was a straight line with a certain slope. The transfer amount after a certain time was determined by interpolation.

TABLE 6

|  | Purified water | |
| --- | --- | --- |
|  | Contact time 100 ms | Contact time 400 ms |
| Recording paper (1) | 2.8 | 3.4 |
| Recording paper (2) | 3.1 | 3.5 |
| Recording paper (3) | 41.0 | 44.8 |

Subsequently, the printing was performed with a mode of high grade and high image quality by using the ink set of Example 10, using the above papers for recording (1) to (3) as the recording medium and filling the ink in the inkjet printer (G707 supplied from Ricoh Co., Ltd.).

Subsequently, concerning the resulting image prints, the beading and the glossy feeling were evaluated as follows. The results are shown in Table 7.

<Beading>

Levels of the beading in solid image portions of green and red were visually observed, and evaluated by the following criteria.

[Evaluation Criteria]
A: No beading and uniform printing
B: Slight beading
C: Clear beading
D: Remarkable beading <Evaluation of Glossy Feeling>

Levels of the glossy feeling in the image portion was visually observed, and evaluated by the following criteria.

[Evaluation Criteria]
A: High glossy feeling
B: Normal glossy feeling
D: No glossy feeling

TABLE 7

|  | Ink set of Example 10 | |
| --- | --- | --- |
|  | Beading | Glossy feeling |
| Recording paper (1) | B | B |
| Recording paper (2) | A | B |
| Recording paper (3) | A | C |

Comparative Example 7

Preparation of Ink Set

An ink set of Comparative Example 6 composed of the magenta ink of Comparative Example 2, and a cyan ink having the same composition as the magenta ink of the Comparative Example 2 other than the magenta pigment, and a yellow ink (pigment: C.I. pigment yellow 74) was prepared.

The printing was performed on the above paper for recording (2) using this ink set of Comparative Example 7. When the ink at the adhered amount similar to the ink adhered amount of the image portion of Examples 1 to 4 was compared, the drying property was inferior and the beading occurred in the secondary color. The results are shown in Table 8.

TABLE 8

|  | Ink set of Comparative Example 7 | |
| --- | --- | --- |
|  | Beading | Glossy feeling |
| Recording paper (2) | C | B |

From the results of Tables 7 and 8, it is found that the ink set of Example 10 is effective for enhancing the image quality in the case of the paper having the small transfer amount of purified water as compared with the ink set of Comparative Example 7. On the papers for recording (1) and (2), drying of the ink of Comparative Example 7 is slow and the ink causes the beading. When the printed matters 20 seconds after the printing are overlaid, the set off occurs. Furthermore, the ink set of Example 10 scarcely causes the beading and the set off.

The paper for recording (2) and the ink set of Comparative Example 7 can be used in some cases by controlling the ink drop amount, but the ink set of Example 10 does not cause the beading at the same ink drop amount. Taken together, the combination of the ink set of Example 10 with the medium where the transfer amount of purified water to the recording medium is 2 mL/m$^2$ to 35 mL/m$^2$ for the contact time of 100 ms and the transfer amount of purified water to the recording medium is 3 mL/m$^2$ to 40 mL/m$^2$ for the contact time of 400 ms measured using the dynamic scanning absorbing liquid meter is preferable.

Furthermore, viewing from the glossy feeling of the image, the combination with the medium where the transfer amount of purified water to the recording medium is 2 mL/m$^2$ to 15 mL/m$^2$ for the contact time of 100 ms and the transfer amount of purified water to the recording medium is 3 mL/m$^2$ to 20 mL/m$^2$ for the contact time of 400 ms is more preferable. But the paper for recording (3) can also be used although the image quality is somewhat inferior.

Example 11

An ink composition having the following formulation was prepared, pH was adjusted and the composition was filtrated using a membrane filter having an average pore diameter of 5 μm to make a magenta ink A.

Formulation of Magenta Ink A

| | |
| --- | --- |
| Dimethyl quinacridone pigment-containing polymer fine particle dispersion of Production Example 1-1 | 32% by mass |
| Acryl silicone emulsion of Production Example 3 | 36% by mass |
| Glycerine | 3% by mass |
| Fluorine based surfactant | 1% by mass |
| Preservative anti-fungal agent | 0.05% by mass |
| Amine based organic pH adjuster | 0.6% by mass |
| Silicone emulsion based anti-foaming agent | 0.1% by mass |
| Water | balance |

Example 12

Formulation of Cyan Ink A

A cyan ink A of Example 12 was prepared in the same way as in Example 11, except that the dimethyl quinacridone pigment-containing polymer fine particle dispersion was changed to the copper phthalocyanine pigment-containing polymer fine particle dispersion in Example 11.

Example 13

Formulation of Yellow Ink A

A yellow ink A of Example 13 was prepared in the same way as in Example 11, except that the dimethyl quinacridone pigment-containing polymer fine particle dispersion was changed to the yellow pigment-containing polymer of Production Example 13 in Example 11.

Example 14

Preparation of Magenta Ink B

A magenta ink B of Example 14 was prepared in the same way as in Example 11, except that the content of glycerine was changed to 13% by mass in Example 11.

Example 15

Preparation of Cyan Ink B

A cyan ink B of Example 15 was prepared in the same way as in Example 12, except that the content of glycerine was changed to 13% by mass in Example 12.

Example 16

Preparation of Yellow Ink B

A yellow ink B of Example 16 was prepared in the same way as in Example 13, except that the content of glycerine was changed to 13% by mass in Example 13.

Example A-1

Preparation of Magenta Ink C

A magenta ink C of Example A-1 was prepared in the same way as in Example 11, except that the content of glycerine was changed to 28% by mass.

Example A-2

Preparation of Cyan Ink C

A cyan ink C of Example A-2 was prepared in the same way as in Example 12, except that the content of glycerine was changed to 28% by mass.

Example A-3

Preparation of Yellow Ink C

A yellow ink C of Example A-3 was prepared in the same way as in Example 13, except that the content of glycerine was changed to 28% by mass.

Subsequently, concerning the inks for recording of Examples 11 to 16 and Comparative Examples 7 to 9, the surface tension and the viscosity were measured in the same way as in Examples 1 to 4. The results are shown in Table 9.

TABLE 9

| | Ink | Surface tension | Viscosity (mPa·s) |
|---|---|---|---|
| Example 11 | Magenta ink A | 24.6 | 3.03 |
| Example 12 | Cyan ink A | 24.5 | 2.78 |
| Example 13 | Yellow ink A | 24.7 | 2.85 |
| Example 14 | Magenta ink B | 24.5 | 4.41 |
| Example 15 | Cyan ink B | 24.3 | 4.0 |
| Example 16 | Yellow ink B | 24.3 | 4.1 |
| Example A-1 | Magenta ink C | 23.5 | 8.71 |
| Example A-2 | Cyan ink C | 23.7 | 8.07 |
| Example A-3 | Yellow ink C | 23.5 | 8.26 |

In Examples 11 to 16 and Examples A-1 to A-3, the solid content, the resin ratio in the solid content, the water ratio in the liquid and the total amount of the liquid component were calculated. The results are shown in Table 10. In the calculation of the liquid component having the higher boiling point than that of water, the amount of the fluorine based surfactant is included in addition to the amount of the wetting agent.

TABLE 10

| | Ink | Solid Content* | Resin Ratio in solid content* | Water ratio in liquid* | Total amount of liquid component** |
|---|---|---|---|---|---|
| Example 11 | Magenta A | 20.8 | 77 | 95 | 4 |
| Example 14 | Magenta B | 20.8 | 77 | 82 | 14 |
| Example A-1 | Magenta C | 20.8 | 77 | 63 | 29 |
| Example 12 | Cyan A | 20.8 | 82 | 95 | 4 |
| Example 15 | Cyan B | 20.8 | 82 | 82 | 14 |
| Eample A-2 | Cyan C | 20.8 | 82 | 63 | 29 |
| Example 13 | Yellow A | 20.8 | 82 | 95 | 4 |
| Example 16 | Yellow B | 20.8 | 82 | 82 | 14 |
| Example A-3 | Yellow C | 20.8 | 82 | 63 | 29 |

The recording ink whose content of a wetting agent is 29% by mass just as in Examples A-1, A-2, and A-3 was excellent in ejecting reliability after leaving the nozzle intact for a long time as compared to the recording ink whose content of a wetting agent is 20% by mass or less just as in Examples 11 to 16. Particularly in the recording medium of which the transfer amount of purified water to the recording medium for a contact time of 100 ms is 2 mL/m$^2$ to 35 mL/m$^2$ and the transfer amount of purified water to the recording medium for a contact time of 400 ms is 3 mL/m$^2$ to 40 mL/m$^2$ measured using a dynamic scanning absorbing liquid meter, the drying speed of the recorded image was slow with a large amount of the content of a wetting agent because the absorbing speed of the ink was slow.

When attaching importance to the drying speed, it is appropriate to set the content of a wetting agent to 20% by mass or less and use an inkjet recording method in which the recording ink is replaced with a moisturizing agent when the total content of solid components is 20% by mass or more, the content of the wetting agent is reduced to 20% by mass or less, and inkjet recording is stopped for a long time, and the moisturizing agent is replaced with the recording ink when inkjet recording is restarted. In addition, when inkjet recording is stopped for a long time, it is appropriate to use a method of supplying the moisturizing agent to a capping unit configured to cap the nozzle of the recording head.

In contrast, when attaching importance to the ejecting reliability, for paper containing a large amount of a wetting agent and having ink-absorbing speed is slow as those mentioned above, in order to prevent offset of overlaid recorded images caused due to slow drying speed, it is appropriate to take much time in drying recorded images or to provide a drying unit configured to forcedly dry recorded images.

The solid content of the recording ink of the present invention is more increased to 20% by mass or more as compared to those of conventional inks in order to make the colorant left on the paper and then to increase the image density. When the solid content is high like this, the ejecting reliability of the recording ink is degraded, and thus, in the present invention, not only to increase the content of a wetting agent but also to use a pigment of a polymer emulsion type containing a coloring material which is water insoluble or hardly water soluble in highly reliable polymer fine particles even when the content of solid components is high. Further, a large amount of solid content contributes to improvement in drying recorded images.

The reason why the ratio of glycerine is increased as a wetting agent is that glycerine has extremely higher equilibrium moisture content than those of other wetting agents, allows for controlling moisture evaporation speed and allows for preventing ink coagulation after drying the ink. Glycerine has another advantage of not increasing the ink viscosity as much as the other solvents even when the same content of a wetting agent is contained.

A recording medium of which the transfer amount of purified water to the recording medium for a contact time of 100 ms is 2 mL/m² to 35 mL/m², and the transfer amount of purified water to the recording medium for a contact time of 400 ms is 3 mL/m² to 40 mL/m² has a relatively strong force of masking a coloring material, and thus to increase the image density, it is essential that the coloring material remains on the surface of the recording medium. For the reason, a dye ink is hardly able to exhibit the image density because a colorant is infiltrated internally to a recording medium. In such a recording medium, by containing a pigment ink having a high concentration of a resin and a high concentration of solids, the colorant further remains on the recording medium to make the image density more excellent.

The following experiment actually confirmed the descriptions set forth.

Example B-1

A recording ink having the following formulation was prepared.

| | |
|---|---|
| Polymer fine particle dispersion containing a copper phthalocyanine pigment of Production Example 1-2 (solid content = 20% by mass, balanced with water, colorant/resin (mass ratio) 6/4 in the solid content) | 38% by mass % by mass |
| Acryl silicone emulsion of Production Example 3 (solid content = 40% by mass, balanced with water, volume average particle diameter = 150 nm, glass transition temperature of resin component, −15° C. (differential heat initial rise) to −6° C. (inflection point) was concentrated to adjust the solid content to 55% by mass | 36% by mass |
| 1,3-butandiol as wetting agent | 19% by mass |
| Glycerine as wetting agent | 6% by mass |
| Fluorine based surfactant (number of carbon atoms substituted with fluorine atoms = 4 to 16) | 1% by mass |
| Preservative anti-fungal agent | 0.05% by mass |
| Amine based organic pH adjuster | 0.6% by mass |
| Silicone emulsion based anti-foaming agent | 0.1% by mass |
| Water | balance |

The recording ink of Example B-1 was a cyan ink of high solid content containing a wetting agent in a content of 25% by mass and having a total solid content of 26% by mass.

Example B-2

A magenta ink of a high solid content containing a wetting agent in a content of 25% by mass and having a total solid content of 26% by mass was prepared in the same manner as in Example B-1, except that the polymer fine particle dispersion containing a copper phthalocyanine pigment of Production 1-2 was changed to the polymer fine particle dispersion containing a dimethylquinacridone of Production 1-1.

Example B-3

A cyan ink of a high solid content containing a wetting agent in a content of 25% by mass and having a total solid content of 26% by mass was prepared in the same manner as in Example B-1, except that the polymer fine particle dispersion containing the copper phthalocyanine pigment of Production 1-2 was changed to the polymer fine particle dispersion containing the yellow pigment of Production 1-3.

Next, for the respective recording inks of Examples B-1 to B-3, the viscosity at a temperature of 25° C. was measured in the same manner as in Example 1. Table 11 shows the measurement results.

TABLE 11

| | Viscosity(mPa · s) |
|---|---|
| Example B-1 | 12.8 |
| Example B-2 | 12.3 |
| Example B-3 | 15.2 |

Examples C-1 to C-3

A cyan recording ink, a magenta recording ink, and a yellow recording ink of Examples C-1 to C-3 each containing a wetting agent in a content of 15% by mass and having a total solid content of 31% by mass were prepared in the same manner as in Examples B-1 to B-3, except that the content of the colorant dispersion was changed to 42% by mass, the content of acryl silicone emulsion was changed to 42% by mass, the content of 1,3-butanediol as a wetting agent was changed to 11% by mass, and the content of glycerine was changed to 4% by mass.

Next, for the respective recording inks of Examples C-1 to C-3, the viscosity at a temperature of 25° C. was measured in the same manner as in Example 1. Table 12 shows the measurement results.

TABLE 12

|  | Viscosity (mPa · s) |
|---|---|
| Example C-1 | 12.5 |
| Example C-2 | 11.7 |
| Example C-3 | 12.8 |

The recording inks of Examples C-1 to C-3 were made to have a large amount of solid components and a less amount of a wetting agent of 15% by mass, and the recording inks of Examples B-1 to B-3 were made to have a less amount of solid components of 26% by mass and a high content of the wetting agent of 25% by mass.

Figure 19:
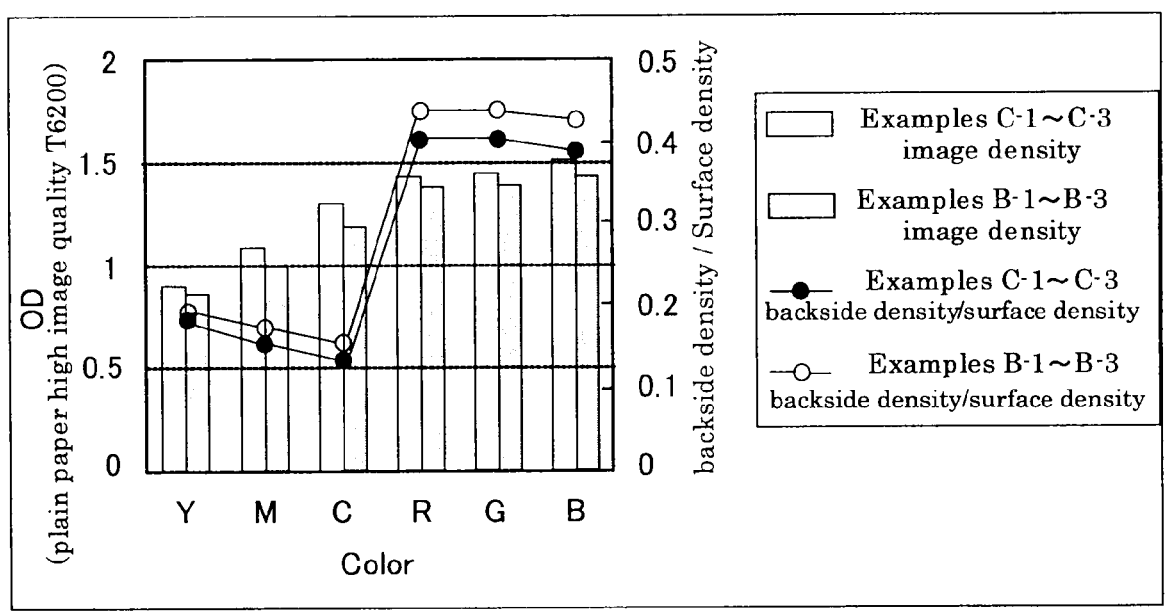
FIG. 19 is a graph showing the results of image density and show-through when an image was recorded on regular paper using the respective recording inks of Examples B-1 to B-3.

Since both of the recording inks Examples B-1 to B-3 and C-1 to C-3 had a large amount of solid components of 20% by mass or more, the image density printed on regular paper (T6200, manufactured by Ricoh Company Ltd.) was extremely high and resulted in excellent images without substantially causing offsets (see FIG. 19). In contrast, even though such an ink of high solid concentration was used, the ejecting reliability was excellent because a pigment of a polymer emulsion type containing a coloring material which is insoluble or hardly water soluble in polymer fine particles was used therein. However, the recording inks of Examples C-1 to C-3 of which the solid content was set to 31% by mass and the content of the wetting agent was set to 15% by mass sometimes caused disjoining of the nozzle in an early stage of recording after making the recording ink left intact, due to the extremely high solid content. The recording inks of Examples B-1 to B-3 of which the content of the wetting agent was set to 25% by mass allows for stable ejecting, although they respectively have a high solid content. For the inkjet printer, G707 manufactured by Ricoh Company Ltd. was used.

In the meanwhile, the respective recording inks were evaluated as to the drying property when recorded on paper of POD GLOSS COAT 100 g/m² manufactured by OJI Paper Co.

Figure 20:
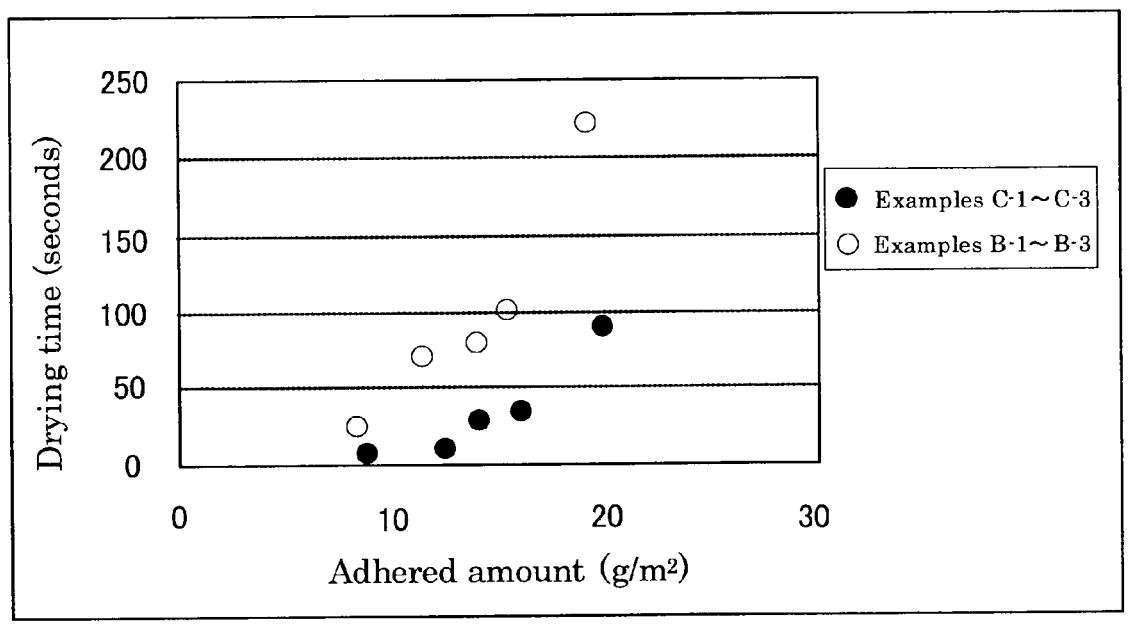
FIG. 20 is a graph showing a relation between the adhered amount of the respective recording inks of Examples B-1 to B-3 at green solid parts and the drying time required to dry the ink adhered on a paper of POD GLOSS COART 100 g/m$^2$.

As compared to the recording inks of Examples C-1 to C-3, it took long time to dry the recording inks of Examples B-1 to B-3 having a large content of the wetting agent. FIG. 20 is a view showing a relation between the adhered amount of recording ink at green solid parts and the drying time required to dry the ink adhered on a chromatography paper.

The paper of GLOSS COAT 100 g/m² was heated before recording an image thereon, and then the image was recorded on the paper with the use of recording inks of Examples C-1 to C-3, respectively.

As the result, the drying speed was shortened to one-half or less of the recording speed when the paper was not heated. The drying speed of recorded image was considerably shortened by heating an image in the course of recording or by drying the recorded image using a dryer equipped with a heat roller.

It was found that even though such an ink of high solid concentration was used, the ejecting reliability of the ink could be increased by setting the content of a wetting agent to 25% by mass or more, and even when the drying time was prolonged because the recording ink containing such a large amount of the wetting agent was directly used to record an image on paper having low ink-absorbability like GLOSS COAT 100 g/m², it could endure high-speed recording by heating and drying the paper before and after the recording.

Example D-1

A recording ink having the following formulation was prepared.

| | |
|---|---|
| Polymer fine particle dispersion containing a copper phthalocyanine pigment of Production Example 1-2 (solid content = 20% by mass, balanced with water, colorant/resin (mass ratio) 6/4 in the solid content) | 45% by mass % by mass |
| Acryl silicone emulsion of Production Example 3 (solid content = 40% by mass, balanced with water, volume average particle diameter = 150 nm, glass transition temperature of resin component, −15° C. (differential heat initial rise) to −6° C. (inflection point) | 10% by mass |
| 1,3-butandiol as wetting agent | 24% by mass |
| Glycerine as wetting agent | 8% by mass |
| Fluorine based surfactant (number of carbon atoms substituted with fluorine atoms = 4 to 16) | 1% by mass |
| Preservative anti-fungal agent | 0.05% by mass |
| Amine based organic pH adjuster | 0.6% by mass |
| Silicone emulsion based anti-foaming agent | 0.1% by mass |
| Water | balance |

The recording ink of Example D-1 was a cyan ink of high solid content containing a wetting agent in a content of 32% by mass and having a total solid content of 13% by mass.

Example D-2

A cyan ink of a high solid content containing a wetting agent in a content of 32% by mass and having a total solid content of 13% by mass was prepared in the same manner as in Example D-1, except that the polymer fine particle dispersion containing the copper phthalocyanine pigment of Production 1-2 was changed to the polymer fine particle dispersion containing the dimethylquinacridone pigment of Production 1-1.

Example D-3

A cyan ink of a high solid content containing a wetting agent in a content of 32% by mass and having a total solid content of 13% by mass was prepared in the same manner as in Example D-1, except that the polymer fine particle dispersion containing the copper phthalocyanine pigment of Production 1-2 was changed to the polymer fine particle dispersion containing the yellow pigment of Production 1-3.

Next, for the respective recording inks of Examples D-1 to D-3, the viscosity at a temperature of 25° C. was measured in the same manner as in Example 1. Table 13 shows the measurement results.

TABLE 13

|  | Viscosity (mPa · s) |
|---|---|
| Example D-1 | 8.17 |
| Example D-2 | 8.03 |
| Example D-3 | 8.65 |

Examples E-1 to E-3

A cyan recording ink, a magenta recording ink, and a yellow recording ink of Examples E-1 to E-3 were prepared in the same manner as in Examples D-1 to D-3, except that 1,3-butanediol used as a wetting agent was changed to glycerine.

Next, for the respective recording inks of Examples E-1 to E-3, the viscosity at a temperature of 25° C. was measured in the same manner as in Example 1. Table 14 shows the measurement results.

TABLE 14

|  | Viscosity (mPa · s) |
|---|---|
| Example E-1 | 6.76 |
| Example E-2 | 6.61 |
| Example E-3 | 6.91 |

The results shown in Table 14 demonstrated that when 1,3-butanediol used as a wetting agent is changed to glycerine, it makes possible to keep the ink viscosity low even with the same content of the wetting agent, and it is easy to make the ink to have a high solid content.

In a Schale, 0.5 g of each of the inks was placed in the environment of air conditioned air stream of humidity of 53% RH and a temperature of 23° C., and then the amount of evaporation was determined.

Figure 21:
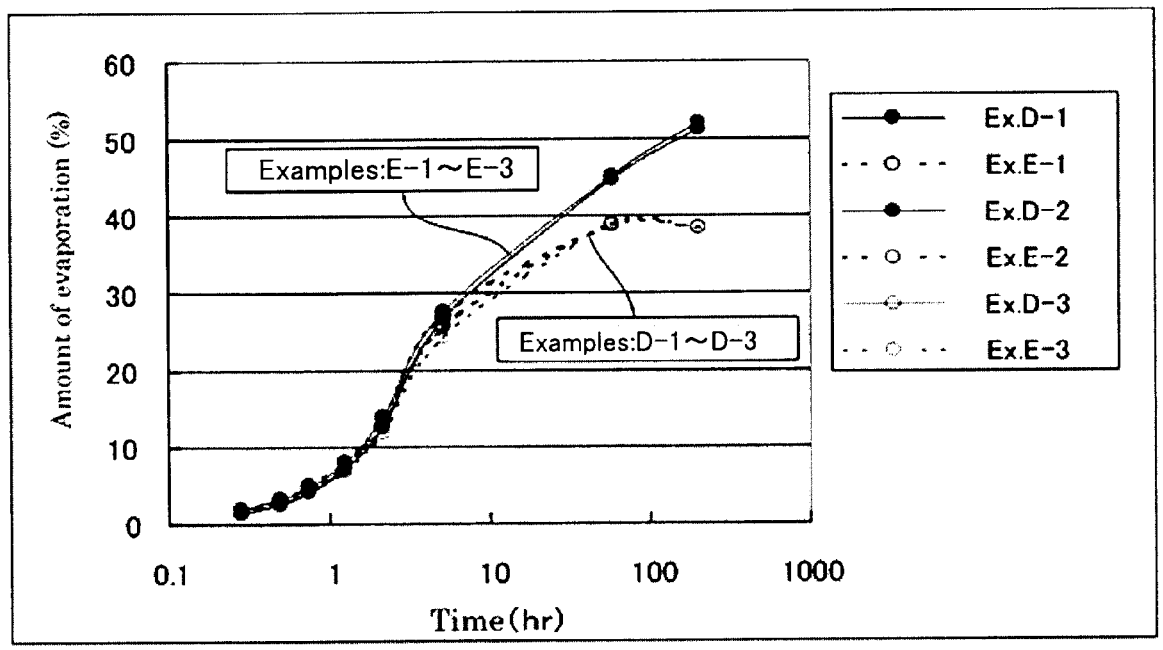
FIG. 21 is a graph showing the results of moisture evaporation rate of the respecting recording inks of Examples D-1 to D-3 and E-1 to E-3.
Figure 22:
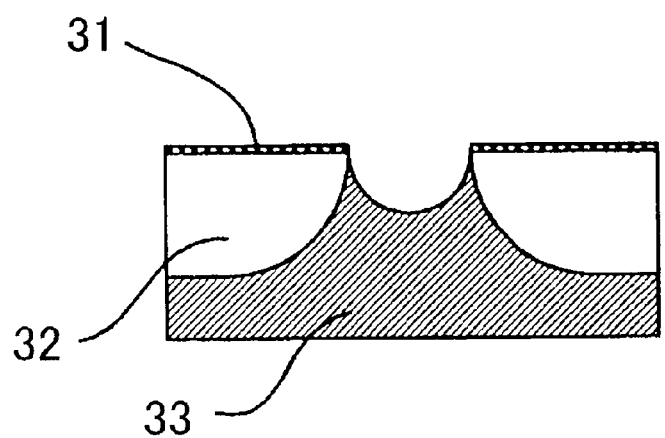
FIG. 22 is a schematic view of a cross section exemplarily showing a nozzle plate of the inkjet head according to the present invention.

The evaporation rate of water of the recording inks of Examples E-1 to E-3 containing glycerine alone as a wetting agent was slightly slow from the early stage, and after a lapse of time, a large difference in evaporation amount was observed between the recording inks of Examples D-1 to D-3 and the recording inks of Examples E-1 to E-3 (see FIG. 21). This is because the difference in equilibrium moisture content of the wetting agent affects the evaporation rate. An increased amount of glycerine as a wetting agent in a recording ink like this was useful in preventing low viscosity and evaporation of moisture of the recording ink, and particularly in the case of a recording ink having a high solid content, it allowed for preventing solidification of the ink due to drying and allowed for greatly enhancing the ejecting reliability.

TABLE 15

|  |  | Total amount of liquid component | Ink |  |  |
|---|---|---|---|---|---|
| Example 17 | Ink set A | 4% by mass | Magenta A | Cyan A | Yellow A |
| Example 18 | Ink set B | 14% by mass | Magenta B | Cyan B | Yellow B |
| Comparative Example 8 | Ink set C | 29% by mass | Magenta C | Cyan C | Yellow C |

Using the ink sets A to C shown in Table 15, the imaging was performed on the gloss paper (POD gloss coat 100 g/m² paper supplied from Oji paper Co., Ltd.) using the inkjet printer (G707 supplied from Ricoh Co., Ltd.).

Figure 13:
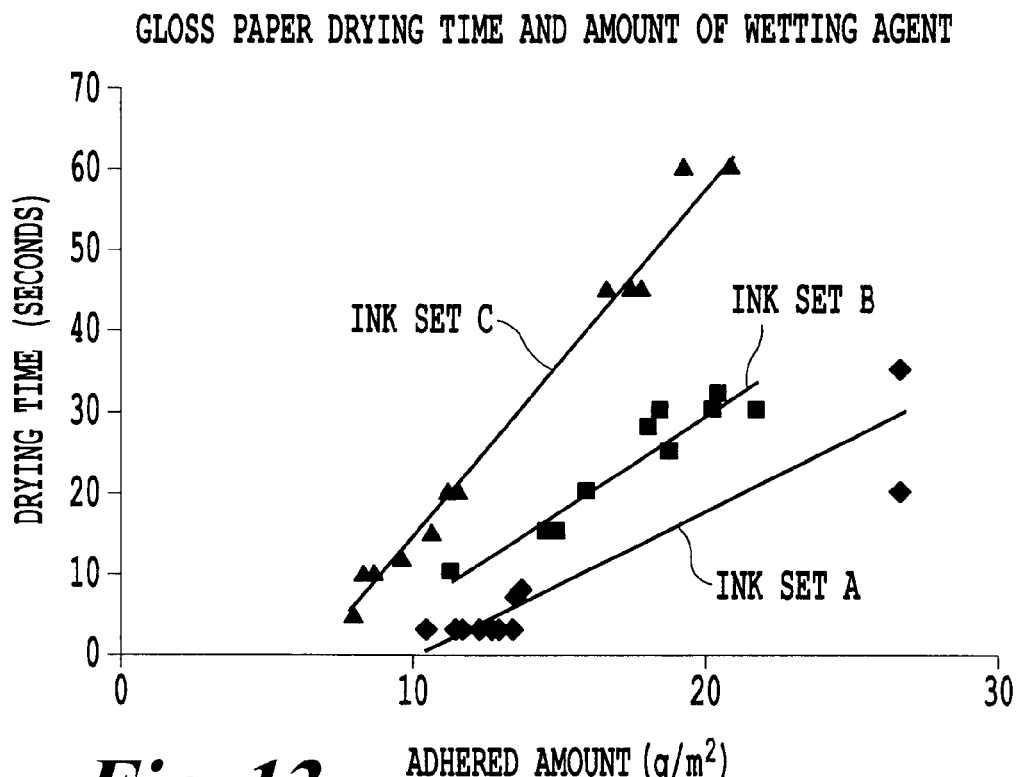
FIG. 13 is a graph showing a relationship between an adhered amount and a drying time for ink sets A to C.

The relationship between the ink adhered amount and the drying time at that time was shown in FIG. 13. After printing, the filter paper was pushed down on the printed site, the value when the amount adhered onto the filter paper was largely reduced was rendered the drying time, and its relation with the ink adhered amount was evaluated.

It is evident that the drying time is related to the amount of the liquid (majority is the wetting agent of glycerine) which has the higher boiling point than that of water and is the liquid at 25° C. When 20 g/m² or more of the ink adhered amount is required, to dry within one minute, the ink set C is insufficient, and the amount of the wetting agent (including the fluorine based surfactant) is preferably 20% by mass or less. But, this is absolutely relative, and when the imaging time may be sufficiently slow, the amount of the wetting agent may be further increased.

From the above results, it is confirmed that the evaporation speed of water is effective in the inkjet printing on the papers such as gloss papers where the water permeability is low, especially when the amount of ink adhered per unit area is large.

In that case, to make the drying sufficiently rapid, it is better that the amount of the wetting agent is small. This is essentially different from a conventional line of thought where only permeation rate limiting is considered in the inkjet printing of a super permeable system with low surface tension. Meanwhile, when the solid content is higher, it seems that the liquid amount which exceeds the acceptable amount is small, which is good for drying. However, when the amount of the wetting agent is not changed and the solid content is increased, the wetting agent+equilibrium aqueous content are left on the paper surface, which worsens the drying property. In brief, it seems that the amount of wetting agent affects the drying property, and there is the suitable combination of the solid content and the wetting agent amount.

To prove the mechanism that the water evaporation is effective for the drying, it is necessary to identify that the water evaporation occurs at this speed.

Figure 14:
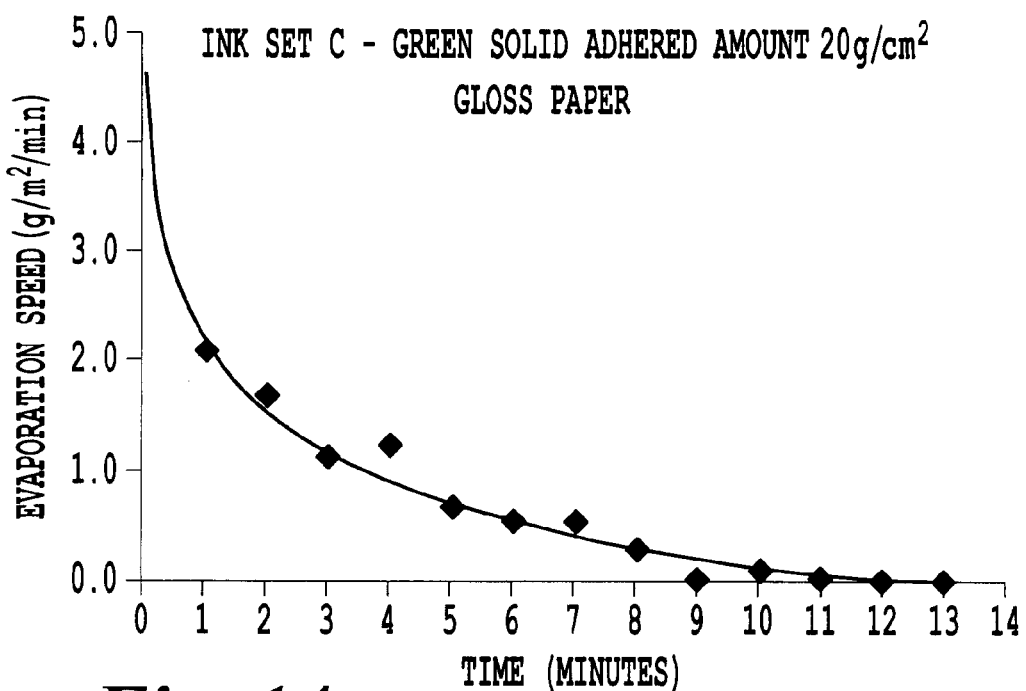
FIG. 14 is a graph showing time course changes of a water evaporation speed of the ink after printing in the ink set C.
Figure 15:
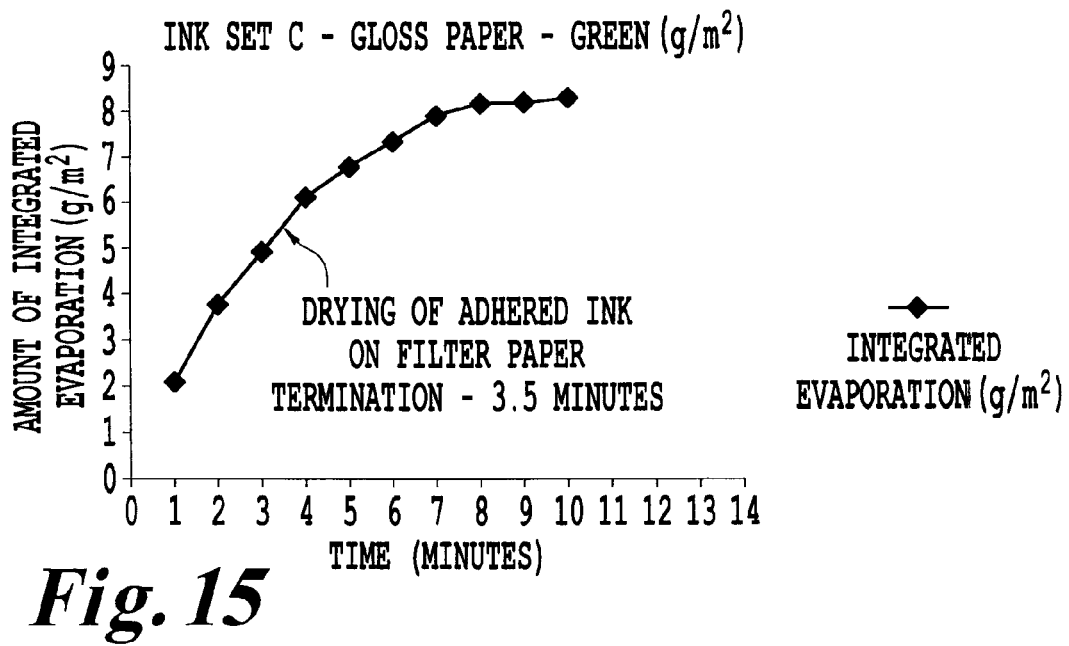
FIG. 15 is a graph showing time course changes of integrated water evaporation amounts in the ink set C.

FIG. 14 shows the direct measurement of the ink evaporation speed on the green solid portion after being printed on the gloss paper using the ink set C. FIG. 15 shows cumulative values of the evaporation amounts. Concerning the drying time of the adhered ink on the filter paper, it takes about one minute to largely reduce the adhered ink on the filter paper, but it takes about 3.5 minutes to completely not adhere onto the filter paper. This time corresponds to the cumulative evaporation amount about 70% of the water amount capable of being finally evaporated, calculated from the equilibrium aqueous content of glycerine, indicating that the water evaporation amount in the ink is sufficiently related to the drying time of the adhered ink on the filter paper.

This way, it is thought that the evaporation of the ink is sufficiently related to the drying property on the gloss paper having the low water absorbing capacity, and that the water evaporation in the ink affects the drying on the gloss paper even using the ink having the super permeation with low surface tension. Thus, it seems that the amount of the wetting agent is largely involved in the drying property on the gloss paper.

Example 19

Preparation of Magenta Ink

A magenta ink having the following composition was made.

| | |
|---|---|
| Magenta pigment-containing polymer fine particle dispersion of Production Example 1-1 (solid content 20% by mass) | 32% by mass |
| Emulsion resin aqueous solution of Production Example 3 (solid content 40% by mass) | 36% by mass |
| Glycerine | 3% by mass |
| Fluorine based surfactant (FS-300 supplied from DuPont) | 2.5% by mass |
| Preservative anti-fungal agent (Proxel supplied from Zeneca) | 0.05% by mass |
| Amine based pH adjuster | 0.6% by mass |
| Silicone based anti-foaming agent | 0.1% by mass |
| Water | balance |

In the resulting magenta ink, the viscosity and the surface tension measured in the same way as in Example 1 were 3.03 mPa·s and 24.8 mN/m, respectively. The total solid content in the ink was 21% by mass, and the resin amount in the total solid content was 77% by mass.

Example 20

Preparation of Cyan Ink

A cyan ink was made in the same way as in Example 19, except that the dispersion of Example 19 was changed to the copper phthalocyanine pigment-containing polymer fine particle dispersion of Production Example 1-2.

In the resulting cyan ink, the viscosity and the surface tension measured in the same way as in Example 1 were 2.78 mPa·s and 24.3 mN/m, respectively. The total solid content in the ink was 21% by mass, and the resin amount in the total solid content was 82% by mass.

Example 21

Preparation of Yellow Ink

A yellow ink was made in the same way as in Example 19, except that the dispersion of Example 19 was changed to the monoazo yellow pigment-containing polymer fine particle dispersion of Production Example 1-3.

In the resulting yellow ink, the viscosity and the surface tension measured in the same way as in Example 1 were 2.85 mPa·s and 24.7 mN/m, respectively. The total solid content in the ink was 21% by mass, and the resin amount in the total solid content was 82% by mass.

Example 22

Preparation of Magenta Ink

A magenta ink was made in the same way as in Example 19, except that the content of glycerine in Example 19 was changed to 13% by mass.

In the resulting magenta ink, the viscosity and the surface tension measured in the same way as in Example 1 were 4.41 mPa·s and 24.5 mN/m, respectively. The total solid content in the ink was 21% by mass, and the resin amount in the total solid content was 77% by mass.

Example 23

Preparation of Cyan Ink

A cyan ink was made in the same way as in Example 20, except that the content of glycerine in Example 20 was changed to 13% by mass.

In the resulting cyan ink, the viscosity and the surface tension measured in the same way as in Example 1 were 4.00 mPa·s and 24.6 mN/m, respectively. The total solid content in the ink was 21% by mass, and the resin amount in the total solid content was 82% by mass.

Example 24

Preparation of Yellow Ink

A yellow ink was made in the same way as in Example 21, except that the content of glycerine in Example 21 was changed to 13% by mass.

In the resulting yellow ink, the viscosity and the surface tension measured in the same way as in Example 1 were 4.1 mPa·s and 24.3 mN/m, respectively. The total solid content in the ink was 21% by mass, and the resin amount in the total solid content was 82% by mass.

Example 25

Preparation of Magenta Ink

A magenta ink was made in the same way as in Example 19, except that the content of glycerine in Example 19 was changed to 28% by mass.

In the resulting magenta ink, the viscosity and the surface tension measured in the same way as in Example 1 were 8.71 mPa·s and 24.1 mN/m, respectively. The total solid content in the ink was 21% by mass, and the resin amount in the total solid content was 77% by mass.

Example 26

Preparation of Cyan Ink

A cyan ink was made in the same way as in Example 20, except that the content of glycerine in Example 20 was changed to 28% by mass.

In the resulting cyan ink, the viscosity and the surface tension measured in the same way as in Example 1 were 8.07 mPa·s and 23.8 mN/m, respectively. The total solid content in the ink was 21% by mass, and the resin amount in the total solid content was 82% by mass.

Example 27

Preparation of Yellow Ink

A yellow ink was made in the same way as in Example 21, except that the content of glycerine in Example 21 was changed to 28% by mass.

In the resulting yellow ink, the viscosity and the surface tension measured in the same way as in Example 1 were 8.26 mPa·s and 23.5 mN/m, respectively. The total solid content in the ink was 21% by mass, and the resin amount in the total solid content was 82% by mass.

Subsequently, the printing was performed using the ink sets of Examples 19 to 21 (ink set I), Examples 22 to 24 (ink set II) and Examples 25 to 27 (ink set III) and using the inkjet printer (G-707 supplied from Ricoh Co., Ltd.), and the following evaluation was performed.

As the recording medium, those obtained by cutting polyester film (brand name: Lumira-75-T60 supplied from Toray Industries, Inc.) into an A4 size were used.

<Polyester Film Imaging Evaluation-Drying Property Evaluation 1>

The image where solid images of secondary colors (green, red, blue) of 2 mm square were arranged vertically and horizontally with an interval of 0.3 mm was printed at various modes. The filter paper 5A from Advantech was pushed down on the image portion, and the time when the ink was not adhered onto the filter paper was rendered a drying termination time.

As a result, in the ink set I, when the ink imaging (secondary color: green) was performed at the mode of 20 g/m$^2$ of the adhered amount, the ink was not adhered onto the filter paper within 150 seconds. The fixing property evaluated by an eraser or finger contact was sufficient. The solid image portion had the visually uniform density. For the letters, the clear letters with good fixing property were obtained.

Meanwhile, in the ink set II, even when the adhered amount was small which was about 8 g/m$^2$, the drying did not terminate after 20 minutes had passed. In the ink set III, the drying time was longer. It took one day or more to obtain the good fixing property evaluated by the eraser or the finger contact.

But, in the ink sets II and III, after several days had passed, the fixing property was enhanced, and thus they can not be always used depending on the purpose.

If a drying step by a dryer or a microwave oven is added, the drying terminates in a short time even in the ink sets II and III.

<Polyester Film Imaging Evaluation-Drying Property Evaluation 2>

Instead of the solid image in the drying property evaluation 1, the solid image of 1 cm square was printed and the drying property was evaluated. As a result, in the ink set I, when the printing was performed at the adhered amount of 20 g/m$^2$, although the ink was dried from the periphery, it took 5 minutes or more to dry the central portion. A dense portion in the image density was produced in the central portion and toward to diagonal portions.

To avoid this, by sequentially printing the solid imaging of 2 mm square with shifting the time and the place, the considerably uniform solid image was obtained.

<Evaluation of Imaging on Gloss Paper>

The printing was performed on the POD gloss coated 100 g/m$^2$ paper supplied from Oji paper Co., Ltd. In this paper, the transfer amount of purified water to the recording medium is 3.1 mL/m$^2$ for the contact time of 100 ms and the transfer amount of purified water to the recording medium is 3.5 mL/m$^2$ for the contact time of 400 ms measured using the dynamic scanning absorbing liquid meter.

Figure 16:
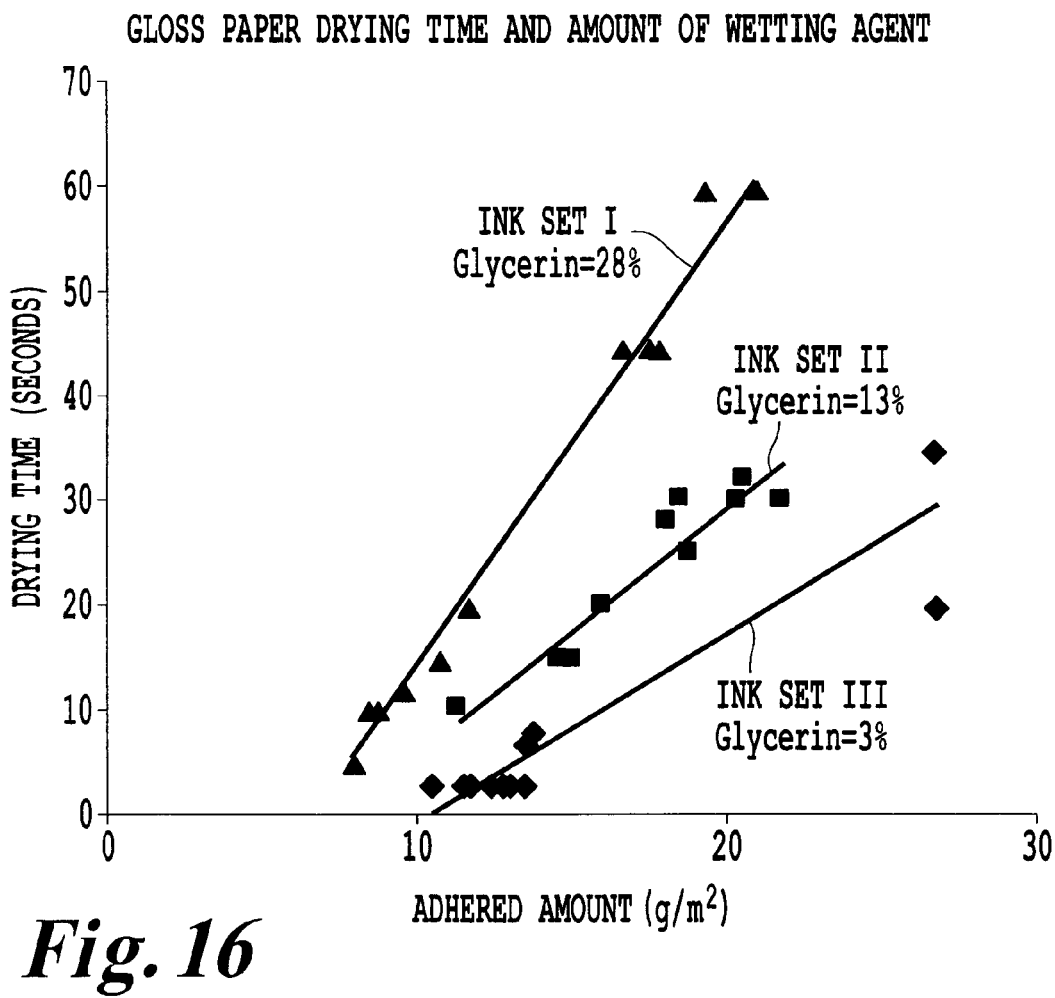
FIG. 16 is a view showing drying time of the ink sets I, II and III in Examples.

Each drying time in the ink sets I, II and III are shown in FIG. 16.

This way, the difference of the drying property due to the wetting agent (glycerine) amount also appears in the gloss paper for printing which has the relatively low water absorbing capacity. Any of the image quality was good, but when the adhered ink amount is large, in the ink in which the amount of the wetting agent is large in the ink set III, contrasting density easily occurs in the solid image portion (referred to as the beading).

<Evaluation of Imaging on Plain Paper>

Figure 17:
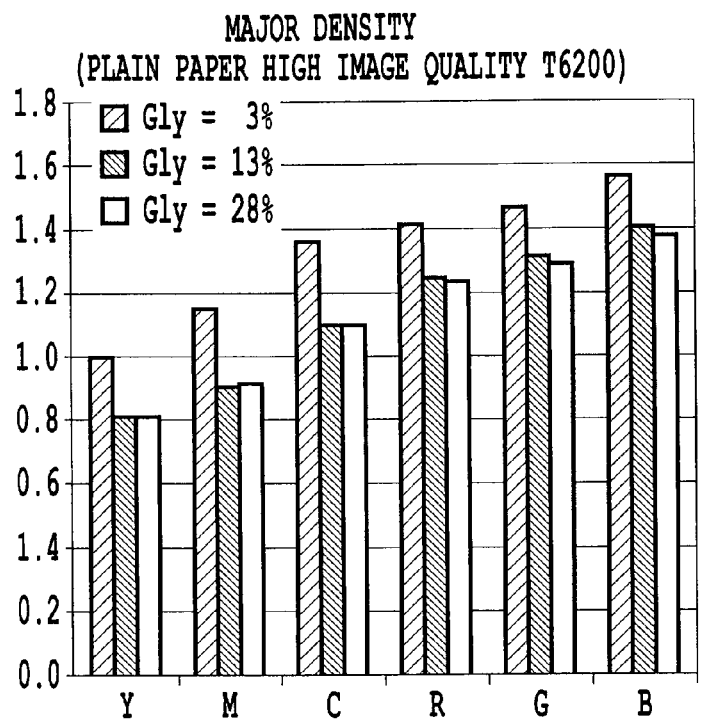
FIG. 17 is a view showing results of evaluation of imaging on plain paper of the ink sets I, II and III in Examples.
Figure 18:
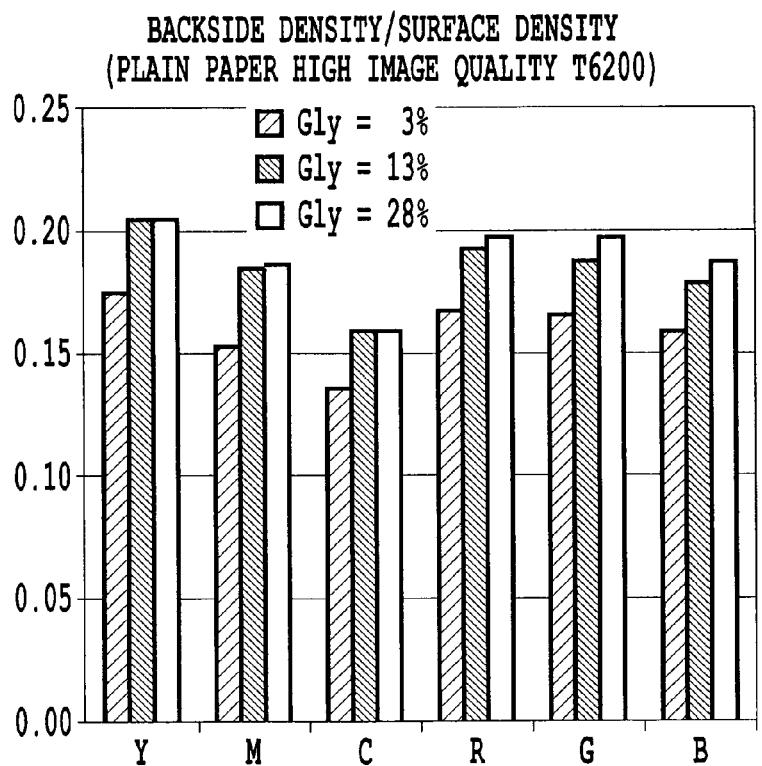
FIG. 18 is a view showing results of evaluation of imaging on plain paper of the ink sets I, II and III in Examples.

The imaging was performed on the plain paper, the brand name of T6200 supplied from Ricoh Co., Ltd. In the case of the plain paper, the density on the backside becomes high, which prevents both side copying. However, as shown in FIGS. 17 and 18, in the ink set 1 in which the content of glycerine was 3% by mass, the image quality suitable for the both side copying was obtained because the backside density is lower relative to the surface density.

Comparative Examples 9 to 11

Inks of Comparative Examples 9 to 11 were made in the same way as in Examples 19 to 21, except that the amount of the emulsion resin aqueous solution of Production Example 3 was 10% by mass in the inks of Examples 19 to 21.

In the resulting each ink, the total solid content in the ink was 10% by mass, and the resin amount in the total solid content was 54% by mass (magenta) to 63% by mass (cyan, yellow).

Subsequently, concerning each ink of Comparative Examples 9 to 11, when the printing was performed on the polyester film, the drying was slow because the total solid content is low, the fixing property was poor because the resin ratio in the solid content is low, and the image was not sharp.

When the amount of the emulsion resin aqueous solution (solid content 40% by mass) of Production Example 3 was changed to 10% by mass in Examples 25 to 27, the similar results were obtained.

Comparative Example 12

A pigment surfactant dispersion having the following composition was prepared.

C.I. pigment blue 15:3 (100 g), 24.8 g of polyoxyethyleneoleyl ether ammonium sulfate and 175.2 g of purified water were mixed, dispersed using a wet sand mill, then 414.3 g of purified water was added and mixed, and rough particles were eliminated by centrifuging the mixture to prepare a cyan pigment dispersion containing 14% by mass of the pigment and 17.5% by mass of the solid content.

Subsequently, a cyan ink was made in the same way as in Example 20, except that the pigment surfactant dispersion made above was used in place of the cyan pigment dispersion in Example 20.

In the resulting cyan ink, the solid content in the cyan ink was 20% by mass, the resin ratio in the solid content was 78% by mass, and the wetting agent content was 4% by mass.

The resulting cyan ink was the surfactant pigment dispersion ink in which the amount of the wetting agent was small, and the spout stability was poor.

Example 28

Preparation of Magenta Ink

A magenta ink having the following composition was made.

| | |
|---|---|
| Magenta dispersion of Production Example 1-1 (solid content 20% by mass) | 32% by mass |
| Emulsion of Production Example 3 (solid content 40% by mass) | 50% by mass |
| 1,3-Butanediol | 2% by mass |
| Glycerine | 3% by mass |
| 2-Ethyl-1,3-hexanediol | 2% by mass |
| Fluorine based surfactant | 1% by mass |
| Amine based pH adjuster | 0.6% by mass |
| Silicone based anti-foaming agent | 0.1% by mass |
| Preservative ant-fungal agent | 0.05% by mass |
| Water | balance |

In the resulting magenta ink, the viscosity and the surface tension measured in the same way as in Example 1 were 5.49 mPa·s and 24.3 mN/m, respectively. The solid content in the ink was 26% by mass, the resin ratio in the solid content was 82% by mass, and the wetting agent content was 5% by mass (the total content of the liquid components having higher boiling point than that of water and being liquid at 25° C. was 8% by mass).

Example 29

Preparation of Cyan Ink

A cyan ink was made in the same way as in Example 28, except that the cyan dispersion of Production Example 1-2 was used in place of the magenta dispersion in Example 28.

In the resulting cyan ink, the viscosity and the surface tension measured in the same way as in Example 1 were 5.17 mPa·s and 24.7 mN/m, respectively. The solid content in the ink was 26% by mass, the resin ratio in the solid content was 86% by mass, and the wetting agent content was 5% by mass (the total content of the liquid components having higher boiling point than that of water and being liquid at 25° C. was 8% by mass).

Example 30

Preparation of Yellow Ink

A yellow ink was made in the same way as in Example 29, except that the yellow dispersion of Production Example 1-3 was used in place of the cyan dispersion in Example 29 and the polyether modified silicone based surfactant (brand name: KF-642 supplied from Shin-Etsu Chemical Co., Ltd.) was used in place of the fluorine based surfactant.

In the resulting yellow ink, the viscosity and the surface tension measured in the same way as in Example 1 were 5.22 mPa·s and 25.2 mN/m, respectively. The solid content in the ink was 26% by mass, the resin ratio in the solid content was 86% by mass, and the wetting agent content was 5% by mass (the total content of the liquid components having higher boiling point than that of water and being liquid at 25° C. was 8% by mass).

The above inks of Examples 28 to 30 were rapidly dried even when the polyester film was used as the recording medium because they contained the wetting agent in a small amount similarly to the inks of Examples 19 to 21.

Example 31

Preparation of Magenta Ink

A magenta ink having the following composition was made.

| | |
|---|---|
| Magenta dispersion of Production Example 1-1 (solid content 20% by mass) | 42% by mass |
| Emulsion obtained by concentrating the emulsion of Production Example 3 to make 55% by mass of the solid content (solid content 55% by mass) | 42.5% by mass |
| 1,3-Butanediol | 11.5% by mass |
| Glycerine | 3.8% by mass |
| 2-Ethyl-1,3-hexanediol | 1% by mass |
| Fluorine based surfactant | 2% by mass |
| Amine based pH adjuster | 0.6% by mass |
| Silicone based anti-foaming agent | 0.1% by mass |
| Preservative ant-fungal agent | 0.05% by mass |
| Water | balance |

Example 32

Preparation of Cyan Ink

A cyan ink was made in the same way as in Example 31, except that the dispersion in Example 31 was changed to the cyan dispersion (solid content 20% by mass) of Production Example 1-2.

Example 33

Preparation of Yellow Ink

A yellow ink was made in the same way as in Example 31, except that the dispersion in Example 31 was changed to the yellow dispersion (solid content 20% by mass) of Production Example 1-3.

Example 34

Preparation of Magenta Ink

A magenta ink was made in the same way as in Example 31, except that the amounts of the pigment dispersion (solid content 20% by mass), the emulsion, 1,3-butanediol and glycerine in Example 31 were changed to 38% by mass, 36.3% by mass, 19.3% by mass and 6.5% by mass, respectively.

Example 35

Preparation of Cyan Ink

A cyan ink was made in the same way as in Example 32, except that the amounts of the pigment dispersion (solid content 20% by mass), the emulsion, 1,3-butanediol and glycerine in Example 32 were changed to 38% by mass, 36.3% by mass, 19.3% by mass and 6.5% by mass, respectively.

Example 36

Preparation of Yellow Ink

A yellow ink was made in the same way as in Example 33, except that the amounts of the pigment dispersion (solid content 20% by mass), the emulsion, 1,3-butanediol and glycerine in Example 33 were changed to 38% by mass, 36.3% by mass, 19.3% by mass and 6.5% by mass, respectively.

For each ink, the viscosity and the surface tension measured in the same way as in Example 1 are shown in Table 12. The solid content in the ink, the resin ratio in the solid content and the wetting agent amount are shown in the following Table 12 (in Examples 31 to 33, the content of the liquid components having a higher boiling point than that of water and being liquid at 25° C. was 18.3% by mass respectively, and in Examples 34 to 36, the content of the liquid components having a higher boiling point than that of water and being liquid at 25° C. was 29.1% by mass.

TABLE 16

| | Solid content* | Resin ratio in solid content* | Amount of Wetting agent* | Viscosity (mPa·s)** | Surface tension (mN/m)** |
|---|---|---|---|---|---|
| Example 31 | 31.0 | 82 | 15.3 | 11.8 | 25.1 |
| Example 32 | 31.0 | 85 | 15.3 | 12.5 | 25.1 |
| Example 33 | 31.0 | 85 | 15.3 | 12.9 | 25.3 |
| Example 34 | 26.5 | 81 | 25.8 | 12.3 | 25.1 |

TABLE 16-continued

|  | Solid content* | Resin ratio in solid content* | Amount of Wetting agent* | Viscosity (mPa·s)** | Surface tension (mN/m)** |
|---|---|---|---|---|---|
| Example 35 | 26.3 | 84 | 25.8 | 12.8 | 25.2 |
| Example 36 | 26.3 | 84 | 25.8 | 15.2 | 25.2 |

The printing was performed using each ink of Examples 31 to 33 and using the inkjet printer (G-707 supplied from Ricoh Co., Ltd.). As the recording medium, those obtained by cutting the polyester film (brand name: Lumira-75-T60 supplied from Toray Industries, Inc.) into the A4 size were used.

When each ink of Examples 31 to 33 was printed on a green solid portion of 1 cm square, when the drying property was observed using the filter paper 5A from Advantech, if the filter paper was not strongly pushed down, the ink was not adhered within about 5 minutes after the printing. For the ink one day after the printing, the fixing property was good unless the ink was strongly rubbed.

The image had less beading on the solid portion. This is because the amount of the wetting agent is about 15% by mass which is relatively small and the solid content is 31% by mass which is high.

Each ink of Examples 34 to 36 contains the wetting agent in a large amount. Thus, the drying property was relatively slow compared with the inks of Examples 31 to 33, but after 3 days had passed, the image was not peeled even in the solid portion unless the image was strongly rubbed. Because of the lower solid content compared with Examples 31 to 33, the beading easily occurs in the large solid portion, but small areas and letters which were not solid could be imaged with no problem as the image. Since the amount of the wetting agent was larger compared with Examples 31 to 33, the spout stability was good. The nozzle clogging which occurred when left stand for one day or more was recovered by cleaning, and it is possible to image with no problem depending on the purpose.

As the above, these inks having the high solid content and high resin concentration have a quick-drying property that the ink is not adhered onto the filter paper when the filter paper is strongly pushed down on the ink within several minutes even on recording media that do not absorb water like polyester film because the amount of the wetting agent is 10% by mass or less which is small. When the amount of the wetting agent is 10% by mass to 20% by mass, the sufficient fixing property is obtained within several days without particularly providing a heating means. The ink is not abundantly adhered onto the filter paper several minutes after the printing unless the filter paper is strongly pushed down on the ink. When the amount of the wetting agent is 20% by mass to 30% by mass, it is difficult to fix and dry within several minutes, but after leaving stand for several days, the fixing property is enhanced because the large amount of the resin affects it. In this case, the heating means such as microwave oven is effective for fixing in a short time. When the amount of the wetting agent exceeds 30% by mass, the practical drying property can not be obtained unless heating/drying is given.

These inks can be imaged on the non-porous substrates such as glasses and metals. In particular, in the case of imaging only the letters, there is no problem as the image.

When the recording ink of the present invention is printed on the plain paper, the image having the high image density, the low backside density, the good color formation and no bleeding is obtained. On the smooth paper for printing, which has the low water absorbing capacity, there is no problem in drying speed, and the sharp image close to the printed matter is obtained. Thus, the recording ink of the present invention can be used suitably for ink media sets, ink cartridges, ink recorded mattes, inkjet recording apparatuses and inkjet recording methods.

In the ink media set of the present invention, by increasing the solid contents in the colorant and the water-dispersible resin in the recording ink, increasing a resin ratio and further reducing a surface tension, wettability, the drying property and the fixing property can be improved when printed on non-porous substrates having the low water absorbing capacity, such as plastic sheets such as polyester sheets, plastic laminate papers, plastic coated papers, glasses and metals, and it becomes possible to print on the plastic medium by the water-based ink without requiring a special device such as heater by reducing the amount of the wetting agent as much as possible and without using a ultraviolet ray curable ink or an oil-based ink. The inkjet recording apparatus and the inkjet recording method of the present invention can be applied to various recordings by the inkjet recording system, and for example, can be suitably applied to printers for inkjet recording, facsimile apparatuses, copying apparatuses, printer/facsimile/copia composite machines, and the like.

What is claimed is:

1. An ink media set, comprising:
a recording ink, and
a recording medium,
wherein the recording ink comprises at least a solid component, a liquid component, and water; the solid component comprises a colorant and a resin and is a solid at 25° C.; the liquid component has a higher boiling point than that of water and is a liquid at 25° C.; the total content of the liquid component in the recording ink is 20% by mass or less; the recording medium comprises a support, and a coating layer on at least one surface of the support; the transfer amount of purified water to the recording medium for a contact time of 100 ms is 2 mL/m² to 35 mL/m²; and the transfer amount of purified water to the recording medium for a contact time of 400 ms is 3 mL/m² to 40 mL/m² measured using a dynamic scanning absorbing liquid meter.

2. An ink media set, comprising:
a recording ink, and
a recording medium,
wherein the recording ink comprises at least a solid component, a liquid component, and water; the solid component comprises a colorant and a resin and is a solid at 25° C.; the liquid component has a higher boiling point than that of water and is a liquid at 25° C.; the total content of the liquid component in the recording ink is 30% by mass or less; the total content of the solid component in the recording ink is 20% by mass or more; the total content of resin components in the solid component is 40% by mass to 95% by mass relative to the total amount of the solid components; the recording medium comprises a support, and a coating layer on at least one surface of the support; the transfer amount of purified water to the recording medium for a contact time of 100 ms is 2 mL/m² to 35 mL/m²; and the transfer amount of purified water to the recording medium for a contact time of 400 ms is 3 mL/m² to 40 mL/m² measured using a dynamic scanning absorbing liquid meter.

3. The ink media set according to claim 2, wherein the resin comprises resin fine particles having a glass transition temperature of 25° C. or less, and the volume average particle diameter of the resin fine particles is 10 nm to 1,000 nm.

4. The ink media set according to claim 2, wherein the colorant is a pigment of a polymer emulsion type containing a color material which is water insoluble or hardly water soluble in polymer fine particles.

5. An ink media set, comprising:
a recording ink, and
a recording medium,
wherein the recording ink comprises at least a pigment of a polymer emulsion type containing a color material which is water insoluble or hardly water soluble in polymer fine particles, water dispersible resin fine particles, and a wetting agent; the total solid content of the pigment of the polymer emulsion type and the water dispersible resin fine particles is 20% by mass or more; the content of the wetting agent is 20% by mass or more; the transfer amount of purified water to the recording medium for a contact time of 100 ms is 2 mL/m² to 35 mL/m², and the transfer amount of purified water to the recording medium for a contact time of 400 ms measured using a dynamic scanning absorbing liquid meter is 3 mL/m² to 40 mL/m².

6. An ink media set, comprising:
a recording ink, and
a recording medium,
wherein the recording ink comprises at least a colorant, a water dispersible resin, and a wetting agent; the total solid content of the recording ink is 20% by mass or more; the content of the wetting agent is 20% by mass or more; the wetting agent contains glycerine alone, or the content of the glycerine in the wetting agent is 80% by mass or more; the transfer amount of purified water to the recording medium for a contact time of 100 ms is 2 mL/m² to 35 mL/m², and the transfer amount of purified water to the recording medium for a contact time of 400 ms measured using a dynamic scanning absorbing liquid meter is 3 mL/m² to 40 mL/m².

* * * * *